United States Patent
Padaki et al.

(10) Patent No.: US 12,085,661 B2
(45) Date of Patent: Sep. 10, 2024

(54) ANGLE OF ARRIVAL CAPABILITY IN ELECTRONIC DEVICES WITH MOTION SENSOR FUSION

(71) Applicant: Samsung Electronics Co., Ltd., Suwon-si (KR)

(72) Inventors: Aditya Vinod Padaki, Richardson, TX (US); Neha Dawar, Plano, TX (US); Hoang Viet Nguyen, Plano, TX (US); Yuming Zhu, Plano, TX (US); Songwei Li, Plano, TX (US); Boon Loong Ng, Plano, TX (US); Yi Yang, Suwon-si (KR); Moonseok Kang, Suwon-si (KR); Moongee Cho, Seoul (KR); Hyunchul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/404,911

(22) Filed: Aug. 17, 2021

(65) Prior Publication Data
US 2022/0057471 A1    Feb. 24, 2022

Related U.S. Application Data

(60) Provisional application No. 63/068,694, filed on Aug. 21, 2020.

(51) Int. Cl.
*H04W 4/029* (2018.01)
*G01S 5/00* (2006.01)
(Continued)

(52) U.S. Cl.
CPC ............ *G01S 5/017* (2020.05); *G01S 5/0215* (2013.01); *G01S 5/0242* (2013.01);
(Continued)

(58) Field of Classification Search
CPC ....... H04W 4/80; H04W 12/08; H04W 4/026; H04W 4/029; H04W 4/02; H04W 4/70;
(Continued)

(56) References Cited

U.S. PATENT DOCUMENTS 6,104,345 A    8/2000  Tweg et al.
9,841,493 B2  12/2017  Sen et al.
(Continued)

FOREIGN PATENT DOCUMENTS

JP    2019219373 A    12/2019

OTHER PUBLICATIONS

International Search Report and Written Opinion of the International Searching Authority dated Nov. 26, 2021, in connection with International Application No. PCT/KR2021/011140, 6 pages.

*Primary Examiner* — Joseph Arevalo

(57) ABSTRACT

A method includes obtaining signal information based on wireless signals communicated between an electronic device and a target device. The method also includes obtaining motion information based on movement of the electronic device. The method further includes identifying first location information based on the motion information and the channel information. Additionally, the method includes identifying second location information based on the orientation of the electronic device and the AoA information. The method also includes determining whether the electronic device is in motion. The method further includes determining whether the target device is within the FoV or outside the FoV of the electronic device based in part on the first location information in response to determining that the electronic device is not in motion or the second location information in response to determining that the electronic device is in motion.

30 Claims, 36 Drawing Sheets

(51) Int. Cl.
*G01S 5/02* (2010.01)
*H04W 4/02* (2018.01)

(52) U.S. Cl.
CPC .......... *G01S 5/0268* (2013.01); *G01S 5/0294* (2013.01); *H04W 4/023* (2013.01); *H04W 4/029* (2018.02)

(58) Field of Classification Search
CPC ....... H04W 4/024; H04W 4/35; H04W 12/06; H04W 84/18; H04W 88/02; H04W 12/33; H04W 12/61; H04W 12/64; H04W 4/38; H04W 4/021; H04W 4/023; H04W 64/00; H04W 12/104; H04W 12/50; H04W 12/03; H04W 12/10; H04W 12/126; H04W 12/30; H04W 12/63; H04W 16/28; H04W 4/185; H04W 4/40; H04W 4/50; H04W 4/90; H04W 74/0816; H04W 74/0883; H04W 84/12; H04W 12/68; H04W 24/10; H04W 4/21; H04W 52/0216; H04W 52/0241; H04W 56/001; H04W 74/0891; H04W 76/14
USPC ........................ 455/456.1, 456.3, 404.1, 566
See application file for complete search history.

(56) References Cited

U.S. PATENT DOCUMENTS

| | | | |
|---|---|---|---|
| 10,356,553 | B2 | 7/2019 | Sant et al. |
| 10,915,796 | B2 | 2/2021 | Yang et al. |
| 2005/0219213 | A1 | 10/2005 | Cho et al. |
| 2008/0236275 | A1* | 10/2008 | Breed ..................... G01S 15/87 73/290 V |
| 2015/0317928 | A1* | 11/2015 | Safaee-Rad ............ G09G 3/006 345/593 |
| 2015/0317944 | A1* | 11/2015 | Safaee-Rad ............... G06T 1/20 345/595 |
| 2016/0358459 | A1 | 12/2016 | Singhar et al. |
| 2018/0088208 | A1 | 3/2018 | Gagrani et al. |
| 2019/0219662 | A1 | 7/2019 | Siessegger et al. |
| 2019/0286806 | A1* | 9/2019 | Robinson ............ H04L 63/0853 |
| 2019/0391254 | A1 | 12/2019 | Asghar et al. |
| 2020/0132798 | A1* | 4/2020 | Tomioka ................... G01S 3/50 |
| 2020/0191943 | A1 | 6/2020 | Wu et al. |
| 2020/0279279 | A1* | 9/2020 | Chaudhuri ......... G06Q 30/0201 |
| 2021/0064142 | A1* | 3/2021 | Stern ................... G06F 3/04883 |
| 2022/0196782 | A1* | 6/2022 | Dawar .................. H04W 16/28 |

* cited by examiner

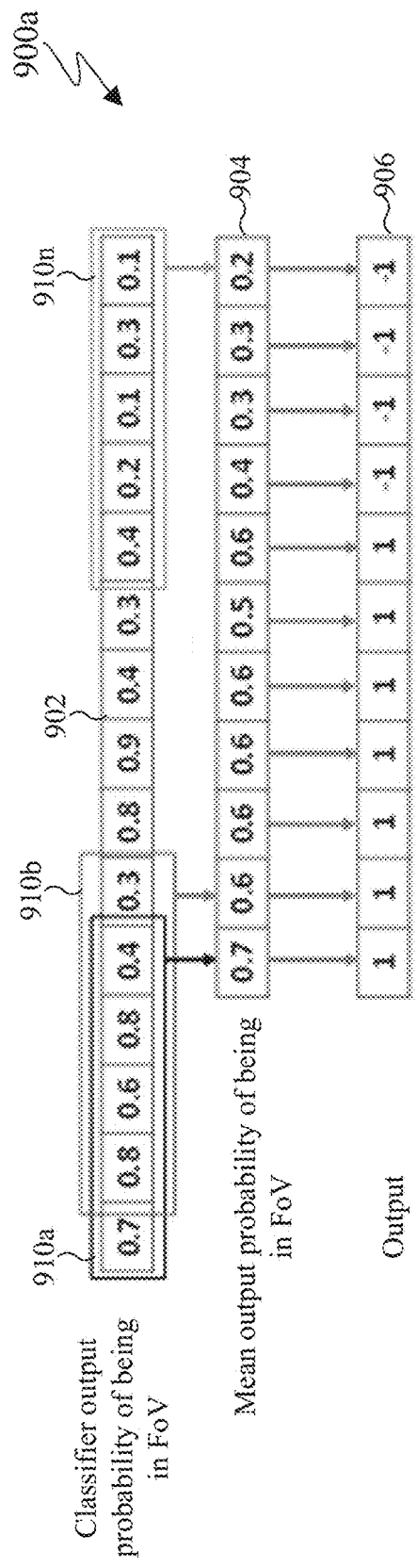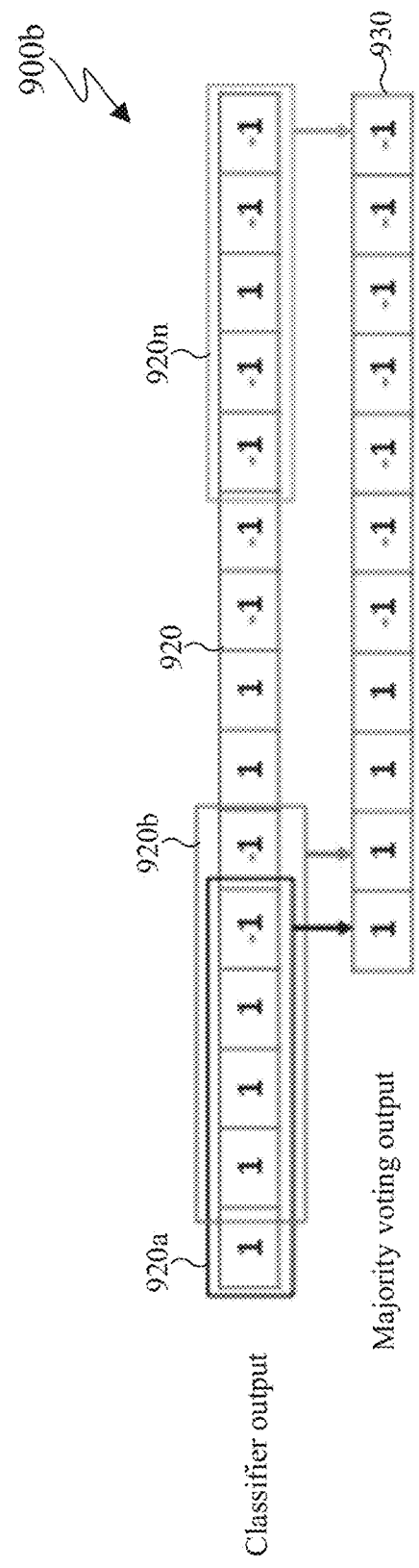
FIG. 9A
FIG. 9B

ANGLE OF ARRIVAL CAPABILITY IN ELECTRONIC DEVICES WITH MOTION SENSOR FUSION

CROSS-REFERENCE TO RELATED APPLICATION AND CLAIM OF PRIORITY

This application claims priority under 35 U.S.C. § 119(e) to U.S. Provisional Patent Application No. 63/068,694 filed on Aug. 21, 2020. The above-identified provisional patent application is hereby incorporated by reference in its entirety.

TECHNICAL FIELD

This disclosure relates generally to localizing an electronic device. More specifically, this disclosure relates to angle of arrival capability in electronic devices with motion sensor fusion.

BACKGROUND

The use of mobile computing technology has greatly expanded largely due to usability, convenience, computing power, and the like. One result of the recent technological development is that electronic devices are becoming more compact, while the number of functions and features that a given device can perform is increasing. Certain electronic devices can determine whether another device is within its field of view. For example, an electronic device can transmit and receive signals with other devices and determine an angle of arrival (AoA) of the received signals and a distance between the devices. The signals can be corrupted which can create inaccurate AoA and range determinations. Inaccurate AoA and range determinations, can cause the electronic device to incorrectly determine that another electronic device is within its field of view or outside its field of view.

SUMMARY

This disclosure provides angle of arrival capability in electronic device.

In one embodiment, a method is provided. The method includes obtaining signal information based on wireless signals communicated between an electronic device and a target device. The signal information includes channel information, range information, and angle of arrival (AoA) information. The method also includes obtaining motion information based on movement of the electronic device. The motion information includes orientation of the electronic device. The method further includes identifying first location information based on the motion information and the channel information, the first location information indicating whether the target device is within a field of view (FoV) of the electronic device. Additionally, the method includes identifying second location information based on the orientation of the electronic device and the AoA information, the second location information indicating whether the target device is within the FoV of the electronic device. The method also includes determining whether the electronic device is in motion. The method further includes determining whether the target device is within the FoV or outside the FoV of the electronic device based in part on the first location information in response to determining that the electronic device is not in motion or the second location information in response to determining that the electronic device is in motion.

In another embodiment, an electronic device is provided. The electronic device includes a processor. The processor is configured to obtain signal information based on wireless signals communicated between the electronic device and a target device, the signal information including channel information, range information, and AoA information; The processor is configured to obtain motion information based on movement of the electronic device, the motion information including orientation of the electronic device. The processor is configured to identify first location information based on the motion information and the channel information, the first location information indicating whether the target device is within a FoV of the electronic device. The processor is configured to identify second location information based on the orientation of the electronic device and the AoA information, the second location information indicating whether the target device is within the FoV of the electronic device. The processor is configured to determine whether the electronic device is in motion. The processor is configured to determine whether the target device is within the FoV or outside the FoV of the electronic device based in part on the first location information in response to determining that the electronic device is not in motion or the second location information in response to determining that the electronic device is in motion.

In yet another embodiment a non-transitory computer readable medium containing instructions is provided. The instructions that when executed cause processor to obtain signal information based on wireless signals communicated between an electronic device and a target device, the signal information including channel information, range information, and AoA information. The instructions that when executed also cause the processor to obtain motion information based on movement of the electronic device, the motion information including orientation of the electronic device. The instructions that when executed also cause the processor to identify first location information based on the motion information and the channel information, the first location information indicating whether the target device is within a FoV of the electronic device. The instructions that when executed also cause the processor to identify second location information based on the orientation of the electronic device and the AoA information, the second location information indicating whether the target device is within the FoV of the electronic device. The instructions that when executed also cause the processor to determine whether the electronic device is in motion. The instructions that when executed also cause the processor to determine whether the target device is within the FoV or outside the FoV of the electronic device based in part on the first location information in response to determining that the electronic device is not in motion or the second location information in response to determining that the electronic device is in motion.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A and 9B illustrate example moving average filters for an initial FoV prediction according to embodiments of the present disclosure;

DETAILED DESCRIPTION

Figure 1:
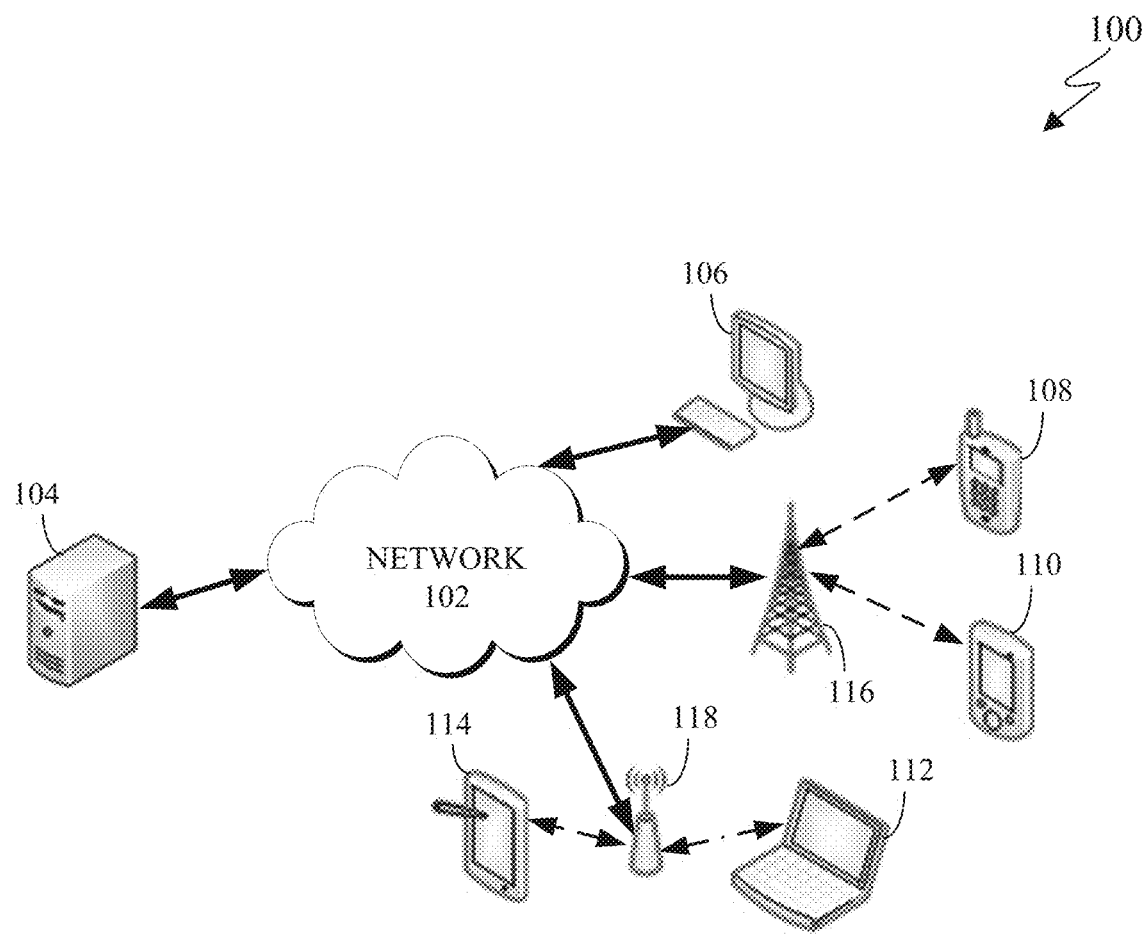
FIG. 1 illustrates an example communication system according to embodiments of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

In certain embodiments, an electronic device can include a receiver (or a transceiver) and one or more target devices can include a transmitter (or transceiver). The receiver (or transceiver) of the electronic device can be can ultra-wideband (UWB) receiver (or UWB transceiver). Similarly, the transmitter (or transceiver) target devices can be a UWB transmitter (or UWB transceiver). The electronic device can measure angle of arrival (AoA) of a UWB signal transmitted by the target device.

Embodiments of the present disclosure provide systems and methods for identifying where a target device is with respect to some field-of-view (FoV) of an electronic device using signals such as UWB. Embodiments of the present disclosure also provide systems and methods for determining whether the target device is within the FoV of the electronic device using signals such as UWB.

FoV can be any range of angles around the boresight within which the target device can be defined as identifiable or present. If there is direct line of sight (LOS) between the device and target device, and range and angle of arrival (AoA) measurements are good, identifying the presence of target device in FoV can be done based on AoA measurements.

UWB signals can provide centimeter level ranging. For example, if the target device is within line of sight (LOS) of the electronic device, the electronic device can determine the range (distance) between the two devices with an accuracy that is within ten centimeters. Alternatively if the target device is not within a LOS of the electronic device, the electronic device can determine the range between the two devices with an accuracy that is within fifty centimeters. Additionally, if the target device is within LOS of the electronic device, the electronic device can determine the AoA between the two devices with an accuracy that is within three degrees.

UWB measurements become negatively impacted due to the environment that the electronic device and the target device are within. Based on the environment, the location of the target device relative to the electronic device may be difficult to determine, such as when the electronic device is unable to be determine whether the received signals came directly from the target device or were a reflection off of an object in the environment.

Since UWB measurements become negatively impacted due to the environment that the electronic device and the target device are within, the location of the target device relative to the electronic device may be difficult to determine. For example, the location of the target device can be difficult to determine when the electronic device is unable to be determine whether the received signals of the target device came directly from the target device or were a reflection off of an object in the environment (referred to as a multipath effect).

Accordingly, embodiments of the present disclosure take into consideration that UWB the measurements can be corrupted by multipath and non-line of sight (NLOS) scenarios. For example, without post processing an electronic device may be unable to determine whether a received signal came directly from a target device or if the signal was a reflection. Additionally, non-isotropic antenna radiation patterns can also result in low quality of AoA measurements. In particular, when the signal received for the direct path between the target device and the device is weak, it is possible that the signal received for the reflected path from the environment will be strong enough to be used for AoA measurements. Those AoA measurements thus will give false reports of where the target device is located relative to the electronic device.

Therefore, embodiments of the present disclosure provide systems and methods for post processing received signals. The received signals can include both perfect and imperfect UWB measurements. Post processing can be used to improve the quality of the measurements for enabling an electronic device to determine whether the target device is within the FoV of the electronic device. Certain embodiments of the present disclosure describe combing FoV determinations of a classifier and a spatial consistency check operation for determining whether the target device is within the FoV of the electronic device. When the electronic device determines that the target device is within its FoV, can improve user experience with respect to sharing data such as in a peer-to-peer file sharing scenario, finding objects, and augmented reality.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from the received signals. In certain embodiments, a neural network is included within any of the client devices 106-114. When a neural network is included in a client device, the client device can use the neural network to extract features from the received signals, without having to transmit content over the network 102. Similarly, when a neural network is included in a client device, the client device can use the neural network to identify whether another client device is within the field of view of the client deice that includes the neural network.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring transceiver. In certain embodiments, any of the client devices 106-114 can emit and collect UWB signals via a measuring transceiver.

In this example, some client devices 108-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As illustrated, the laptop computer 112 can communicate with the mobile device 108. Based on the wireless signals which are communicated between these two devices, a device (such as the laptop computer 112, the mobile device 108, or another device, such as the server 104) obtaining channel information, range information, and AoA information. Channel information can include features of a channel impulse response (CIR) of a wireless channel between the laptop computer 112 and the mobile device 108. The range can be an instantaneous distance or variances in the distances between the laptop computer 112 and the mobile device 108, based on the wireless signals. Similarly, the AoA can be an instantaneous AoA measurement or variances in AoA measurements between the laptop computer 112 and the mobile device 108, based on the wireless signals.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
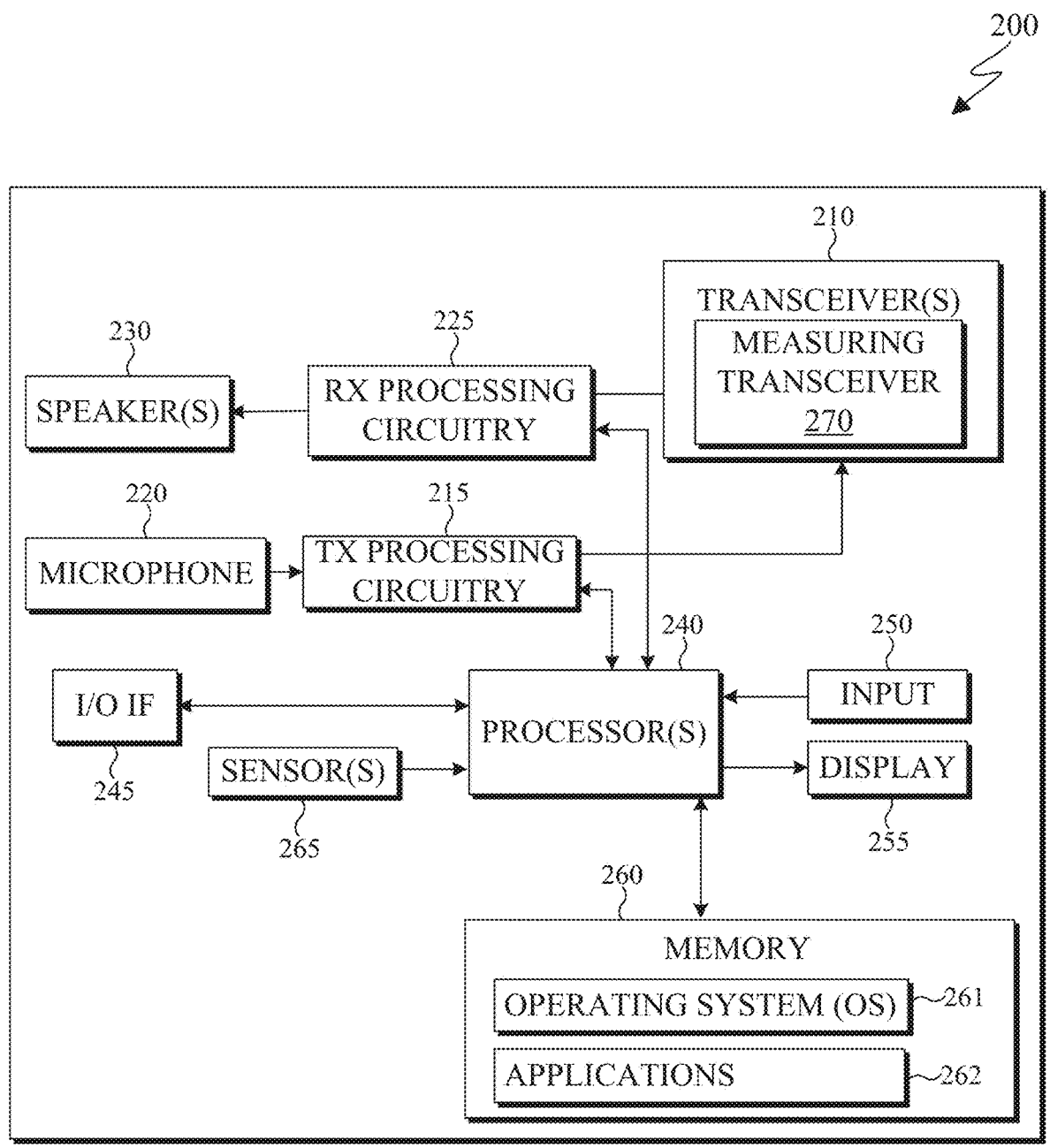
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a Wifi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type (s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 includes a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the measuring transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is the measuring transceiver 270. The measuring transceiver 270 is configured to transmit and receive signals for detecting and ranging purposes. The measuring transceiver 270 can transmit and receive signals for measuring range and angle of an external object relative to the electronic device 200. The measuring transceiver 270 may be any type of transceiver including, but not limited to a WiFi transceiver, for example, an 802.11ay transceiver, a UWB transceiver, and the like. In certain embodiments, the measuring transceiver 270 includes a sensor. For example, the measuring transceiver 270 can operate both measuring and communication signals concurrently. The measuring transceiver 270 includes one or more antenna arrays, or antenna pairs, that each includes a transmitter (or transmitter antenna) and a receiver (or receiver antenna). The measuring transceiver 270 can transmit signals at various frequencies, such as in UWB. The measuring transceiver 270 can receive the signals from a target device (such as an external electronic device) also referred to as a target device) for determining whether the target device within the FoV of the electronic device 200.

The transmitter, of the measuring transceiver 270, can transmit UWB signals. The receiver, of the measuring transceiver, can receive UWB signals from other electronic devices. The processor 240 can analyze the time difference, based on the time stamps of transmitted and received signals, to measure the distance of the target objects from the electronic device 200. Based on the time differences, the processor 240 can generate location information, indicating a distance that the target device is from the electronic device 200. In certain embodiments, the measuring transceiver 270 is a sensor that can detect range and AoA of another electronic device. For example, the measuring transceiver 270 can identify changes in azimuth and/or elevation of the other electronic device relative to the measuring transceiver 270. In certain embodiments, the measuring transceiver 270 represents two or more transceivers. Based on the differences between a signal received by each of the transceivers, the processor 240 can determine the identify changes in azimuth and/or elevation corresponding to the AoA of the received signals.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
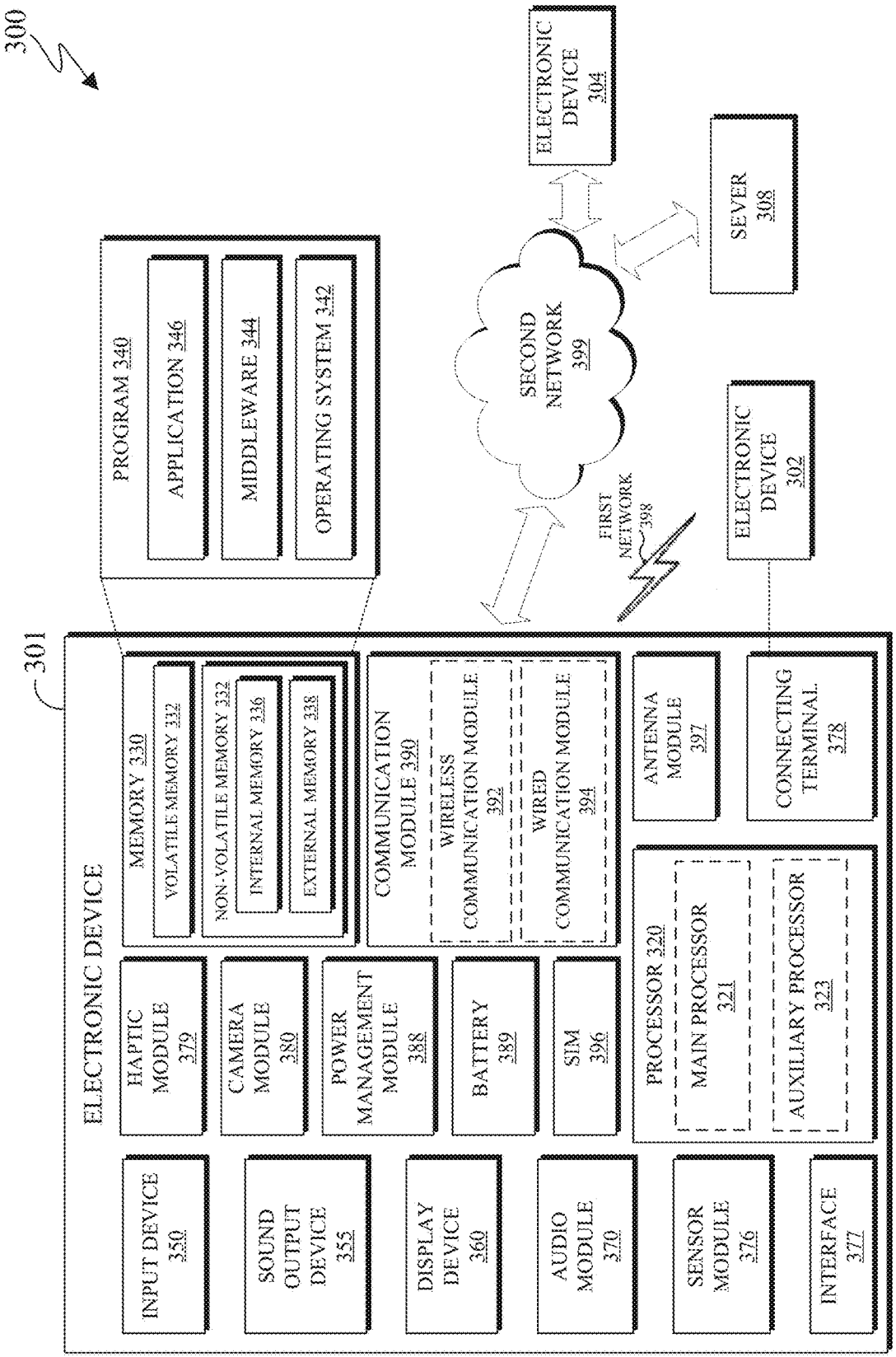
FIG. 3 illustrates an example network configuration according to embodiments of the present disclosure.

FIG. 3 illustrates an example network configuration according to embodiments of the present disclosure. An embodiment of the network configuration shown in FIG. 3 is for illustration only. One or more of the components illustrated in FIG. 3 can be implemented in specialized circuitry configured to perform the noted functions or one or more of the components can be implemented by one or more processors executing instructions to perform the noted functions.

FIG. 3 illustrated a block diagram illustrating a network configuration including an electronic device 301 in a network environment 300 according to various embodiments. As illustrated in FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 and/or the second network 399 can be similar to the network 102 of FIG. 1. The electronic devices 301, 302, and 304 can be similar to any of the client devices 106-114 of FIG. 1 and include similar components to that of the electronic device 200 of FIG. 2. The server 308 can be similar to the server 104 of FIG. 1.

The electronic device 301 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320 and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334.

According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software. The program 340 may include, for example, an operating system (OS) 342, middleware 344, or an application 346.

The input device 350 may receive a command or data to be used by other components (e.g., the processor 320) of the electronic device 301, from the outside (e.g., a user) of the electronic device 301. The input device 350 may include, for example, a microphone, a mouse, a keyboard, or a digital pen (e.g., a stylus pen). In certain embodiments, the input device 350 includes a sensor for gesture recognition. For example, the input device 350 can include a transceiver similar to the measuring transceiver 270 of FIG. 2.

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, or projector. According to an embodiment, the display device 360 may include touch circuitry adapted to detect a touch, or sensor circuitry (e.g., a pressure sensor) adapted to measure the intensity of force incurred by the touch. The display device 360 can be similar to the display 255 of FIG. 2.

The audio module 370 may convert a sound into an electrical signal and vice versa. According to an embodiment, the audio module 370 may obtain the sound via the input device 350, output the sound via the sound output device 355, or output the sound via a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 376 can be similar to the sensors 265 of FIG. 2.

The interface 377 may support one or more specified protocols to be used for the electronic device 101 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication.

According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, UWB, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB).

According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna.

According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 may perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Although FIG. 3 illustrates one example of the electronic device 301 in the network environment 300, various changes can be made to FIG. 3. For example, various components in FIG. 3 can be combined, further subdivided, or omitted and additional components can be added according to particular needs. As a particular example, the processor 320 can be further divided into additional processors, such as one or more central processing units (CPUs), one or more graphics processing units (GPUs), one or more neural networks, and the like. Also, while FIG. 3 illustrates the electronic device 301 configured as a mobile telephone, tablet, or smartphone, the electronic device 301 can be configured to operate as other types of mobile or stationary devices.

Figure 4A:
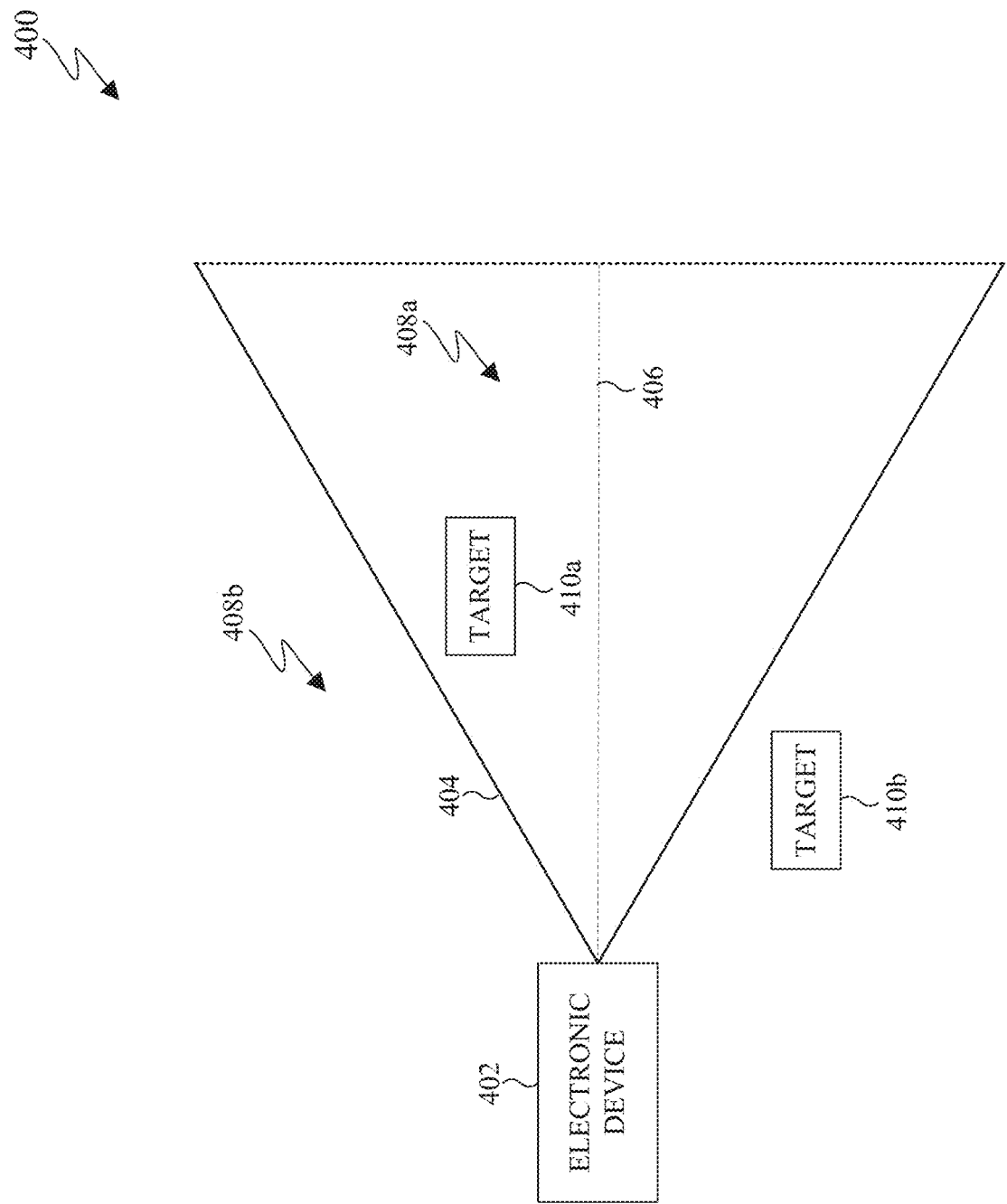
FIG. 4A illustrates an example diagram of a determination of whether target device is within a field of view (FoV) of an electronic device according to embodiments of the present disclosure.
Figure 4B:
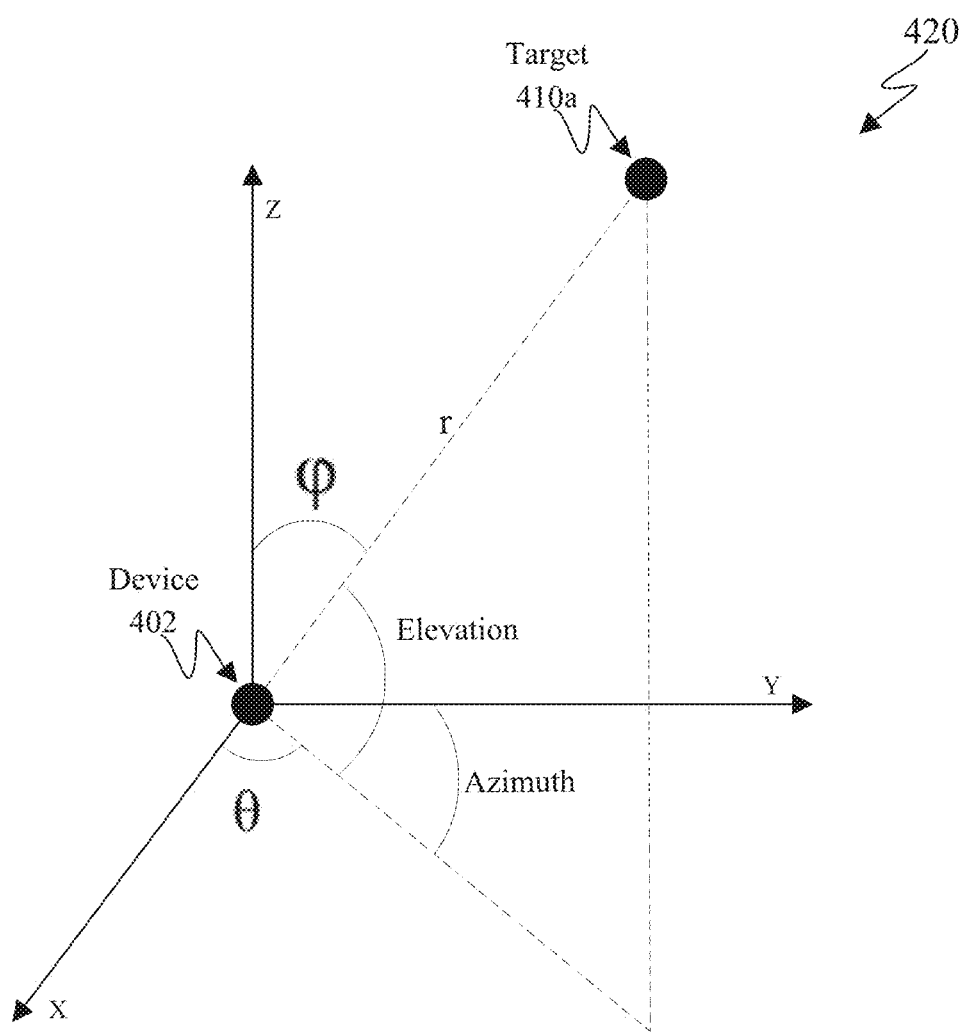
FIG. 4B illustrates an example coordinate system according to embodiments of the present disclosure.
Figure 4C:
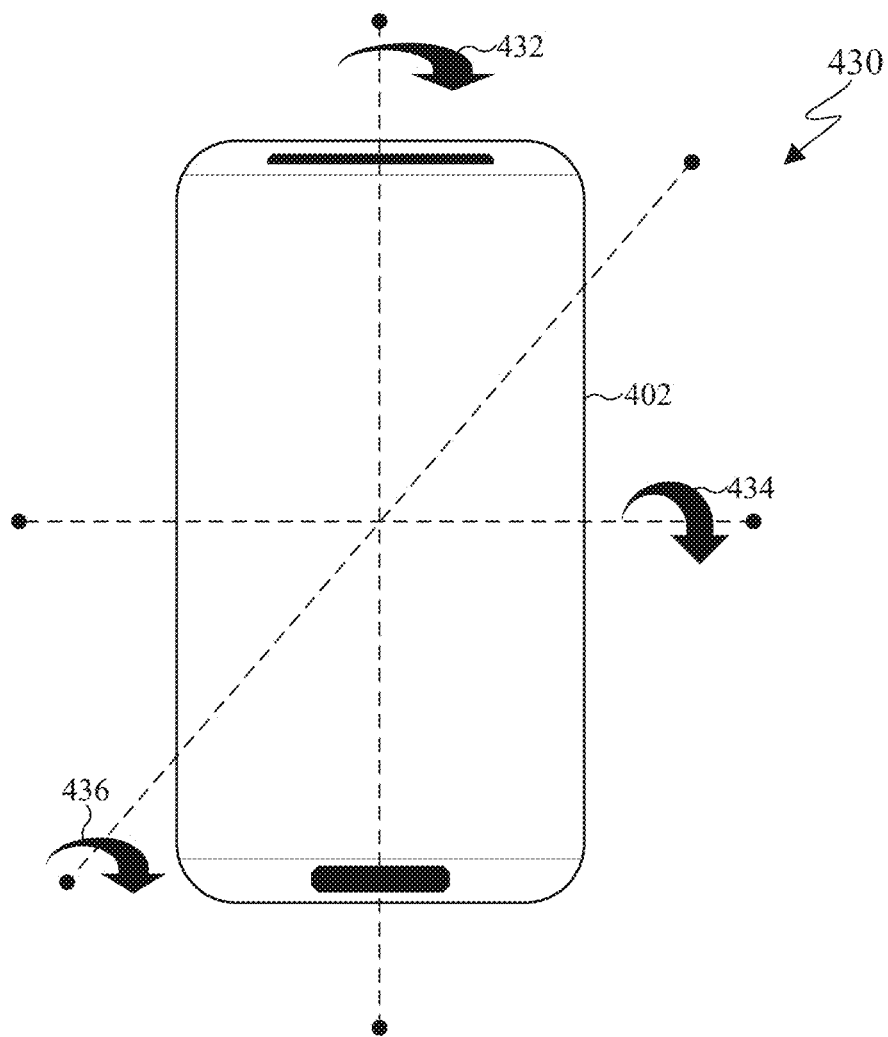
FIG. 4C illustrates examples of changing the orientation an electronic device according to embodiments of the present disclosure.
Figure 4D:
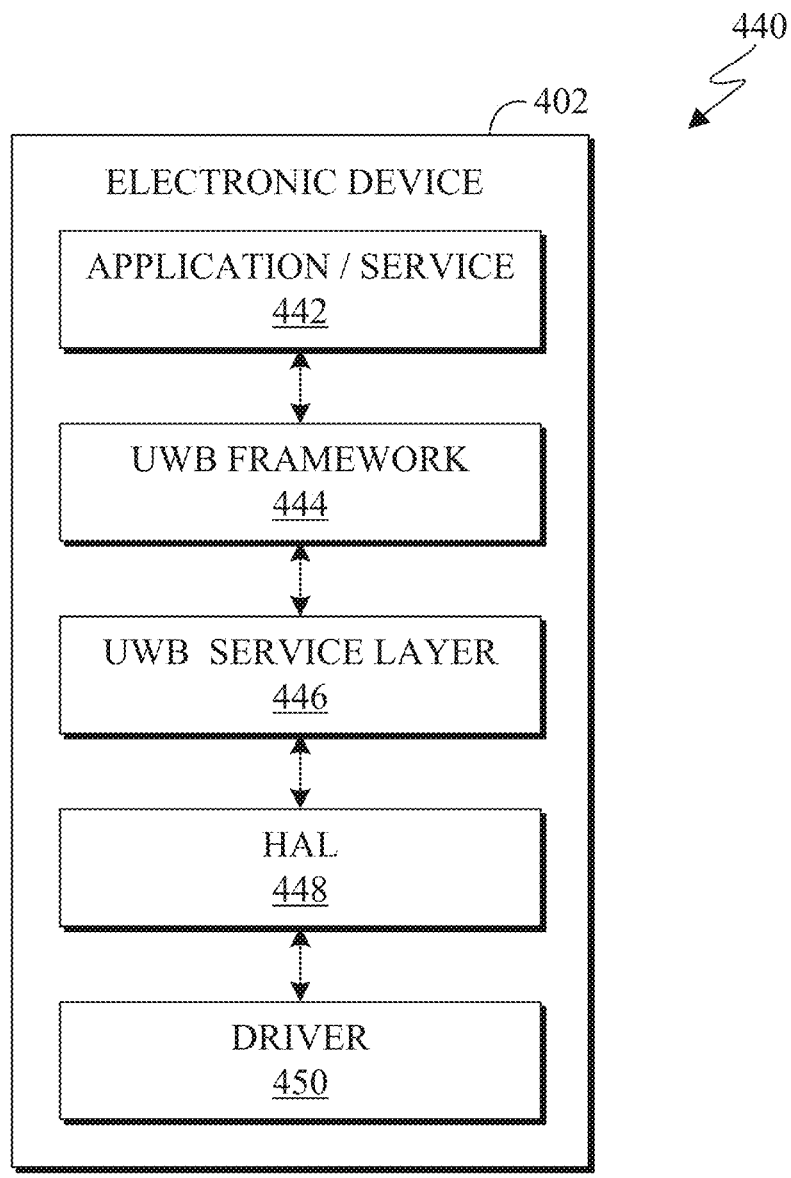
FIG. 4D illustrates an example hierarchal process for field of view determination according to embodiments of the present disclosure.

FIG. 4A illustrates an example diagram 400 of a determination of whether a target device (such as the target device 410a or the target device 410b, collectively target device 410) is within a FoV of an electronic device 402 according to embodiments of the present disclosure. FIG. 4B illustrates an example coordinate system 420 according to embodiments of the present disclosure. FIG. 4C illustrates examples of changing the orientation of an electronic device 402 according to embodiments of the present disclosure. FIG. 4D illustrates an example hierarchal process 440 for field of view determination according to embodiments of the present disclosure.

The electronic device 402 of FIGS. 4A, 4B, 4C, and 4D, the target device 410a of FIGS. 4A and 4B, and the target device 410b of FIG. 4A can be any one of the client device 106-114 and can include internal components similar to that of electronic device 200 of FIG. 2 and the electronic device 301 of FIG. 3. For example, the target device 410a and the target device 410b can be a phone or a tag attached to a certain object. In certain embodiments, the electronic device 402 is identifies the location of a target device 410 with respect to some FoV of the electronic device 402, such as the FoV 408a. In other embodiments, a remote server, such as the server 104 if FIG. 1 or the server 308 of FIG. 3, receives information from the electronic device 402 and identifies the location of a target device 410 with respect to some FoV of the electronic device 402, such as the FoV 408a. The electronic device 402, the target device 410 can be any wireless-enabled device such as the mobile device 108, a smartphone, a smart watch, a smart tag, a tablet computer 114, a laptop computer 112, a smart thermostat, a wireless-enabled camera, a smart TV, a wireless-enabled speaker, a wireless-enabled power socket, and the like. Based on whether a target device is within the FoV of the electronic device can be used to help a user finding a lost personal item in a nearby area, displaying contextual menu around the electronic device 402 seen through an AR application. The determination of whether the target device 410a or the target device 410b is within the field of view of the electronic device 402 can be performed by any one of the client device 106-114, the server 104 of FIG. 1, The any one of the electronic devices 301, 302, 304 of FIG. 3, the server 308 of FIG. 3, or the electronic device 402.

In certain embodiments, the electronic device 402, the target device 410a, and the target device 410b can include a transceiver, such as a UWB transceiver. Any other suitable transceiver, receiver, or transmitter may be used. Range and AoA information is obtained based on the exchange of signals between the electronic device 402, the target device 410a, and the target device 410b.

As shown in FIG. 4A, the determination of whether an external electronic device (such as either of the target devices 410a or 410b) is within a FoV of another electronic device (such as the electronic device 402) is based on the size and shape of a FoV. A portion of the environment around the electronic device 402 is illustrated as FoV 408a, while another portion of the environment around the electronic device 402 is illustrated as outside FOV 408b. The boundary 404 represents an approximate boundary between the FoV 408a and outside the FoV 408b. The boresight 406 is the center of the FoV 408a. The boresight 406 can be the axis of maximum gain (such as maximum radiated power) of an antenna (e.g., a directional antenna) of the electronic device 402. In some instances, the axis of maximum gain coincides with the axis of symmetry of the antenna of the electronic device 402. For example, for axial-fed dish antennas, the antenna boresight is the axis of symmetry of the parabolic dish, and the antenna radiation pattern (the main lobe) is symmetrical about the boresight axis. Most boresight axes are fixed by their shape and cannot be changed. However, in some implementations, the electronic device 402 includes one or more phased array antennas that can electronically steer a beam, change the angle of the boresight 406 by shifting the relative phase of the radio waves emitted by different antenna elements, radiate beams in multiple directions, and the like.

The FoV of an electronic device (such as the FoV 408a of the electronic device 402 of FIG. 4A) is a range of angles around the boresight 406, within which the target device (such as the target devices 410a and 410b) can be defined as being present based on UWB measurements or other measurements. The size and shape of a FoV can vary based on environmental conditions and the hardware of the electronic device itself.

In certain embodiments, if (i) there is a direct line of sight (LOS) between the electronic device 402 and a target device (such as the target device 410a or 410b), and (ii) range and AoA measurements are good, then to identify the presence of target as in FoV or out of FoV can be performed based on AoA measurements. However, many times, the measurements are corrupted by multipath and NLOS scenarios. Non-isotropic antenna radiation patterns can also result in low quality of AoA measurements. For example, when the signal received from a direct path between the target device (such as the target device 410b) is weak, it is possible that the signal received from a reflected path, based on the environment, can be strong enough to be used for generating the range and AoA measurements. The generated range and AoA measurements which are based on a reflected signal would give false results of where the target is. For example, the target device 410b can transmit signals to the electronic device 402. If the electronic device 402 uses a reflected signal (instead of a direct signal) the electronic device 402 can incorrectly determine that the target device 410b is located within the FoV 408a instead of its actual location which is outside the FoV 408b. Therefore, embodiments of the present disclosure address problems for determining whether the target device is in the FoV of the electronic device when the UWB measurements between them may not be very accurate.

Embodiments of the present disclosure describe methods for identifying whether the target device is within the FoV of the electronic device 402 (such as the target device 410a) or whether a target device is outside the FoV of the electronic device 402 (such as the target device 410b).

As shown in FIG. 4B, the coordinate system 420 can be used to find the distance and the relative angle that the target device 410a is from the electronic device 402. The distance and the relative angle between the target device 410a and the electronic device 402 correspond to the range and AoA measurements when the target device 410a is within the FOV of the electronic device 402. The coordinate system 420 illustrates the azimuth angle and the elevation angle between the two devices. As illustrated, the azimuth angle is the horizontal angle between the electronic device 402 and the target device 410a. Similarly, the elevation angle is the vertical angle between the electronic device 402 and the target device 410a. The coordinate system 420 illustrates the range, r, (distance) between the electronic device 402 and the target device 410a.

As shown in FIG. 4C, changing the orientation of the electronic device 402 causes the azimuth orientation and elevation orientation to change. For example, when the electronic device 402 undergoes rotation 432 causes the azimuth orientation, as shown in FIG. 4B, to change. Rotation 432 can be similar to a change in yaw. Similarly, when the electronic device 402 undergoes rotation 434 causes the elevation orientation, as shown in FIG. 4B, to change. Rotation 434 can be similar to a change in pitch. The electronic device 402 an also undergo rotation 436 causing the electronic device 402 to roll. The changes in the orientation of the electronic device 402 can be detected by one or more motions sensors (such as an IMU sensor).

FIG. 4D illustrates an example hierarchal process 440 for field of view determination according to embodiments of the present disclosure. The electronic device 402 can use the hierarchal process 440 (a software flow) for proving location information of a nearby device, such as a target device 410.

Figure 5A:
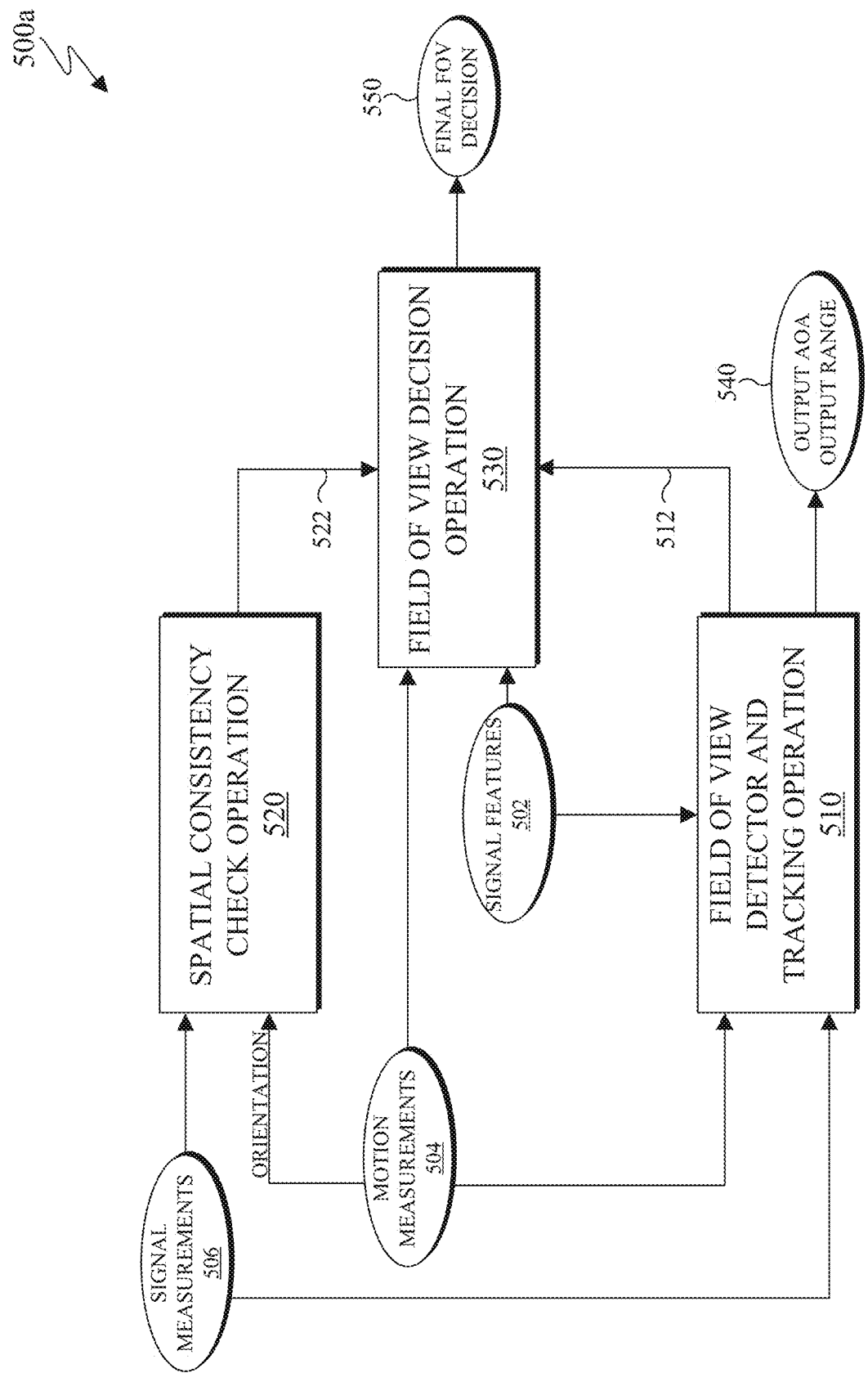
FIGS. 5A, 5B, and 5C illustrate signal processing diagrams for field of view determination according to embodiments of the present disclosure.
Figure 5B:
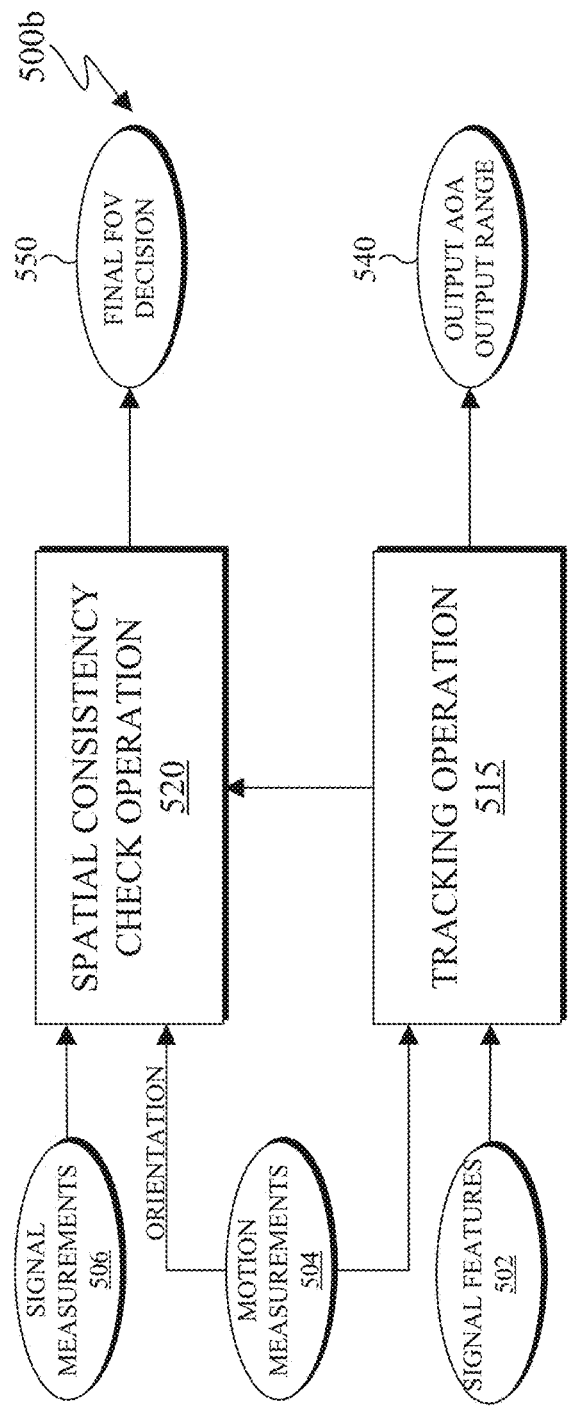
Figure 5C:
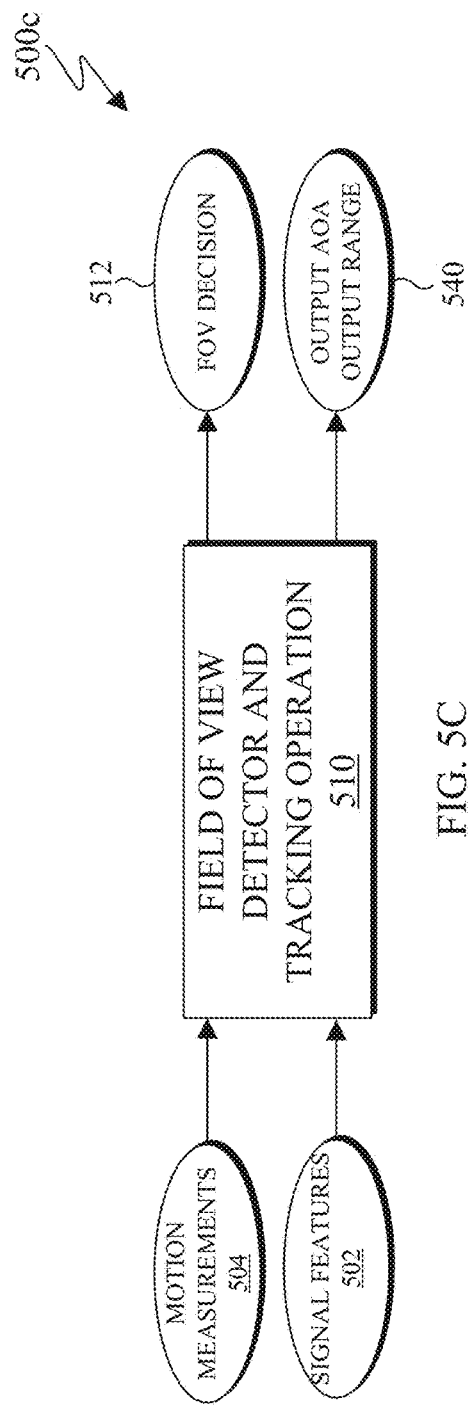

When an application or service 442 (such as the application 262 of FIG. 2 and the application 346 of FIG. 3) is running (executing), the UWB framework 444 supplies range and AoA data via an application programming interface (API). The UWB framework 444 can be similar to the measuring transceiver 270 of FIG. 2. The UWB service layer 446 provides service to UWB framework 444 and manages UWB sessions. There could be multiple application/services 442 and multiple sessions running concurrently in the system with different target devices (such as the target devices 410a and 410b). The UWB service layer 446 can be a post processor for improving the UWB measurement obtained from hardware abstraction layer (HAL) 448 for UWB sessions. FIGS. 5A, 5B, and 5C, below describe various post processors that can be included in the UWB service layer 446.

FIGS. 5A, 5B, and 5C illustrate example signal processing diagrams 500a, 500b, and 500c, respectively, for field of view determination according to embodiments of the present disclosure. In certain embodiments, the signal processing diagrams 500a, 500b, and 500c, can be performed by any one of the client device 106-114 or the server 104 of FIG. 1, the electronic device 402 of FIGS. 4A, 4B, 4C, and 4D, and can include internal components similar to that of electronic device 200 of FIG. 2 and the electronic device 301 of FIG. 3.

As discussed above, post processing can be performed to improve the quality of measurements received from transceivers and output a FoV decision regarding the target device along with smoothed range and AoA. FIGS. 5A, 5B, and 5C describe various signal processing diagrams for improving the quality of measurements received from transceivers and determining whether a target device is within the FoV of the electronic device.

As illustrated in FIG. 5A, the signal processing diagram 500a includes a FoV detector and tracking operation 510 (FCT operation 510), a spatial consistency check (SCC) operation 520, and a FoV decision operation 530. The signal processing diagram 500a uses complementary components (FCT operation 510, a SCC operation 520) that arrive at FoV decision independently. For example, the FCT operation 510 may be unable to distinguish whether the target device 410 is in front of (or behind) the electronic device 402. Therefore, the SCC operation 520 complements in this functionality by correlating the measurement with the motion of the electronic device since the SCC operation 520 is better able to determine whether the target device is in FoV or out-of-FoV when there is sufficient motion of the electronic device.

The definitions of FoV for the SCC operation 520 and the FCT operation 510 may be same or may be different. For example, when the FoV definitions for the SCC operation 520 and the FCT operation 510 are different (and assuming the boresight in FIG. 4A is 0°), the FoV definition of the SCC operation 520 can be from −90° to +90°, whereas the FoV definition of the FCT operation 510 can be from −60° to +60°.

The outputs of the FCT operation 510 (such as the output 512), a SCC operation 520 (such as the output 522) can be the probability of the target device 410a being in the FoV of the electronic device 402. For example the FCT operation 510, a SCC operation 520 can output a binary value (e.g., +1, −1) indicating whether or not the target device 410a is in FoV of the electronic device 402 along with a confidence value, or any other metric or measure that indicates whether or not the target device 410a is in the FoV of the electronic device 402. In certain embodiments, the binary value of positive one (+1) indicates that the target device (such as the target device 410a) is in FoV of the electronic device 402. Similarly, the binary value of negative one (−1) indicates that the target device (such as the target device 410b) is outside the FoV of the electronic device 402.

In certain embodiments, the signal processing diagram 500a uses UWB and motion measurements to predict if the target device 410a is in a certain FOV of the electronic device 402 using SCC operation 520 and fusion of signal (UWB) measurements 506 and motion measurements 504. The signal processing diagram 500a also uses measurements for FoV classifier and tracking and combines the decision of the two to predict whether the presence of target device is in the electronic device's FoV and provide a confidence measure. Additionally, the signal processing diagram 500a fuses the predictions of (i) the FoV classifier and tracking to of the FCT operation 510 and (ii) the SCC operation 520 to make a final decision about the presence of a target in the device's field of view. The FCT operation 510 is described in greater detail in FIG. 6 below. The SCC operation 520 is described in greater detail in FIG. 13A below. The FoV decision operation 530 is described in greater detail in FIG. 14 below.

FIG. 5B illustrates the signal processing diagram 500b. The signal processing diagram 500b is similar to the signal processing diagram 500a, except the FCT operation 510 is replaced with a tracking operation 515. That is, the signal processing diagram 500b does not perform FoV detection using classifiers or machine learning.

FIG. 5C illustrates the signal processing diagram 500c. The signal processing diagram 500c is similar to the signal processing diagram 500a, except the SCC operation 520 is omitted.

Additionally, the signal processing diagrams 500a, 500b, and 500c describe methods to track the location of the target device using measurements based on one or more tracking filters.

The signal processing diagrams 500a, 500b, and 500c receive signal features 502, motion measurements 504 and signal measurements 506. The signal features 502 includes features (such as UWB features) based on the received signals that are communicated between the electric device and the target device. The signal features 502 can be derived from the signal measurements 506. In certain embodiments, the signal features 502 are detected and identified by the electronic device 402 itself. In other embodiments, the signal features 502 are received from the electronic device where the signals were received. For example, if a remote server includes the signal processing diagram 500a, then the remote server receives the signal features 502 from the electronic device, where signals were received.

Figure 7:
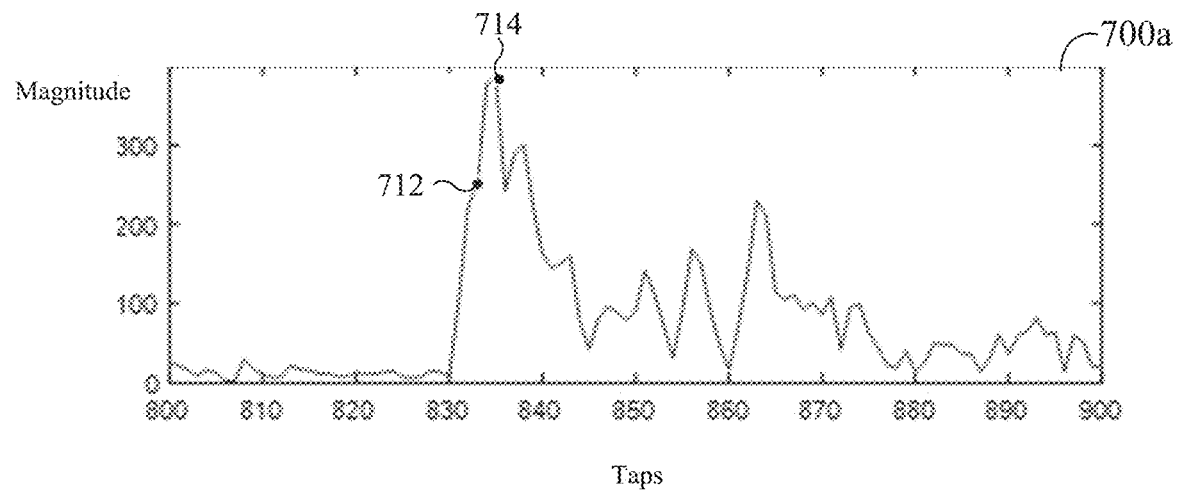
FIG. 7 illustrates example channel impulse response (CIR) graphs for an initial FoV determination according to embodiments of the present disclosure.
Figure 7:
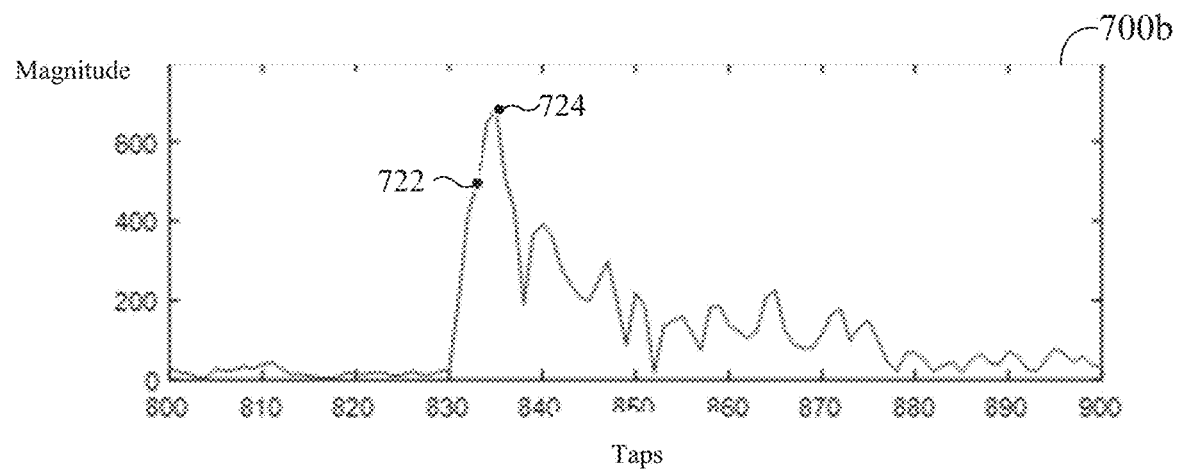

The features of the signal features 502 can be derived from CIR. Example features can include, but are not limited to: signal-to-noise ratio (SNR) of the first peak (in dB, in linear domain or with other relative strength indicator) from the CIR, SNR of the strongest peak (in dB, in linear domain or with other relative strength indicator) from the CIR, difference between the SNR of strongest and first peak (in dB, in linear domain or with other relative strength indicator), received signal strength (in dB or dBm), and the time difference between the first and strongest peak (in nsec, number of time samples or other time based metrics). FIG. 7 illustrates CIR graphs 700a and 700b depicting the first peak and the strongest peak.

The motion measurements 504 are based on detected motion of the electronic device. The motion measurements can also include orientation of the electronic device. In certain embodiments, the motion measurements 504 are detected and quantified by the electronic device itself, such as by an IMU sensor (similar to the sensor 265 of FIG. 2 and the sensor module 376 of FIG. 3). In other embodiments, the motion measurements 504 are received from the electronic device where the motion was detected. For example, if a remote server includes the FoV detector and tracking operation 510, then the remote server receives the motion measurements 504 from the electronic device, where motion measurements were detected.

The signal measurements 506 includes measurements (such as range measurements and AoA measurements) based on the received signals that are communicated between the electric device and the target device. For example, the signal measurements 506 include range (e.g., in meters, centimeters or other distance based metrics) and AoA (e.g., in degrees, radians or other angle based metrics) measurements. In certain embodiments, the signal measurements 506 are detected and identified by the electronic device 402 itself. In other embodiments, the signal measurements 506 are received from the electronic device where the signals were received. For example, if a remote server includes the signal processing diagram 500a, then the remote server receives the signal measurements 506 from the electronic device, where signals were received.

The FCT operation 510 determines whether the target device is in the FoV of the electronic device based on signal features 502, motion measurements 504, and signal measurements 506. The FCT operation 510 also generates a confidence score indicating a level of confidence of the decision of whether the target device is in the FoV of the electronic device. Additionally, the FCT operation 510 performs a smoothing operation on the range and AoA measurements of the signal measurements 506. In certain embodiments, the FCT operation 510 uses deterministic logic or machine learning based classification technique, such as Support Vector Machine (SVM), with features derived from signal measurements 506 and/or motion measurements 504 for FoV detection and classification. The FCT operation 510 is described in in greater detail in FIG. 6.

The SCC operation 520 performs a spatial consistency check to determine whether the target device is in the FoV of the electronic device based on motion measurements 504 and signal measurements 506. In certain embodiments, the SCC operation 520 checks the spatial consistency of the device rotation and UWB measurements from the target to generate a FoV decision (output 522). The SCC operation 520 fuses the information from the orientation (Ori) of the electronic device obtained from the motion sensor (IMU), via the motion measurements 504 and the AoA obtained from the signal measurements 506. By fusing orientation of the electronic device with AoA information, enables the SCC operation 520 to check the consistency of measurements between different sensors based on device's relative trajectory of motion to the target device and determine whether the target device is within FOV of the electronic device.

An object's orientation describes its rotation relative to a coordinate system, in three dimensions. The orientation of the electronic device provides information on the heading direction of the device. Orientation information is obtained as yaw, pitch and roll in degrees as illustrated in FIG. 4C.

In certain embodiments, yaw is used in the SCC operation 520. However, utilization of either pitch or roll, or a combination of any of the orientation parameters to check the spatial consistency can be used. Utilization of other measurements from the motion sensor or UWB signals can also be used by the SCC operation 520. The SCC operation 520 is described in in greater detail in FIG. 13.

The signal processing diagrams 500a, 500b, and 500c generate an output 540 and a final FoV decision 550. The FCT operation 510 generates the output 540. The output 540 can include smoothed range (in meters, centimeters or other distance based metrics). The output 540 can also include the smoothed AoA (in degrees, radians or other angle based metrics). FIGS. 10A, 10B, 10C, and 10D describe the tracking filter operation of the FCT operation 510 in greater detail.

The final FoV decision 550 is generated by the FoV decision operation 530 and represents the final FoV determination. The final FoV decision 550 indicates whether the target deice is in FoV or out of FoV of the electronic device based on the FCT operation 510, the SCC operation 520, or a combination thereof. For example, the FoV decision operation 530 combines the output 512 of the FoV detector and tracking operation 510 and the output 522 of the SCC operation 520 to generate the final FoV decision 550, specifying whether the target device is in FoV or out-of-FoV of the electronic device.

Figure 6A:
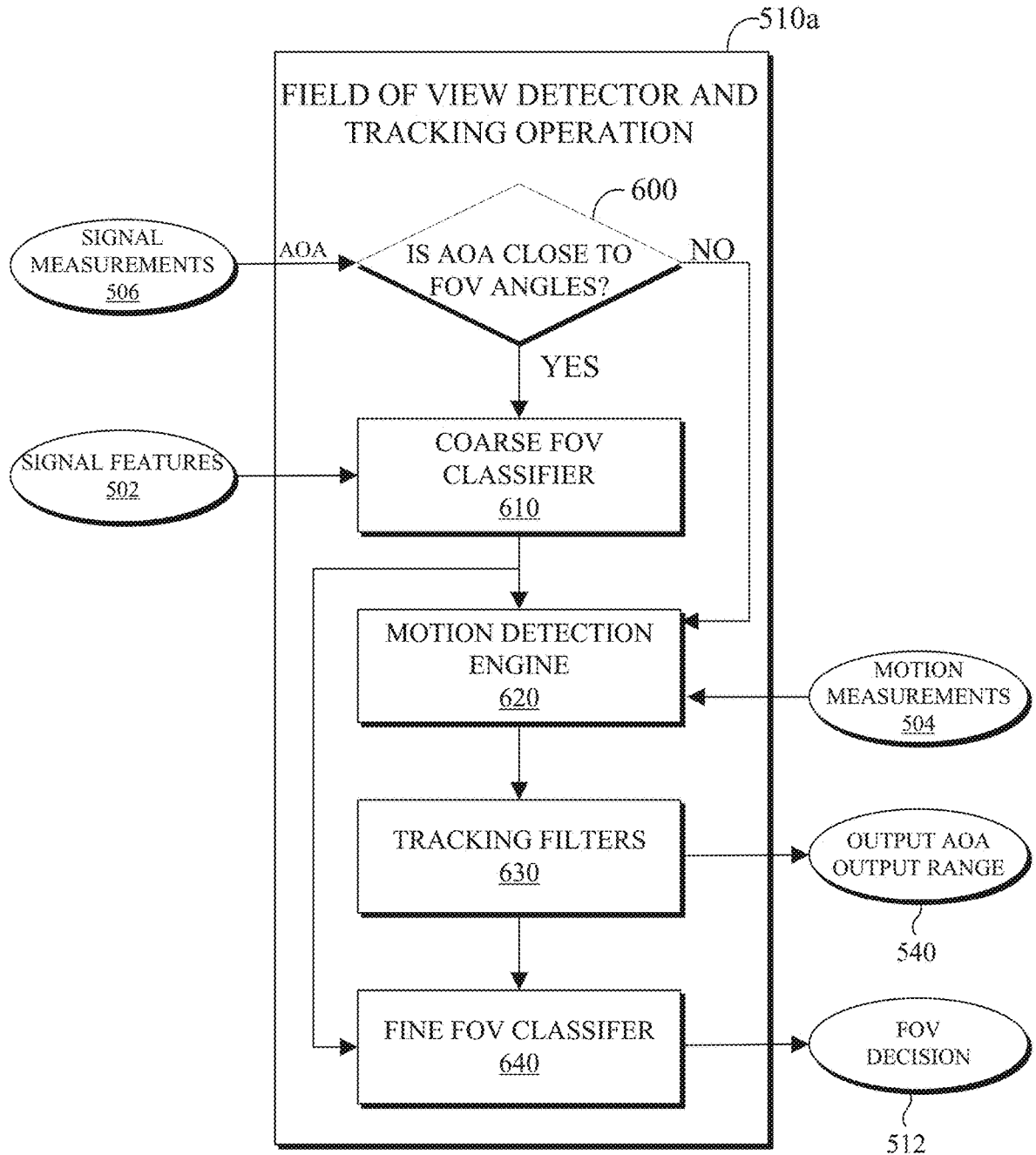
FIGS. 6A, 6B, and 6C illustrate example block diagrams of the FoV and tracking operation of FIGS. 5A and 5C according to embodiments of the present disclosure.
Figure 6B:
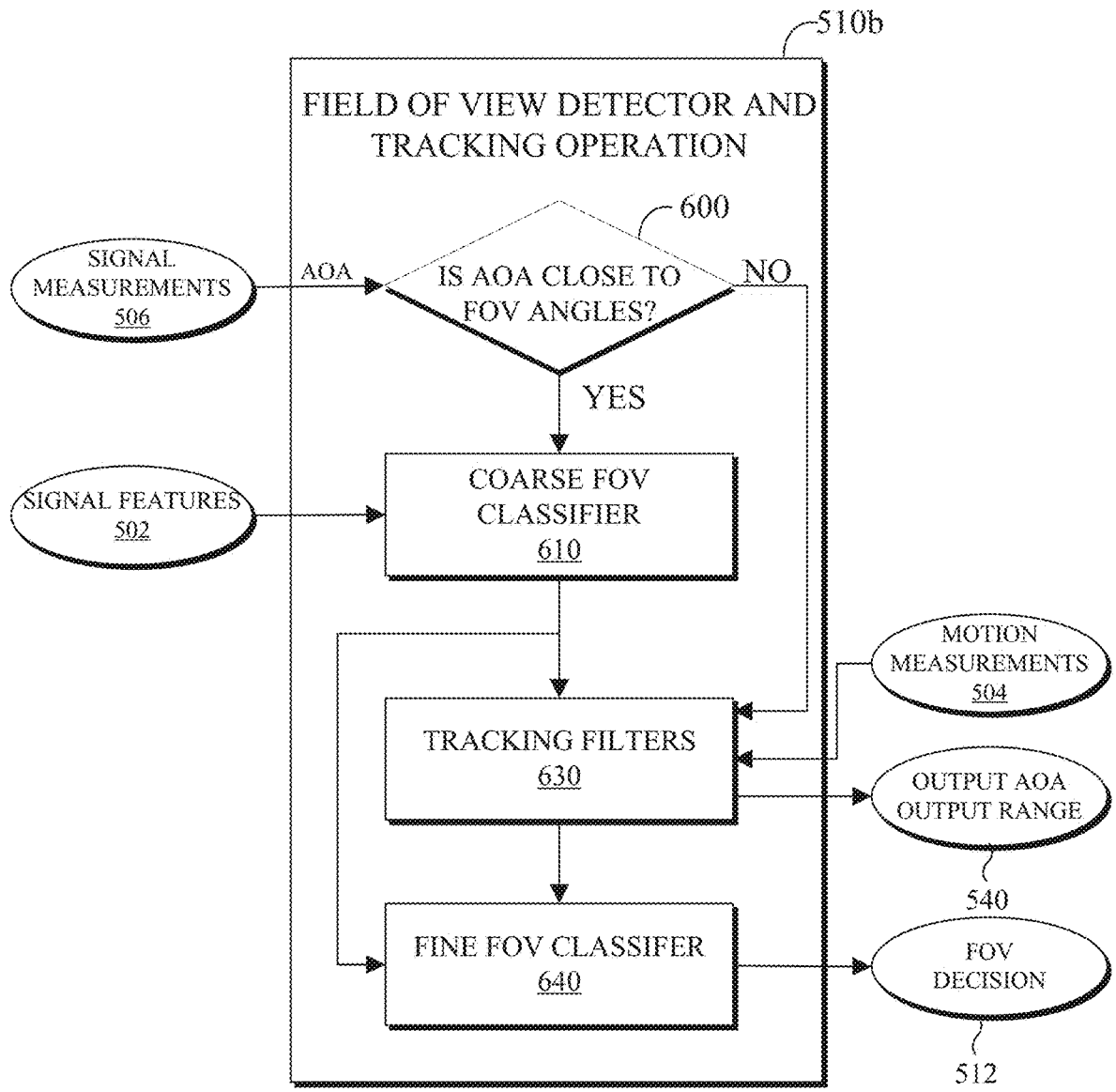
Figure 6C:
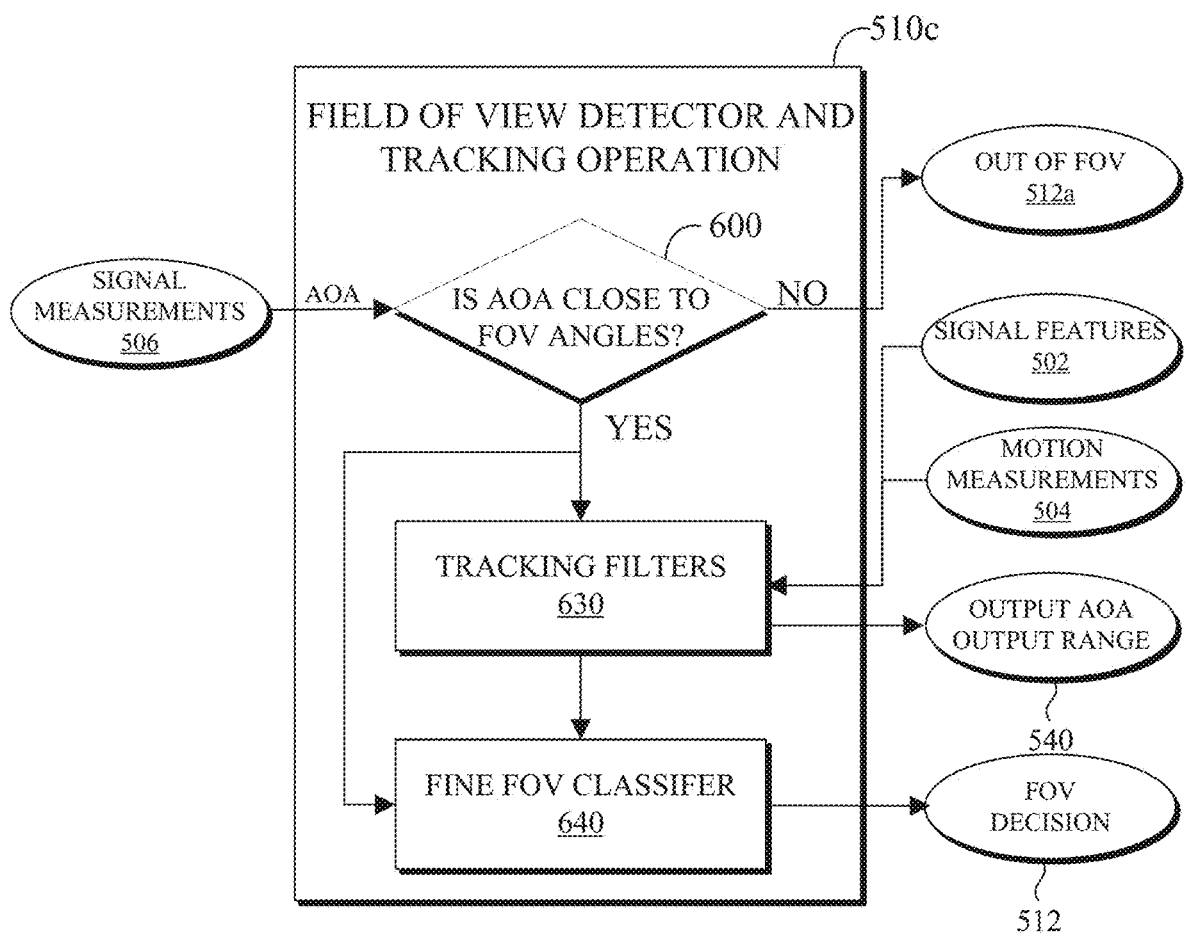

FIGS. 6A, 6B, and 6C illustrate example block diagrams of the FCT operation 510 of FIGS. 5A and 5C according to embodiments of the present disclosure. FIGS. 6A, 6B, and 6C illustrate different embodiments of the FCT operation 510. For example, FIG. 6A illustrates the FoV detector and tracking operation 510a, FIG. 6B illustrates the FoV detector and tracking operation 510b, and FIG. 6C illustrates the FoV detector and tracking operation 510c, which are collectively referred to as the FCT operation 510.

As illustrated in FIG. 6A, FoV detector and tracking operation 510a includes an AoA filter 600, a coarse FOV classifier 610, a motion detection engine 620, a tracking filter operation 630, and a fine FoV classifier 640. In certain embodiments, if a motion sensor is not available (such as when the electronic device 200 does not include a sensor 265), then the motion detection engine 620 can be omitted such as illustrated by FOV detector and tracking operation 510b operation of FIG. 6B and the FoV detector and tracking operation 510c of FIG. 6C. In certain embodiments, the coarse FOV classifier 610 and the motion detection engine 620 can be omitted as illustrated by FoV detector and tracking operation 510c operation of FIG. 6C.

The FoV detector and tracking operation 510a, 510b, and 510c receive signal features 502 (such as UWB features), motion measurements 504 (such as motion of the electronic device), and signal measurements 506 (such as range measurements and AoA measurements). The FCT operation 510 generates the output 540 (smoothed/filtered range and AoA measurements) and an output 512 or an output 512a of FIG. 6C (the FoV decision).

The output 540 includes smoothened range (e.g., in meters, centimeters or other distance based metrics) and AoA (e.g., in degrees, radians or other angle based metrics). The output 512 is an FoV decision specifying whether a target device lies in FoV of the electronic device. In certain embodiments, the rate of input (such as the signal feature 502, the motion measurement 504 and the signal measurements 506) and output (such as the output 540 and the output 512 and 512a) of the FCT operation 510 can be the same as the rate of ranging measurements. For example the rate of the ranging measurements (which may occur every 0.1 seconds) can be the same rate that the output is generated.

The AoA filter 600 represents an input gate to the FCT operation 510. For example, the AoA filter 600 initially filters out the measurements with AoA reports outside the desired FoV angles. In certain embodiments, the AoA filter 600 filters (gating) the input AoA values, letting values within the predefined range to proceed to the coarse FoV classifier 610. In other embodiments, the AoA filter 600 stores several AoA values in a buffer. The AoA filter 600 then uses current AoA values, past AoA values, or both, to evaluate a conditional function to arrive at a decision. The buffer can be sized to store one or more entries. For example, the AoA filter 600 receives AoA information from the signal measurement 506 and determines whether AoA information indicates that one or more AoA values are within a predefined range of FoV angles. For example, the AoA filter 600 can compare the absolute value of the AoA value to the predefined range of FoV angles, as described in Equation (1), below.

$$|AoA| < \theta_{FoV} \quad (1)$$

When the AoA filter 600 determines that one or more AoA values are within the predefined range of FoV angles, then the FoV detector and tracking operation 510a and 510b, of FIGS. 6A and 6B, proceeds to the coarse FoV classifier 610. Similarly, when the AoA filter 600 determines that one or more AoA values are within the predefined range of FoV angles, then the FoV detector and tracking operation 510c of FIGS. 6C, proceeds to the tracking filter operation 630.

Alternatively, when the AoA filter 600 determines that one or more AoA values are not within the predefined range of FoV angles, then the FoV detector and tracking operation 510a, of FIG. 6A, proceeds to the motion detection engine 620 of FIG. 6A. Similarly, when the AoA filter 600 determines that one or more AoA values are not within the predefined range of FoV angles, then the FoV detector and tracking operation 510b, of FIG. 6B, proceeds to the tracking filter operation 630 of FIG. 6B. Additionally, when the AoA filter 600 determines that one or more AoA values are not within the predefined range of FoV angles, then the FoV detector and tracking operation 510c, of FIG. 6C, generates a output 512a indicating that the target device is out of the FoV of the electronic device.

The coarse FOV classifier 610, of FIGS. 6A and 6B, detects whether the target device is in the front of the electronic device (angles truly around the boresight are termed as 'true boresight'). Similarly, the coarse FoV classifier 610 detects whether the target device is behind the electronic device (angles not truly around the boresight, are termed as 'false boresight'). Any predefined range of values around the boresight can be defined as "true boresight," such as [−40, 40].

The coarse FoV classifier 610 receives signal features 502 and signal measurements 506 for determining whether the target device is in the true boresight the electronic device. For example, the coarse FoV classifier 610 using range (distance), AoA, and other CIR features, can determine whether target device is in true boresight of the device. If the coarse FOV classifier 610 determines that the target is in the true boresight of the electronic device, then the coarse FoV classifier 610 can subsequently determine that the target device is within the FoV of the electronic device. Alternatively, if the coarse FOV classifier 610 detects that the target device is in false boresight of the electronic device, then coarse FOV classifier 610 can subsequently determine that the target device is not within the FoV of the electronic device.

That is, the coarse FOV classifier 610 performs a classification (or prediction) operation indicating whether the target device is in the FoV of the electronic device. The coarse FoV classifier 610 performs an initial FoV or out-of-FoV classification (or prediction) about the target device based on the signal features 502 and signal measurements 506 (including the UWB features). In certain embodiments, the coarse FOV classifier 610 uses UWB measurements and features which include range and AoA along with other CIR features. In certain embodiments, the coarse FoV classifier 610 includes multiple initial FOV classifiers.

In certain embodiments, the coarse FoV classifier 610 uses (i) deterministic logic, (ii) a classical machine learning classifier, (iii) a deep learning classifier, or (iv) a combination thereof to generate an initial prediction of a presence of the target device relative to a FOV of the electronic device. In certain embodiments, the classification of the coarse FOV classifier 610 labels the target device as in 'FoV' or 'out-of-FoV' of the electronic device based on the input 502. The classifiers that can be used in the coarse FOV classifier 610 include, but are not limited to, K-Nearest Neighbors (KNN), Support Vector Machine (SVM), Decision Tree, Random Forest, Neural Network, Convolutional Neural Network (CNN), Long Short Term Memory (LSTM), and the like.

Training data for the classifier of the coarse FoV classifier 610 can be collected by obtaining multiple measurements between the electronic device and the target device in FoV and out-of-FoV in both LOS and NLOS scenarios. To add variation to the training data, measurements can be taken at different ranges between the electronic device and the target device up to a maximum usable range. Also, the environment of data collection can be varied. For example, the training data can be collected in an open space environment or in a cluttered environment prone to multipath. Additional variations can also be added to the training data such as by changing the tilting angle of the electronic device, the target device, or both devices. Similarly, the training data can include further variations such as by rotating the target device at different angles. The measurements can be labeled as per the application depending on which scenario or setup is required to be labeled as FoV and which one is supposed to be out-of-FoV.

In certain embodiments, the measurements for which the AoA values lie within the desired FoV can be used for training. These measurements can be labeled as per the application depending on which scenario or setup is required to be labeled as FoV or true boresight and which one is supposed to be out-of-FoV or false boresight. Additionally, in some instances (such as in a two-step classification method described below in FIG. 8), some measurements obtained for the training data can be labeled as "LOS" and other measurements can be labeled as "NLOS."

In certain embodiments, signal features 502 and signal measurements 506 are used by the coarse FOV classifier 610 for classical machine learning. The signal measurements 506 include statistics, such as the mean and variance, on the range measurements and raw AoA measurements. The signal features 502 include features from CIR of the wireless channel between the electronic device and the target device.

For example, FIG. 7 illustrates example CIR graphs 700a and 700b for an initial FoV determination according to embodiments of the present disclosure. In certain embodiments, the CIR graphs 700a and 700b can be created by any one of the client device 106-114 or the server 104 of FIG. 1 and can include internal components similar to that of electronic device 200 of FIG. 2 and the electronic device 301 of FIG. 3.

The CIR graphs 700a and 700b of FIG. 7 represent CIR plots from two different antennae of the electronic device. For example, the CIR graph 700a represents the CIR from one antenna of an electronic device and the CIR graph 700b represents the CIR from another antenna of the same electronic device. The CIR graphs 700a and 700b show the signal power vs. tap index of a received signal. The range and AoA measurements can be calculated based on the earliest peak with sufficient SNR in the CIR plot.

The features derived from the CIR graphs 700a and 700b can be used to classify, via an initial prediction (via the coarse FoV classifier 610) of whether target device is in a FoV of the electronic device. The CIR features of the signal features 502 can include (i) absolute strength of one or multiple peaks in CIR, normally represented by SNR, (ii) difference in signal strength among multiple peaks in CIR, normally represented by SNR, (iii) time differences between multiple peaks in the CIR, (iv) phase relationship among multiple antennas used to generate the AoA information, (v) other features derived from the amplitude and phase around the peaks, and the like.

In certain embodiments, various feature vectors can be included in the signal features 502. The coarse FoV classifier 610 then uses the feature vectors from the signal features 502 for generating the initial prediction of whether the target device is within the FOV of the electronic device.

For example, if the distance of testing data or during operation falls beyond the distance for which a classifier was trained, the input UWB features SNR First and SNR Main can be adjusted by proportionally increasing or decreasing their respective values based on the reported range.

For another example, Equations (2)-(7) describe different schemes of feature vectors of the signal features 502 can be used for FoV classification. Other orderings of the features in the feature vectors are also possible.

$$\text{Feature Vector}=[\text{var(range)}, \text{var}(AoA+Ori), \text{var(SnrFirst)}, \min(\text{SnrMain}_1-\text{SnrFirst}_1,\text{SnrMain}_2-\text{SnrFirst}_2,),\text{ToaGap},\text{SnrFirst},AoA] \quad (2)$$

$$\text{Feature Vector}=[\text{var(range)}, \text{var}(AoA-Ori), \text{var(SnrFirst)},\text{SnrMain}_1-\text{SnrFirsty},\text{SnrFirst}_1,\text{ToaGap},AoA] \quad (3)$$

$$\text{Feature Vector}=[\text{SnrFirst},\text{SnrMain},\text{ToAGap},AoA] \quad (4)$$

$$\text{Feature Vector}=[\text{SnrFirst},\text{SnrMain},\text{ToAGap},AoA,\text{RSSI}] \quad (5)$$

$$\text{Feature Vector}=[\text{var(range)}, \text{var}(AoA-Ori), \text{var(SnrFirst)},\text{SnrFirst},\text{SnrMain},\text{ToaGap},AoA] \quad (6)$$

$$\text{Feature Vector}=[\text{SnrFirst},\text{SnrMain}-\text{SnrFirst},AoA] \quad (7)$$

The feature SNRFirst corresponds to the first peak strength 712 (or the first peak strength 722) of FIG. 7 and the feature SNRMain corresponds to the strongest peak strength 714 (or the strongest peak strength 724) of FIG. 7. The feature ToaGap is the difference between first peak strength 712 and strongest peak strength 714. If the electronic device is equipped with a single antenna or is operating with only a single antenna, then the AoA measurements cannot be measured and only a single CIR graph would be generated.

Features that provide useful information for classifying FoV include received signal strength indicator (RSSI), CIR features from different receiver antennas including, but not limited to, SNRFirst, SNRMain and ToaGap. It is noted that AoA can be estimated based on the phase difference from multiple antennas. The aforementioned features correspond to an antenna of the device. If the measurement from multiple antennas for the features are present, each of those features can be obtained from either the same antenna or it can be a function of these CIR features obtained from different antennae. The antenna from which each of those features is used depends on the corresponding hardware characteristics as suitable for classification.

The feature described in Equation (2) includes (i) the first peak strength (SNRFirst), (ii) minimum of the difference between strongest peak strength (SNRMain) and first peak strength among the two antennas, (iii) AoA, (iv) variance of AoA compensated with orientation over a sliding window, (v) variance of the range (distance) measurement over a sliding window, (vi) time difference between the strongest peak and the first peak (ToaGap), and (vii) the variance of the first peak strength (SNRFirst) over a sliding window are used as the features for FoV classification. It is noted that $\text{SNRFirst}_i$, $\text{SNRMain}_i$ are the CIR features obtained from antenna i.

The feature of variance of AoA compensated with orientation over a sliding window can also be identified as var(AoA+Ori) or var(AoA−Ori) depending on the relative definitions of positive AoA and Orientation directions. In certain embodiments, metrics such as Pearson's correlation, covariance or any other metric that captures the relative variation of AoA and Orientation can also be used. Additionally, other ordering of the features in the feature vector is possible. For example, if the window size is T, a buffer is maintained that stores previous T measurements of the features over which the variance is calculated and used in the feature vector. In certain embodiments, other metrics that can measure the spread of the features can also be used instead of variance.

There are several ways in which certain features from the signal feature 502 (such as the SNRFirst, SNRMain, ToaGap, and the like) can be used by the coarse FOV classifier 610 to predict when the target device is in FoV of the electronic device. For example, when a direct signal path between the electronic device and the target device exists (such as under a LOS or in FoV scenario), SNRFirst and SNRMain are close and ToaGap is near-zero. In contrast, in NLOS or out-of-FoV scenario, the first peak strength 712, representing the direct signal path, is likely to be of lower magnitude and far from the strongest peak strength 714, which represents the reflected signal path. Therefore, in the NLOS or out-of-FOV scenario SNRFirst is likely smaller than SNRMain and ToaGap is likely to be large. In the cases when the signal quality is bad, the first peak strength 712 the strongest peak strength 714 are susceptible to drifting and likely to have smaller magnitude, thus the difference between SNRFirst and SNRMain, as well as the ToaGap are good indicators of whether the target device is in the FoV of the electronic device.

Equation (7) describes the feature vector represented by a first peak strength 712 (denoted as SNRFirst), a difference between strongest peak strength 714 (SNRMain) and first peak strength 712, and AoA.

The features discussed above provide indications of whether the target device is in or out of FoV of the electronic device 402. For example, these features vary significantly based on whether the target device 410 is inside FoV or outside FoV. Similarly, these features vary significantly based on whether the target device 410 is inside LOS and outside LOS. Therefore, these features are advantageous in determining a stable and accurate decision boundary between FoV and out-of-FOV scenarios, and between LOS and NLOS scenarios.

In certain embodiments, the coarse FoV classifier 610 includes an SVM classifier for classifying the target device in FoV or out-of-FOV using a feature vector of Equation (2). Additionally, the coarse FoV classifier 610 includes an SVM classifier with a Gaussian kernel for classifying the target device in FoV or out-of-FoV using a feature vector of Equation (2).

SVM training involves finding a hyperplane in the N-dimensional feature space that can separate the data points in the two classes. For a data point $x_i$, if $y_i \in \{1, -1\}$ represents the corresponding label, with a positive label representing FoV (true boresight) and a negative label representing out-of-FoV (false boresight). The optimization problem of SVM is defined as shown in Equation (8), such that Equations (9) and (10) are satisfied.

$$\min_{w,b,\xi} \frac{1}{2} w^T w + C \sum_i \xi_i \tag{8}$$

$$y_i(w^T \phi(x_i)+b) \geq 1-\xi_i, \text{ for all } i \tag{9}$$

$$\xi_i \geq 0, \text{ for all } i \tag{10}$$

Here, C>0 represents the penalty on the error term and $\phi(x_i)$ is the projection of data point $x_i$ to a higher dimensional space.

One way of solving this minimization problem is by solving the following dual problem of Equation (11), such that Equations (12) and (13) are satisfied.

$$\max_{\lambda \geq 0} -\frac{1}{2} \sum_i \sum_j \lambda_i \lambda_j y_i y_j \phi(x_i)^T \phi(x_j) + \sum_i \lambda_i \tag{11}$$

$$\sum_i \lambda_i y_i = 0 \tag{12}$$

$$0 \leq \lambda_i \leq C, \text{ for all } i \tag{13}$$

If training data in the positive and negative classes are not balanced, the error between the two classes can be evenly distributed by using a different penalty for positive and negative class and modifying the minimization problem as shown in Equation (14), such that Equations (15) and (16) are satisfied. For example, if the data in the two classes is not balanced, then the error between two classes is evenly distributed by penalizing the two classes by a value that is inversely proportional to the amount of data in the class. One example is to use the penalty values as shown in Equation (17).

$$\min_{w,b,\xi} \frac{1}{2} w^T w + C_+ \sum_{i:y_i=1} \xi_i + C_- \sum_{i:y_i=-1} \xi_i \tag{14}$$

$$y_i(w^T \phi(x_i)+b) \geq 1-\xi_i, \text{ for all } i \tag{15}$$

$$\xi_i \geq 0, \text{ for all } i \tag{16}$$

$$C_+ = \frac{C}{\#\text{Positive class data}}, C_- = \frac{C}{\#\text{Negative class data}} \tag{17}$$

In certain embodiments, if the true boresight/FoV features in LOS and NLOS are highly distinct, then the coarse FOV classifier 610 could use a multi-class classifier that can distinguish between the following classes (i) LOS FoV (also referred to as LOS true boresight), (ii) NLOS FoV (also referred to as NLOS true boresight), (iii) LOS out-of-FoV (also referred to as NLOS false boresight), and (iv) NLOS out-of-FoV (also referred to as NLOS False boresight).

Figure 8:
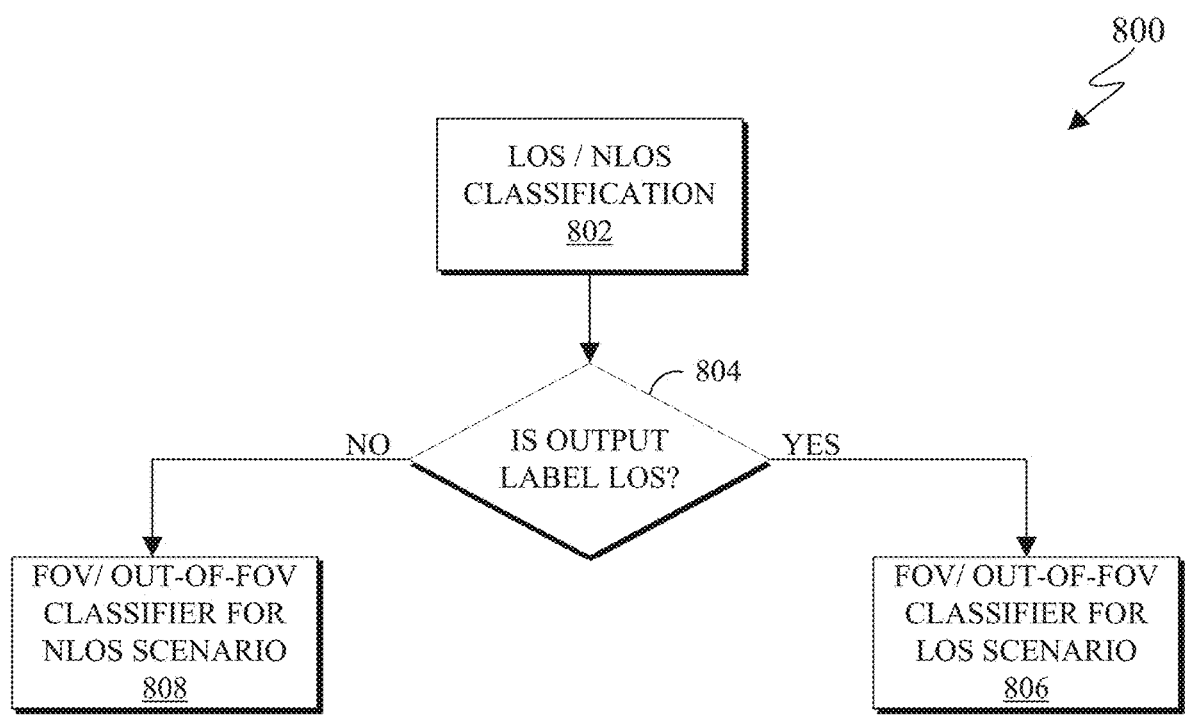
FIG. 8 illustrates example method for selecting a classifier for an initial FoV determination according to embodiments of the present disclosure.

In certain embodiments, the coarse FoV classifier 610 uses a multi-class classifier to label the target device 410. In this embodiment, a classifier initially labels the scenario to be LOS or NLOS. After labeling the scenario as LOS or NLOS, a classifier trained in that particular scenario labels the target device as either in true boresight or false boresight. In this example, there are 3 different classifiers, the first classifier is for LOS/NLOS detection, the second classifier for true/false boresight detection in LOS scenario and the third for true/false boresight detection in NLOS scenario. This is illustrated in FIG. 8, and described in greater detail below.

In certain embodiments, if out-of-FoV data is not available or not sufficient for training, then a one-class classifier can be trained using just the FoV data, such as a Support Vector Data Description (SVDD) classifier.

In certain embodiments, the coarse FOV classifier 610 uses a sliding window to smooth the output of the classifier and remove outliers. For example, the coarse FOV classifier 610 can label the target device as being within the FoV or out of the FoV and generate a probability (confidence score) associated with the label. The output probability (confidence score) of a class label from a classifier can also be used to remove outliers. The average probability of being in FoV in a window size can be compared against a predefined threshold. If the average probability is greater than the threshold, output is FoV, else it is out-of-FoV. For example, a sliding window can average the output probability and compare the average to a threshold. Based on the comparison, the coarse FoV classifier 610 generates the initial prediction of whether the target device is within the FoV of the electronic device. This is described in FIG. 9A, below. Similarly, the sliding window can average the label and compare the average to a threshold (also referred to as majority voting). Based on the comparison, the coarse FoV classifier 610 generates the initial prediction of whether the target device is within the FoV of the electronic device. This is described in FIG. 9B, below. For example, given a certain window size, if the number of samples where the output of the classifier is FoV is greater than the number of samples where the output is out-of-FoV, the majority voting output is FoV, otherwise it is out-of-FoV. That is, by averaging the probability, the label, or both, removes outliers and smooths the final result of the coarse FOV classifier 610.

The FCT operation 510 of FIG. 6A also includes the motion detection engine 620. If the electronic device 402 is equipped with a motion sensor (such as a motion sensor that is included in the sensor module 376 of FIG. 3 or a motion sensor that is included in the sensor 265 of FIG. 2), information about the motion and orientation change of the device from this sensor can be used but both the motion detection engine 620 and the tracking filter operation 630 to further improve the quality of range and AoA measurements.

Sufficiently large or drastic changes in device's motion is continuously checked using the motion measurements 504 from a motion sensor. The motion sensor can include one or more of gyroscope, accelerometer, magnetometer (inertial measurement unit), and the like. A reset operation can be performed when a sufficiently large or drastic motion is detected.

The motion detection engine 620 determines whether motion of the electronic device that exceeds a threshold is detected. When the motion detection engine 620 determines that motion exceeded a threshold, then the motion detection engine 620 can initiate a reset. For example, the motion detection engine 620 monitors measurements from a motion sensor (such as one or more of gyroscope, accelerometer, magnetometer, inertial measurement unit, and the like) of the electronic device. The motion detection engine 620 can initiate a reset operation when a detected motion exceeds a threshold. For example, a sudden motion can cause the tracking filter operation 630 to drift which takes time for the tracking filter operation 630 to converge again. Therefore, when a detected motion exceeds a threshold, the motion detection engine 620 can initiate a reset operation to reset the one or more tracking filters of the tracking filter operation 630. The motion detection engine 620 ensures that the tracking filter operation 630 uses to the updated state whenever reset is performed. In certain embodiments depending on the magnitude of the motion, the motion detection engine 620 can perform one of two reset types.

Figure 12:
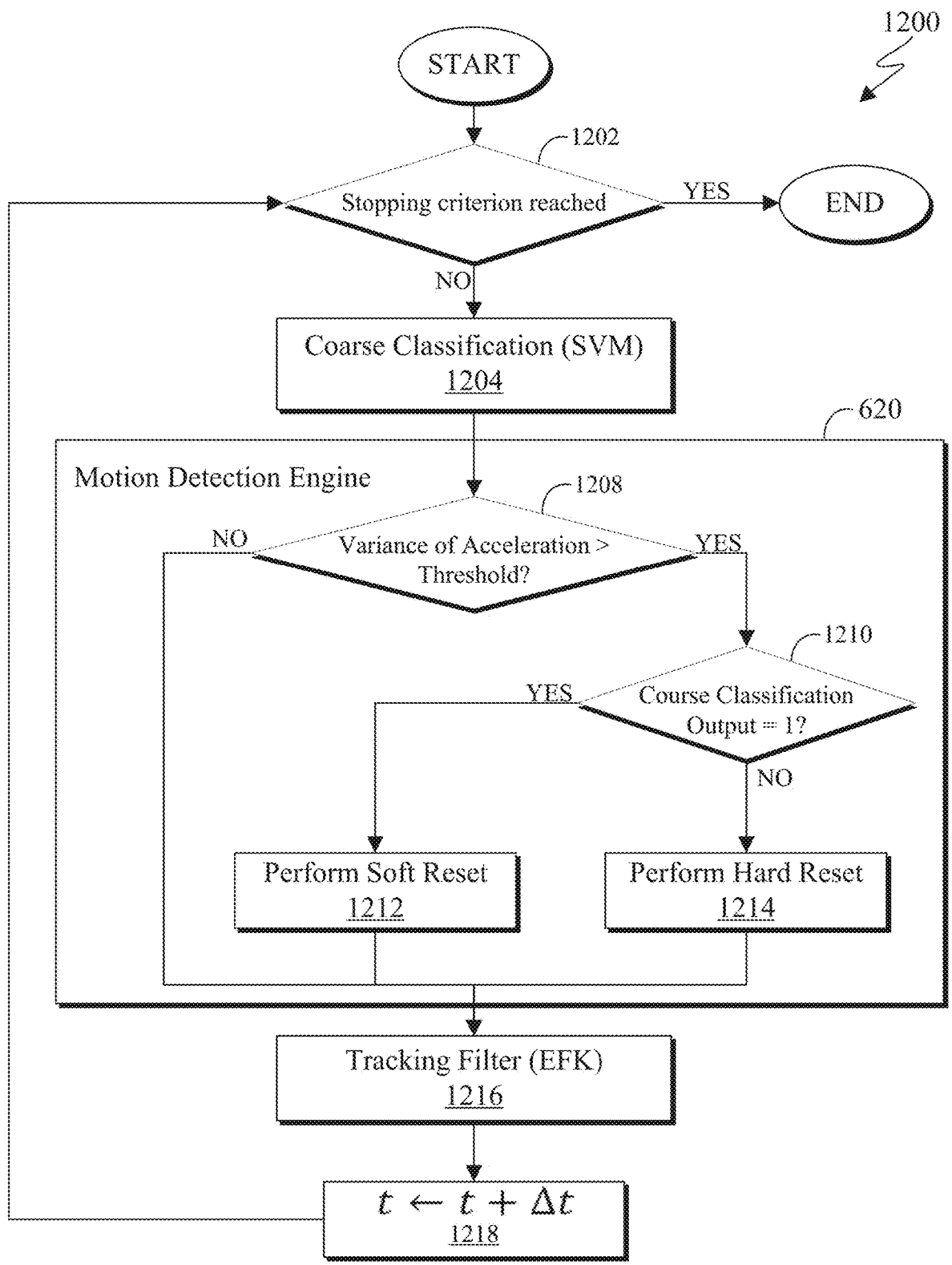
FIG. 12 illustrates an example method for performing a reset due to motion according to embodiments of the present disclosure.

In certain embodiments, the motion detection engine 620 is omitted such as when the electronic device lacks a motion sensor. The FoV detector and tracking operation 510*b* of FIG. 6B and the FoV detector and tracking operation 510*c* of FIG. 6C omit the motion detection engine 620. FIG. 12 describes the motion detection engine 620 in greater detail.

The tracking filter operation 630 is used to smoothen the range and AoA measurements. In certain embodiments, the tracking filter operation 630 tracks the 3D coordinates of the target device 410. The tracking filter operation 630 uses the signal features 502, the motion measurements 504, the signal measurements 506, or a combination thereof as inputs. If the electronic device 402 is equipped with a motion sensor, information about the motion and orientation change of the electronic device 402 from this sensor can be used in the both the coarse FoV classifier 610 and the tracking filter operation 630 to further improve the classification performance, quality of the output 540 (the smoothed range and AoA measurements). In certain embodiments, the FoV decision of the coarse FoV classifier 610 can also be used by the tracking filter operation 630, such as when an out-of-FoV decision is made and/or when there is loss of transceiver measurements. Example tracking filters include a Kalman filter, an extended Kalman filter, a particle filter, and the like. The tracking filter operation 630 generates output 540. In certain embodiments, there can be more than one tracking filter operation 630, each tracking with different hypothesis. The tracking filter operation 630 is described in greater detail below in FIGS. 10A, 10B, 10C, and 10D.

The fine FoV classifier 640 of FIGS. 6A, 6B, and 6C combines the decision from coarse FoV classifier 610 and tracking filter operation 630 and generates the output 512 about the target device 410. The output 512 indicates whether the target device is within the FoV or outside the FoV of the target device. In certain embodiments, the decision of the fine FoV classifier 640 is a numerical value. For example, when the value is one (1) indicates that the target device is within the FoV of the electronic device and when the value is negative one (−1) indicates that the target device is outside (not within) the FoV of the electronic device.

Figure 11:
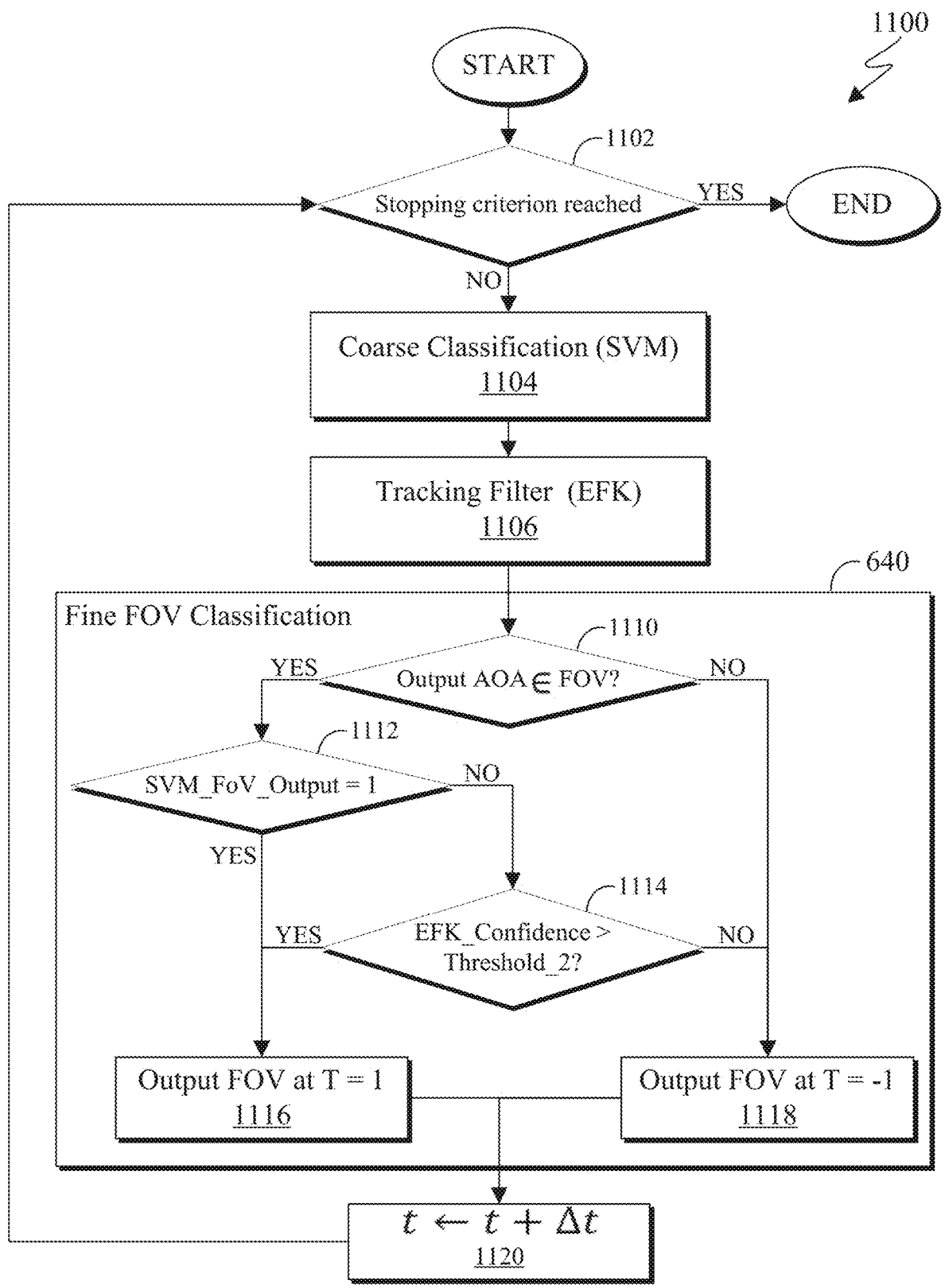
FIG. 11 illustrates an example method for determining whether a target device is within the FoV of an electronic device according to embodiments of the present disclosure.

In certain embodiments, confidence scores from the coarse FOV classifier 610, and the tracking filter operation 630 can be used to obtain a final FOV confidence regarding the FoV decision (output 512). In certain embodiments, the FoV decision of output 512 also includes a FoV confidence indicating the confidence or probability that the target device is in FoV or out of the FoV, as determined by the fine FOV classifier 640. FIG. 11 describes the fine FOV classifier 640 in greater detail.

FIG. 8 illustrates example method 700 for selecting a classifier for an initial FoV determination by the coarse FoV classifier 610 according to embodiments of the present disclosure. The method 800 is described as implemented by any one of the client devices 106-114 of FIG. 1 and can include internal components similar to that of electronic device 200 of FIG. 2 and the electronic device 301 of FIG. 3. However, the method 800 as shown in FIG. 8 could be used with any other suitable electronic device and in any suitable system.

As illustrated in the method 800, a classifier of the coarse FOV classifier 610 initially labels the scenario to be LOS or NLOS. Then another classifier of the coarse FoV classifier 610 that is trained in that particular scenario labels the target to be in FoV or out-of-FoV. That is, as illustrated in the method 800, the coarse FOV classifier 610 uses three different classifiers. The first classifier is for LOS/NLOS detection, the second classifier for FoV/out-of-FoV detection in LOS scenario and the third for FoV/out-of-FOV detection in NLOS scenario.

In step 802, a classifier of the coarse FOV classifier 610 labels the target device as either in LOS or NLOS, based on the signal features 502 and the signal measurements 506. In step 804, the coarse FOV classifier 610 determines whether the classifier in step 802, classified the target device is LOS. When the target device is classified as LOS, then in step 806, the coarse FoV classifier 610 selects a classifier that is trained for LOS scenarios. The selected classifier of step 806 then determines whether the target device is in FoV or out of the FoV of the electronic device. Alternatively, when the target device is classified as NLOS, then in step 808, the coarse FOV classifier 610 selects a classifier that is trained for NLOS scenarios. The selected classifier of step 808 then determines whether the target device is in FoV or out of the FoV of the electronic device.

Although FIG. 8 illustrates an example method, various changes may be made to FIG. 8. For example, while the method 800 is shown as a series of steps, various steps could overlap, occur in parallel, occur in a different order, or occur multiple times. In another example, steps may be omitted or replaced by other steps.

FIGS. 9A and 9B illustrate example moving average filter diagrams 900*a* and 900*b* for an initial FoV prediction according to embodiments of the present disclosure. In certain embodiments, the moving average filter diagrams 900*a* and 900*b* can be used by any one of the client devices 106-114 or the server 104 of FIG. 1.

As illustrated in FIG. 9A, the classifier output 902 represents a probability that the target device 410 is within the FoV at different time intervals as determined by a classifier of the coarse FoV classifier 610. A sliding window moves along the classifier output 902 and averages the probability values within the window. For example, at a first time step, the sliding window 910a averages the first five the probability values and outputs the average in the mean output 904, as illustrated. At the second time step, the sliding window 910b moves one value to the right and averages the five the probability values and outputs the average in the mean output 904, as illustrated. This continues until sliding window 910n averages the final five probability values and outputs the average in the mean output 904, as illustrated. It is noted that in other embodiments, the sliding window can be different sizes.

Each value in the mean output 904 is then compared against a threshold value. If the average probability is greater than the threshold, then the coarse FOV classifier 610 predicts that the output is in the FoV. Alternatively, if the average probability is less than the threshold, then the coarse FOV classifier 610 predicts that the output is out of the FoV. As illustrated in FIG. 9A, the threshold is 0.5. For example, each value of the mean output 904 that is above 0.5, the output is the value of one, indicating that the target device is in the FoV of the electronic device.

As illustrated in FIG. 9B, the classifier output 920 represents the prediction of whether the target device at different time instances is in the FoV (as indicated by a value of one) or out of the FoV (as indicated by a value of negative one) of the electronic device. In certain embodiments, the classifier output 920 is the output 906 of FIG. 9A.

A sliding window moves along the classifier output 920 and averages the values within the window. For example, at a first time step, the sliding window 920a averages the first five the values and outputs the average in the majority voting output 930, as illustrated. At the second time step, the sliding window 910b moves one value to the right and averages the five the probability values and outputs the average in the majority voting output 930, as illustrated. This continues until sliding window 920n averages the final five probability values and outputs the average in the majority voting output 930, as illustrated. It is noted that in other embodiments, the sliding window can be different sizes.

FIGS. 10A, 10B, 10C, and 10D illustrate example methods 1000a, 1000b, 1000c, and 1000d, respectively, for various tracking filter operations according to embodiments of the present disclosure. The methods 1000a, 1000b, 1000c, and 1000d are described as implemented by any one of the client devices 106-114 of FIG. 1 and can include internal components similar to that of electronic device 200 of FIG. 2 and the electronic device 301 of FIG. 3. However, the methods 1000a, 1000b, 1000c, and 1000d as shown in FIGS. 10A, 10B, 10C, and 10D, respectively, could be used with any other suitable electronic device and in any suitable system.

The tracking filter operation 630 of FIGS. 5A, 5B, and 5C can use one or more different tracking filters to improve the quality of measurements. Example tracking filters include Kalman Filter, Extended Kalman Filter (EKF), EKF with adaptive values, a particle filter, and the like.

In certain embodiments, EKF is used to track UWB measurements. The state vector is defined in Equation (18), below. In Equation (18), $x_t$, $y_t$, $z_t$ are the position of the electronic device with respect to the target device, in three-dimensions. The observation is a function as defined in Equation (19). The observation of Equation (19) is dependent on the interface and design choice. For example, the observation could correspond to UWB measurements of range, AoA Azimuth and AoA elevation, as defined in Equation (20), below. Functions for mapping the measurements and the state can be defined in Equation (21), Equation (22), and Equation (23), below.

$$x_t = [x_t, y_t, z_t]^T \tag{18}$$

$$z_t = f(x_t). \tag{19}$$

$$z_t = [r_t, \theta_t, \varphi_t]^T \tag{20}$$

$$r_t = \sqrt{x_t^2 + y_t^2 + z_t^2} \tag{21}$$

$$az_t = a\tan\left(\frac{x_t}{y_t}\right) \tag{22}$$

$$el_t = a\tan\left(\frac{z_t}{\sqrt{x_t^2 + y_t^2}}\right) \tag{23}$$

When the observation is defined as in Equation (20), then the mapping function between the measurements and the state is defined in Equation (21) to Equation (23), above, and Equation (24) and Equation (25), below. The state transition equation is defined in Equation (26), below. It is noted that the expression $w_t$ of Equation (26) is the process noise and the state transition model A is the identity matrix. In certain embodiments, if the electronic device is equipped with a motion sensor (such as the sensor 265 of FIG. 23 or the sensor module 376), then a rotation matrix can be used as the state matrix A (instead of the identity matrix). A rotation matrix can be used to further improve the quality of the measurements.

$$\theta_t = 90 - az_t = a\tan\left(\frac{y_t}{x_t}\right) \tag{24}$$

$$\varphi_t = 90 - el_t = a\tan\left(\frac{\sqrt{x_t^2 + y_t^2}}{z_t}\right) \tag{25}$$

$$x_t = Ax_{t-1} + w_t \tag{26}$$

To account for imperfections in the motion model, Q, which represents the process noise covariance, can be tuned based on the real data. If P represents the error covariance matrix, R represents the measurement noise covariance matrix, and K represents the Kalman Gain, then R (the measurement noise covariance matrix) is determined using real data or measurements. One way to determine R is by obtaining measurements in the scenario where ground truth is known and calculating the variance of the difference between the measurements and ground truth. A Jacobian Matrix, is described in Equation (27), below. Alternatively, if the measurements are $r_t$, $az_t$, $el_t$, then the Jacobian Matrix, is described in Equation (28). The Jacobian as is described in Equation (29), below, describes the mapping function between the measurements and state. The filter is initialized by calculating the state $[x_0, y_0, z_0]^T$ (Equation (18), above) from the current measurements $[r_0, \theta_0, \varphi_0]^T$ (Equation (20), above) using the mapping function between them and the error covariance matrix is initialized to identity matrix. The Jacobian Matrix can be used to calculate K, the Kalman Gain.

$$H(i, j) = \frac{\partial f(x_t)_i}{\partial x_j} = \begin{bmatrix} \frac{\partial r_t}{\partial x_t} & \frac{\partial r_t}{\partial y_t} & \frac{\partial r_t}{\partial z_t} \\ \frac{\partial \theta_t}{\partial x_t} & \frac{\partial \theta_t}{\partial y_t} & \frac{\partial \theta_t}{\partial z_t} \\ \frac{\partial \varphi_t}{\partial x_t} & \frac{\partial \varphi_t}{\partial y_t} & \frac{\partial \varphi_t}{\partial z_t} \end{bmatrix}$$ (27)

$$H(i, j) = \frac{\partial f(x_t)_i}{\partial x_j} = \begin{bmatrix} \frac{\partial r_t}{\partial x_t} & \frac{\partial r_t}{\partial y_t} & \frac{\partial r_t}{\partial z_t} \\ \frac{\partial az_t}{\partial x_t} & \frac{\partial az_t}{\partial y_t} & \frac{\partial az_t}{\partial z_t} \\ \frac{\partial el_t}{\partial x_t} & \frac{\partial el_t}{\partial y_t} & \frac{\partial el_t}{\partial z_t} \end{bmatrix}$$ (28)

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{-y_t}{x_t^2+y_t^2} & \frac{x_t}{x_t^2+y_t^2} & 0 \\ \frac{z_t x_t}{\sqrt{(x_t^2+y_t^2+z_t^2)}\sqrt{x_t^2+y_t^2}} & \frac{z_t x_t}{\sqrt{(x_t^2+y_t^2+z_t^2)}\sqrt{x_t^2+y_t^2}} & \frac{-\sqrt{x_t^2+y_t^2}}{(x_t^2+y_t^2+z_t^2)} \end{bmatrix}$$ (28)

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{y_t}{x_t^2+y_t^2} & \frac{-x_t}{x_t^2+y_t^2} & 0 \\ \frac{-z_t x_t}{\sqrt{(x_t^2+y_t^2+z_t^2)}\sqrt{x_t^2+y_t^2}} & \frac{-z_t x_t}{\sqrt{(x_t^2+y_t^2+z_t^2)}\sqrt{x_t^2+y_t^2}} & \frac{\sqrt{x_t^2+y_t^2}}{(x_t^2+y_t^2+z_t^2)} \end{bmatrix}$$ (29)

Figure 10A:
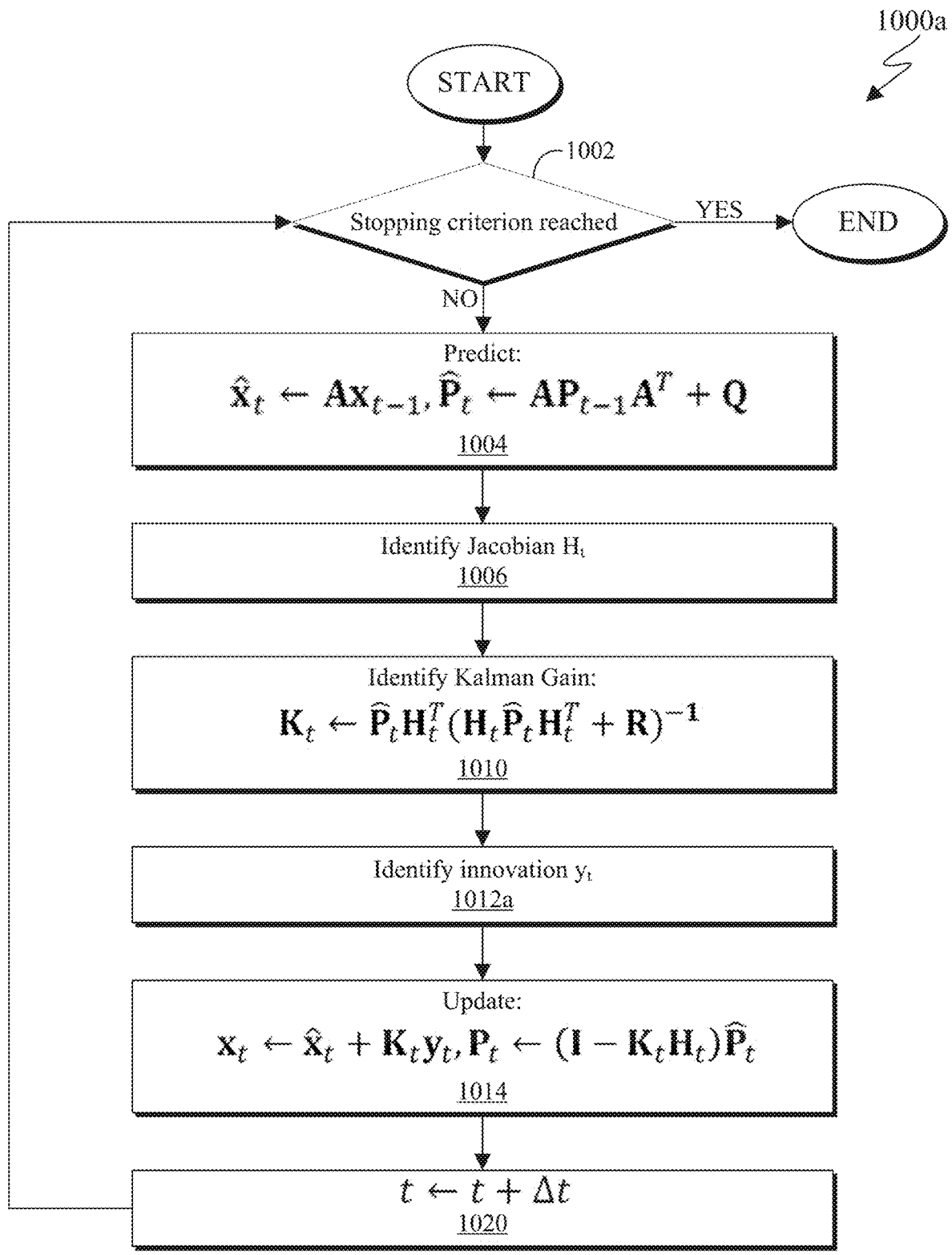
FIGS. 10A, 10B, 10C, and 10D illustrate example methods for various tracking filter operations according to embodiments of the present disclosure.

As illustrated in the FIG. 10A, the method 1000a describes an Extended Kalman Filter for tracking range and AoA measurements. In step 1002 the tracking filter operation 630 determines whether a stopping criteria is reached. The stopping criteria can be based on whether a new measurement was received. For example, as long as a new measurement is received the stopping criteria is not reached.

Upon determining that the stopping criteria is not reached, in step 1004, the tracking filter operation 630 performs a prediction on the state, R, as shown in Equation (30) and a prediction on the error covariance matrix, P, as shown in Equation (31).

$$\hat{x}_t = A x_{t-1} \quad (30)$$

$$\hat{P}_t = A P_{t-1} A^T + Q \quad (31)$$

In step 1006, the tracking filter operation 630 identifies the Jacobian Matrix as described above in Equations (27)-(29). In step 1010, the tracking filter operation 630 uses the Jacobian Matrix (of step 1006) to identify the Kalman Gain, as describe in Equation (32), below.

$$K_t = \hat{P}_t H_t^T (H_t \hat{P}_t H_t^T + R)^{-1} \quad (32)$$

In step 1012a, the tracking filter operation 630 identifies the innovation, $y_t$, as shown in Equation (33), below. The innovation is the difference between the measured value and the predicted value.

$$y_t = z_t - f(\hat{x}_t) = \begin{bmatrix} r_t \\ az_t \\ el_t \end{bmatrix} = \begin{bmatrix} \sqrt{\hat{x}_t^2 + \hat{y}_t^2 + \hat{z}_t^2} \\ a\tan\left(\frac{\hat{x}_t}{\hat{y}_t}\right) \\ a\tan\left(\frac{\hat{z}_t}{\sqrt{\hat{x}_t^2+\hat{y}_t^2}}\right) \end{bmatrix} \quad (33)$$

In step 1014, the tracking filter operation 630 updates the state, as shown in Equation (34) and the error covariance matrix, as shown in Equation (35). In step 1020, the tracking filter operation 630 increases the time and returns to step 1002.

$$x_t = \hat{x}_t + K_t y_t \quad (34)$$

$$P_t = (1 - K_t H_t) \hat{P}_t \quad (35)$$

In certain embodiments, the process noise covariance, Q, the measurement noise covariance matrix R, or both, could be modified (e.g., to be adaptive). For example, the process noise covariance, Q, can be adaptively adjusted based on the innovation of Equation (33), above, which is the difference between the predicted value and the measured value. If $\alpha \in [0,1]$ represents the forgetting factor for updating Q, then Q is updated, as described in Equation (36) below, using the innovation of Equation (33).

$$Q_t = \alpha Q_{t-1} + (1-\alpha)(K_t y_t y_t^T K_t^T) \quad (36)$$

Similarly, the measurement noise covariance matrix, R, can be adaptively adjusted based on a residual value, described in Equation (37), below. The residual value is the difference between the updated value and the measured value. If $\beta \in [0,1]$ represents the forgetting factor for updating R, then R is updated using the residual term as described in Equation (37), below.

$$\varepsilon_t = z_t - f(x_t) \quad (37)$$

$$R_t = \beta R_{t-1} + (1-\beta)(\varepsilon_t \varepsilon_t^T + H_t \hat{P}_t H_t^T) \quad (38)$$

Figure 10B:
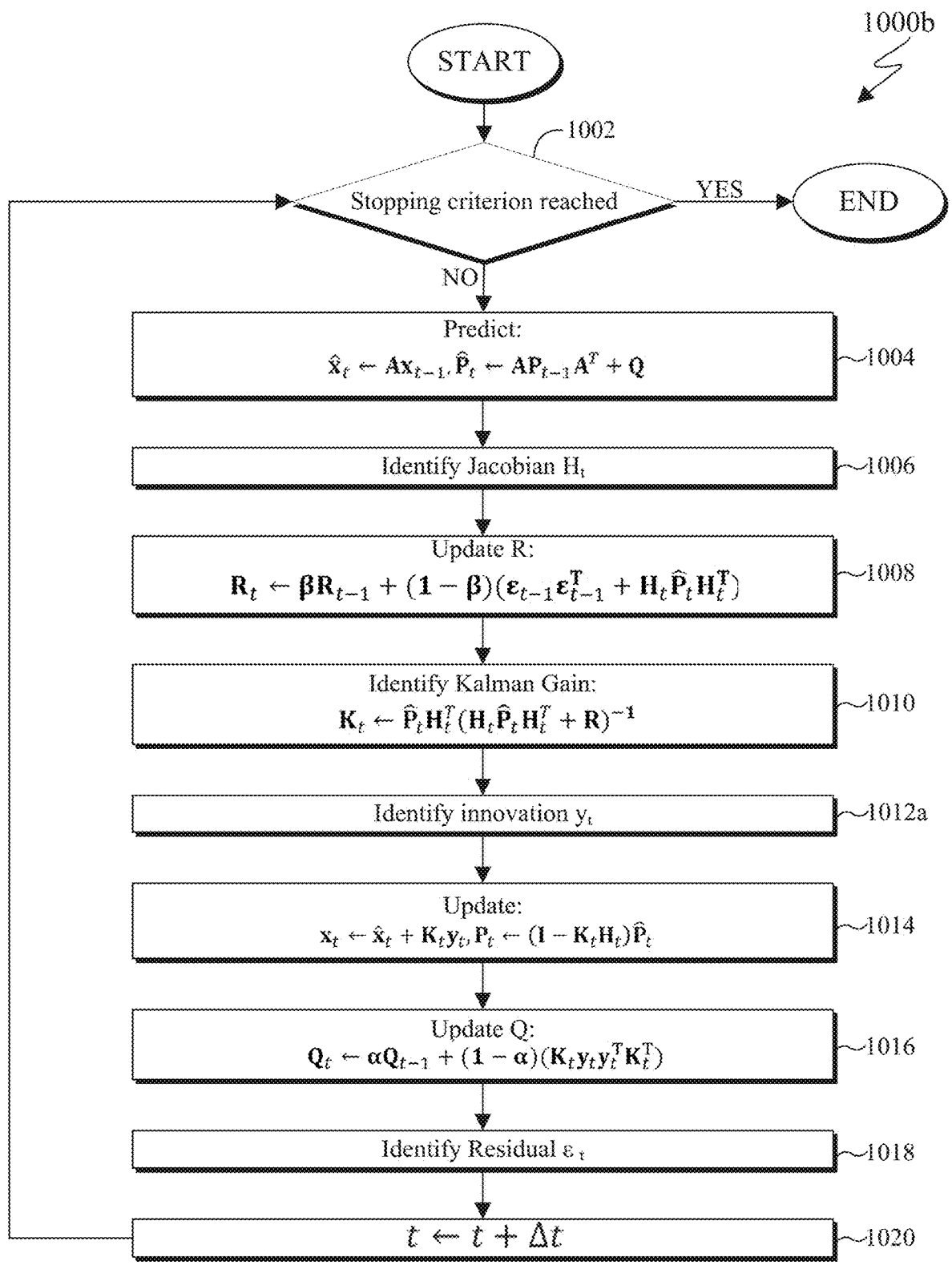

As illustrated in the FIG. 10B, the method 1000b describes an Extended Kalman Filter with adaptive Q and R for tracking range and AoA measurements. In certain embodiments, both Q and R are adaptive. In other embodiments either Q or R is adaptive. When both Q and R are adaptive, then both of the steps 1008 and 1016 are performed. When only Q is adaptive (and R is not adaptive)

then step 1016 is performed and step 1008 is omitted. Similarly, when only R is adaptive (and Q is not adaptive) then step 1008 is performed and step 1016 is omitted.

In step 1002, tracking filter operation 630 determines whether a stopping criteria is reached. Upon determining that the stopping criteria is not reached, in step 1004, the tracking filter operation 630 performs a perdition on the state, $\hat{x}$, as shown in Equation (30) and performs a perdition on the error covariance matrix, $\hat{P}$, as shown in Equation (31). In step 1006, the tracking filter operation 630 identifies the Jacobian Matrix as described above in Equations (27)-(29). In step 1008, the tracking filter operation 630 updates the measurement noise covariance matrix, R, based on the residual value of Equation (37). In step 1010, the tracking filter operation 630 uses the calculated Jacobian Matrix (of step 1006) to identifies the Kalman Gain, as describe in Equation (32). In step 1012a, the tracking filter operation 630 identifies the innovation, $y_t$, as shown in Equation (33). The innovation is the difference between the measured value and the predicted value. In step 1014, the tracking filter operation 630 updates the state, as shown in Equation (34) and the error covariance matrix, as shown in Equation (35). In step 1016, the tracking filter operation 630 updates the process noise covariance, Q, based on the innovation value of Equation (33) (of step 1012). In step 1018, the tracking filter operation 630 updates the residual based on Equation (37). In step 1020, the tracking filter operation 630 increases the time and returns to step 1002.

In certain embodiments, if orientation change of the device is not available, then the rotation matrix or the state transition matrix A is set to identity matrix as described above. When information about the motion of the device is not available, the tracking filter operation 630 uses a Kalman filter for tracking the target device. The state of the Kalman filter is modeled as described in Equation (39). The state transition matrix A=I. Measurements are erroneous range, AoA azimuth and AoA elevation obtained from UWB measurements is described in Equation (40). The measurement matrix H=I $$x_t = [r_t, \theta_t, \varphi_t]^T \quad (39)$$

$$z_t = [r_t, az_t, el_t]^T \quad (40)$$

Figure 10C:
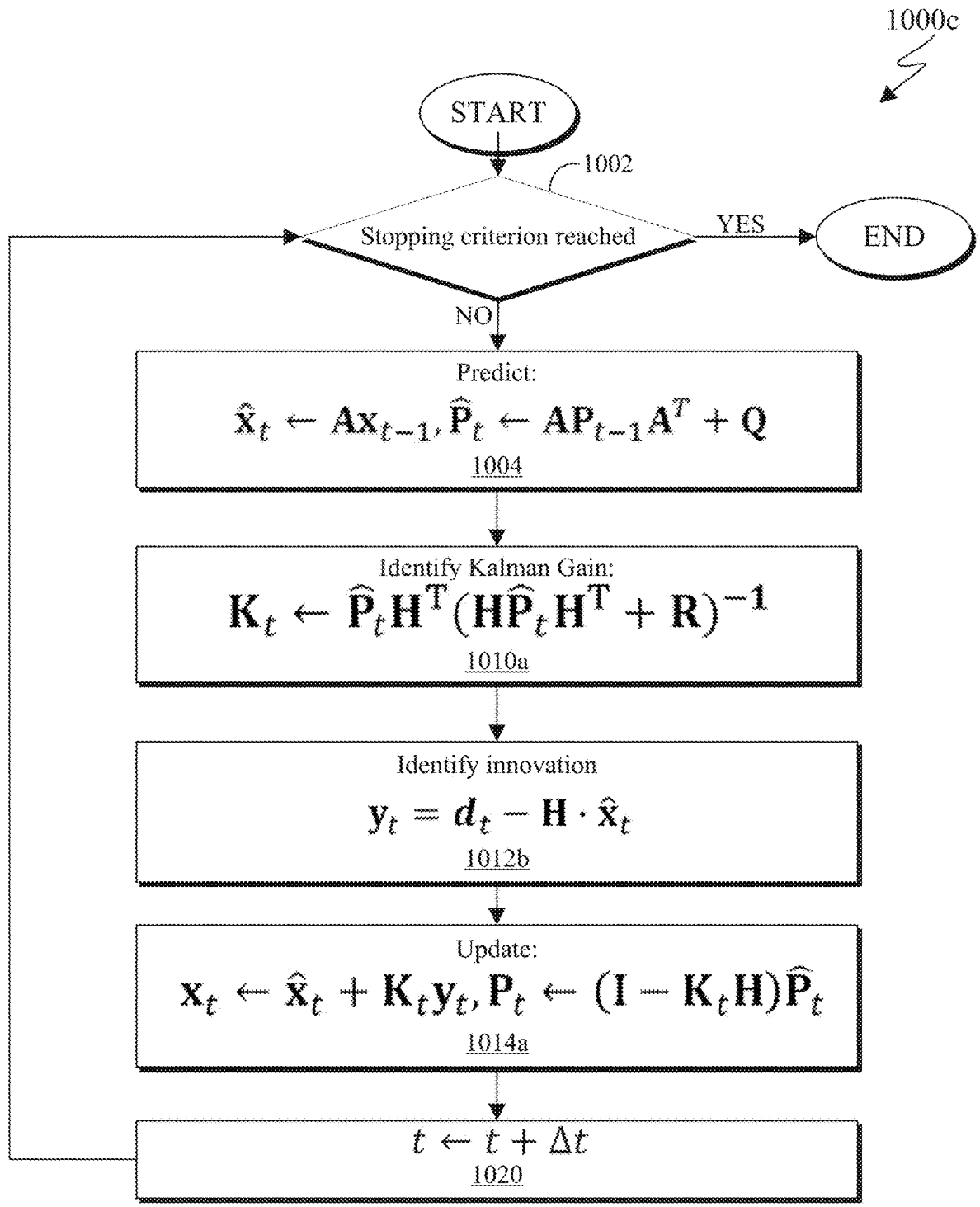

As illustrated in the FIG. 10C, the method 1000c describes a Kalman Filter for tracking range and AoA measurements. In step 1002, tracking filter operation 630 determines whether a stopping criteria is reached. Upon determining that the stopping criteria is not reached, in step 1004, the tracking filter operation 630 performs a perdition on the state, $\hat{x}$, as shown in Equation (30) and performs a perdition on the error covariance matrix, $\hat{P}$, as shown in Equation (31). In step 1010a, the tracking filter operation 630 identifies the Kalman Gain, as describe in Equation (41), below. In step 1012b, the tracking filter operation 630 identifies the innovation, $y_t$, as shown in Equation (42), below. In step 1014a, the tracking filter operation 630 updates the state, as shown in Equation (34) and the error covariance matrix, as shown in Equation (43). In step 1020, the tracking filter operation 630 increases the time and returns to step 1002.

$$K_t \leftarrow \hat{P}_t H^T (H\hat{P}_t H^T + R)^{-1} \quad (41)$$

$$y_t = z_t - H \cdot \hat{x}_t \quad (42)$$

$$P_t = (I - K_t H)\hat{P}_t \quad (43)$$

In certain embodiments, during a NLOS scenarios the UWB measurements between the electronic device and the target device can get lost (such that the electronic device does not obtain the signals from the target device). When dealing with measurement loss, a motion sensor (if available) can be used to detect orientation changes of the electronic device to track AoA and range. When there are no UWB measurements, the tracking filter operation 630 can change the innovation term to zero.

Figure 10D:
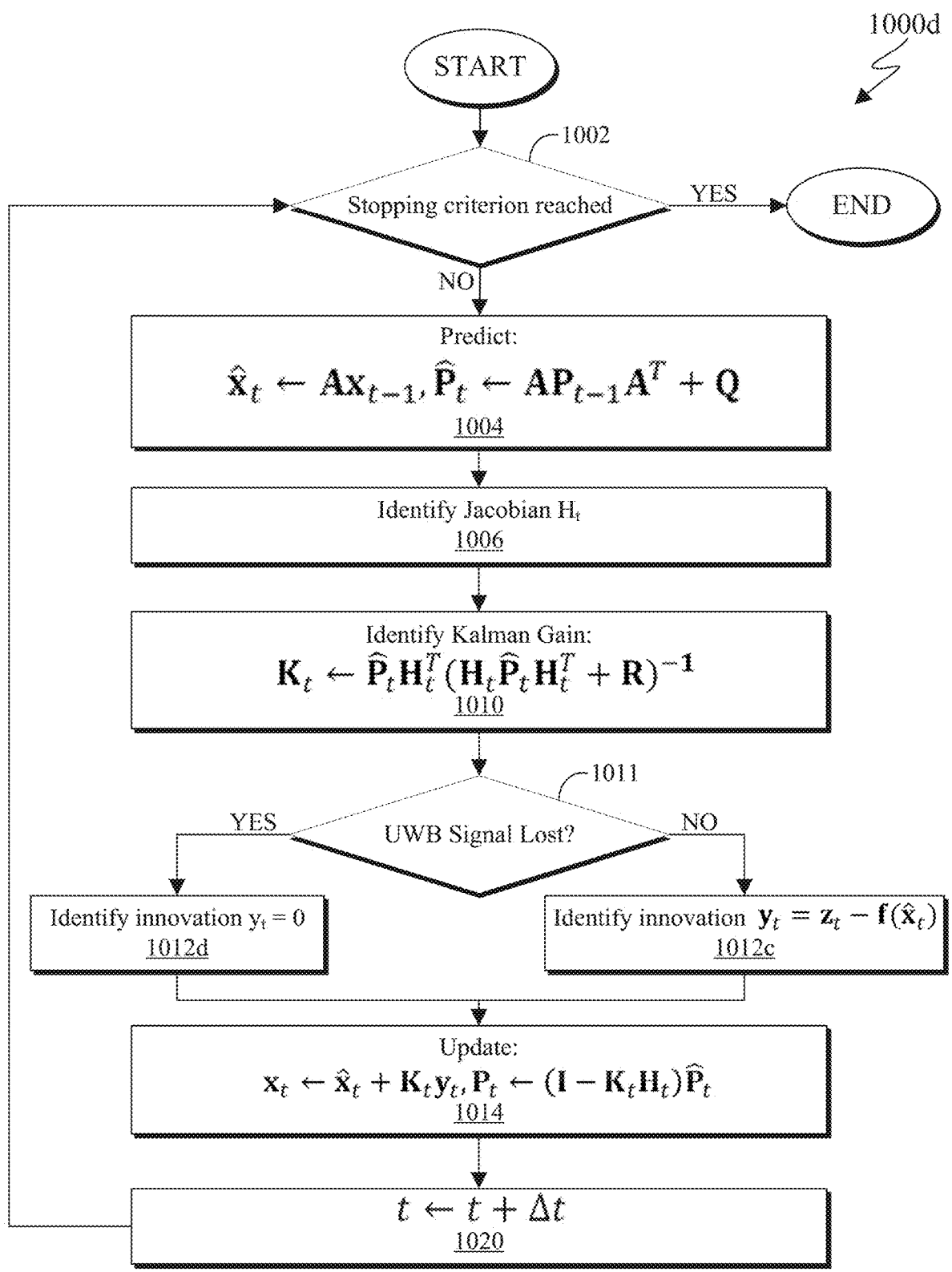

As illustrated in FIG. 10D, the method 1000d describes tracking with partial measurement loss. In step 1002, tracking filter operation 630 determines whether a stopping criteria is reached. Upon determining that the stopping criteria is not reached, in step 1004, the tracking filter operation 630 performs a perdition on the state, R, as shown in Equation (30) and performs a perdition on the error covariance matrix, P, as shown in Equation (31). In step 1006, the tracking filter operation 630 identifies the Jacobian Matrix as described above in Equations (27)-(29). In step 1010, the tracking filter operation 630 uses the calculated Jacobian Matrix (of step 1006) to identifies the Kalman Gain, as describe in Equation (32). In step 1011 the tracking filter operation 630 determines whether the UWB measurements were lost (or not obtained). If the UWB measurements were lost, then in step 1012d, the tracking filter operation 630 sets the innovation value, $y_t$, to zero. Alternatively, if the UWB measurements were received (not lost), then in step 1012c, the tracking filter operation 630 identifies the innovation, $y_t$, as shown in Equation (33). As discussed above, the innovation value, $y_t$, is the difference between the measured value and the predicted value. In step 1014, the tracking filter operation 630 updates the state, as shown in Equation (34) and the error covariance matrix, as shown in Equation (35). In step 1020, the tracking filter operation 630 increases the time and returns to step 1002.

Although FIGS. 10A, 10B, 10C, and 10D illustrate example processes, various changes may be made to FIGS. 10A, 10B, 10C, and 10D. For example, while the method 1000a is shown as a series of steps, various steps could overlap, occur in parallel, occur in a different order, or occur multiple times. In another example, steps may be omitted or replaced by other steps.

FIG. 11 illustrates an example method 1100 for determining whether the target device is within the FoV of an electronic device according to embodiments of the present disclosure. The method 1100 is described as implemented by any one of the client device 106-114 of FIG. 1 and can include internal components similar to that of electronic device 200 of FIG. 2 and the electronic device 301 of FIG. 3. However, the method 1100 as shown in FIG. 11 could be used with any other suitable electronic device and in any suitable system.

In certain embodiments, the output from the coarse FoV classifier 610 (an initial prediction of whether the target device is in the FoV of the electronic device) and the tracking filter operation 630 can be associated with a confidence value which reflects the probability or the confidence of the current measurement to be from the target in FoV. Based on (i) the decision from the coarse FoV classifier 610 and (ii) confidence scores of the coarse FoV classifier 610 and the tracking filter operation 630, the Fine FoV classifier determines whether the target device is in FoV or out-of-FoV of the electronic device.

For example, the FoV confidence of the coarse FOV classifier 610 can be the probability of the target being in the FoV. For instance, if the initial prediction indicates that that target device is closer to the FoV boundary (such as boundary 404 of FIG. 4A), then the confidence of the coarse FoV classifier 610 is low. Alternatively, the initial prediction indicates that that target device is far to the FoV boundary (such as boundary 404 of FIG. 4A), then the confidence of the coarse FoV classifier 610 is high. For an SVM classifier, this probability is inversely proportional to the distance of the measurement from the hyperplane separating FoV and out-of-FoV. The confidence from SVM of the coarse FOV classifier 610 is referred to as SVMConfidence.

Similarly, the tracking filter operation 630 also outputs a confidence based on the estimated quantities. For example, an EKF confidence is calculated using the error covariance matrix as described in Equitation (44), below.

$$EKFConfidence_t = \min\left(1, \frac{c}{\text{trace}(P_t)}\right) \quad (44)$$

Here, C is a constant parameter and trace ($P_t$) is the trace of the square matrix $P_t$. That is, the EKF confidence is the confidence associated with the tracking state.

The fine FoV classifier 640 makes the final determination about whether the target device is in FoV of the electronic device by combining decisions of the coarse FOV classifier 610 and tracking filter operation 630. In certain embodiments, SVMConfidence is compared against a predefined threshold. If it lies above the threshold, and input AoA and EKF output AoA both lie within the field of view, the final FoV decision specifies that the target device is in the FoV of the electronic device, otherwise the final FoV decision specifies that the target device is out of the FoV of the electronic device.

The method 1100 of FIG. 11 describes that the Fine FOV classifier performs the final FoV decision about the target device by combining the decisions of the coarse FoV classifier 610 and the tracking filter operation 630 along with the output 540 such as the (the smoothed AoA). In certain embodiments, if the output from the smoothed AoA (output 540) lies within a FoV and either (i) the output from the coarse FoV classifier 610 indicates that the target device is within the FoV of the electronic device, or (ii) the EFKConfidence is greater than a threshold, then the output 512 indicates that the target device is in the FoV of the electronic device (such as the target device 410a of FIG. 4A). Alternatively, if output from the smoothed AoA (output 540) lies outside the FoV of the electronic device, then the output 512 indicates that the target device is out-of-FoV of the electronic device (such as the target device 410b of FIG. 4A). Similarly, if the output from the smoothed AoA (output 540) lies within a FoV and both (i) the output from the coarse FOV classifier 610 indicates that the target device is out-of-FOV of the electronic device, and (ii) the EFKConfidence is less than or equal to a threshold, then the output 512 indicates that the target device is out-of-FoV of the electronic device (such as the target device 410b of FIG. 4A).

In step 1102 the electronic device determines whether a stopping criteria is reached. The stopping criteria can be based on whether a new measurement was received. For example, as long as a new measurement is received the stopping criteria is not reached.

Upon determining that the stopping criteria is not reached, the electronic device in step 1104, generates an initial prediction of a presence of the target device relative to a FOV of the electronic device. The electronic device can use the coarse FOV classifier 610 of FIG. 6A or 6B. The initial prediction can be based on SVM. In certain embodiments, the electronic device generates a confidence score of the initial prediction.

In step 1106, the electronic device performs a tracking filter operation, such as the tracking filter operation 630 of FIGS. 6A, 6B, and 6C. The tracking filter operation can use various filters as described in the methods of FIGS. 10A-10D. The tracking filter operation can smooth the range information and the AoA information. In certain embodiments, the electronic device generates a confidence score output, referred to as EFKConfidence, of the tracking filter.

The electronic device performs a fine FOV classification to determine whether the target device is within the FoV or outside the FoV of the electronic device. The determination can be based on the smoothed AoA information, and the initial prediction of the presence of the target device relative to the FoV of the electronic device. In certain embodiments, the electronic device uses the fine FOV classifier 640 of FIGS. 6A, 6B and 6C to determine whether the target device is within the FoV or outside the FoV of the electronic device.

To determine whether the target device is within the FoV or outside the FoV of the electronic device, the fine FOV classifier 640 initially determines, in step 1110, whether the smoothed AoA, which is output from the tracking filter of step 1106, is in the FoV. If the smoothed AoA of the target device is not in the FoV, then the fine FOV classifier 640 determines that the target device is not in the FoV (step 1118). Alternatively, upon determining that the smoothed AoA indicates that the target device is in the FoV, the fine FOV classifier 640, in step 1112, determines whether the output from the coarse FOV classifier 610 indicates that the target device is in FoV of the electronic device. If the output from the coarse FOV classifier 610 indicates that the target device is not in FoV, then the fine FOV classifier 640 compares, in step 1114, the confidence score of the tracking filter operation 630 to a threshold. If the confidence score of the tracking filter operation 630 is less than or equal to a threshold, then the fine FOV classifier 640 determines that target device is out-of-FoV (step 1118)

Alternatively, if the output from the coarse FOV classifier 610 indicates that the target device is in FoV (step 1112), or if the confidence score of the tracking filter operation 630 is greater than a threshold (step 1114), the fine FOV classifier 640 determines that target device is in FoV (step 1116). In step 1120, the time interval is increased the time and returns to step 1102.

In certain embodiments, upon determining that the target device is in the FoV or out-of-FoV of the electronic device, the fine FOV classifier 640 can remove outliers and smooth the FoV determination. The fine FOV classifier 640 can utilize a sliding window, such as the diagram 900a of FIG. 9A and the diagram 900b of FIG. 9B.

For example, the output of step 1116 and of step 1118 over a period of time is illustrated as the classifier output 920 of FIG. 9B. At a first time step, the sliding window 920a averages the first five the values and outputs the average in the majority voting output 930, as illustrated. At the second time step, the sliding window 910b moves one value to the right and averages the five the probability values and outputs the average in the majority voting output 930, as illustrated. This continues until sliding window 920n averages the final five probability values and outputs the average in the majority voting output 930, as illustrated. It is noted that in other embodiments, the sliding window can be different sizes.

In certain embodiments, a confidence score of the fine FoV classifier 640 is generated. The confidence score of the fine FOV classification is based on the confidence score generated in step 1104 (via the coarse FoV classifier 610) and the confidence score generated in step 1106 (via the tracking filter operation 630). To generate the confidence score of the fine FoV classifier 640 is described in Equation (45), below, where SVMConfidence is the confidence score generated in step 1104 (via the coarse FoV classifier 610) and EKFConfidence is the confidence score generated in step 1106 (via the tracking filter operation 630).

$$\text{Output } FoV \text{ Confidence} = \frac{SVMConfidence + EKFConfidence}{2} \quad (45)$$

Although FIG. 11 illustrates an example method, various changes may be made to FIG. 11. For example, while the method 1100 is shown as a series of steps, various steps could overlap, occur in parallel, occur in a different order, or occur multiple times. In another example, steps may be omitted or replaced by other steps.

FIG. 12 illustrates an example method 1200 for performing a reset due to motion according to embodiments of the present disclosure. The method 1200 is described as implemented by any one of the client device 106-114 of FIG. 1 and can include internal components similar to that of electronic device 200 of FIG. 2 and the electronic device 301 of FIG. 3. However, the method 1200 as shown in FIG. 12 could be used with any other suitable electronic device and in any suitable system.

As illustrated in FIG. 6A, the field of view detector and tracking operation 510*a* includes a motion detection engine 620. The motion detection engine 620 can initiate a reset operation when a detected motion exceeds a threshold.

Sometimes there can be drastic changes in the motion of the electronic device. In such cases, a tracking filter of the tracking filter operation 630 may need a significant period of time to converge the measurements after a sudden motion of the electronic device occurs. Accordingly, embodiments of the present disclosure enable the electronic device to reset the state of the filter when a drastic or sufficiently large motion is detected.

For example, variance of acceleration can be obtained from a motion sensor of the electronic device. The motion detection engine 620 determines whether motion of the electronic device exceeds a threshold. When one or more motion samples exceed a threshold, the motion detection engine 620 triggers the reset operation. Depending on whether the output (initial prediction) of coarse FoV classifier 610 is FoV or out-of-FoV, the motion detection engine 620 performs a soft (partial) rest or a hard (full) reset. For example, if the output from the coarse FoV classifier 610 is FoV, then a soft reset is performed. Alternatively, if the output from the coarse FoV classifier 610 is out-of-FoV, then a hard reset is performed.

In soft reset, the state of the tracking filter (of the tracking filter operation 630) is reinitialized using the current range and AoA measurements based on the mapping function between the state and measurements, and error covariance matrix is reinitialized to identity matrix. In hard reset, the state of the tracking filter and error covariance matrix are reinitialized the same way as in soft reset, and a buffer is reset. The buffer that is reset includes the buffer that includes the initial predictions of the coarse FoV classifier 610 if majority voting is performed to the output (FIG. 9B). Alternatively, the buffer that is reset includes (i) the confidence score of the coarse FoV classifier 610 (such as SVMConfidence) if average probability thresholding is done on classifier output (FIG. 9A), and (ii) the buffer of the output decision of the fine FOV classifier 640 if majority voting is performed to the output (FIG. 9B).

As illustrated in FIG. 12, in step 1202, the electronic device determines whether a stopping criteria is reached. The stopping criteria can be based on whether a new measurement was received. For example, as long as a new measurement is received the stopping criteria is not reached.

Upon determining that the stopping criteria is not reached, the electronic device in step 1204, generates an initial prediction of a presence of the target device relative to a FoV of the electronic device. The electronic device can use the coarse FOV classifier 610 of FIGS. 6A and 6B. The initial prediction can be based on SVM. In certain embodiments, the electronic device generates a confidence score of the initial prediction.

The electronic device determines whether detected motion necessitates a reset to a tracking filter of the tracking filter operation 630, a buffer, or both. In certain embodiments, the electronic device uses the motion detection engine 620 to determine whether a reset is to be performed. In step 1208, the motion detection engine 620 detects motion and compares variances of the acceleration of the motion to a threshold.

When variances of the acceleration is larger than the threshold, the motion detection engine 620 determines, in step 1210, whether the output of the step 1204 (such as the initial prediction of the coarse FoV classifier 610) indicates that the target device is in the FoV of the electronic device. When the initial prediction of the coarse FoV classifier 610 indicates that the target device is in the FoV of the electronic device, the motion detection engine 620 performs a soft reset (step 1212). Alternatively, when the initial prediction of the coarse FoV classifier 610 indicates that the target device is out of the FoV of the electronic device, the motion detection engine 620 performs a hard reset (step 1214).

When variances of the acceleration is less than the threshold or after a reset (such as the soft of step 1212 or the hard reset of step 1214) is performed, the electronic device performs the tracking filter operation 630, of step 1216. In step 1216, the electronic device performs a tracking filter operation, such as the tracking filter operation 630 of FIGS. 6A, 6B, and 6C. The tracking filter operation can use various filters as described in the methods of FIGS. 10A-10D. The tracking filter operation can smooth the range information and the AoA information. In certain embodiments, the electronic device generates a confidence score output of the tracking filter.

The electronic device can use the fine FOV classifier 640 of FIGS. 6A, 6B, and 6B to determine whether the target device is within the FoV or outside the FoV of the electronic device based on the output of the step 1204 and the output of step 1216. In step 1218, the tracking filter operation 630 increases the time and returns to step 1202.

Although FIG. 12 illustrates an example method, various changes may be made to FIG. 12. For example, while the method 1200 is shown as a series of steps, various steps could overlap, occur in parallel, occur in a different order, or occur multiple times. In another example, steps may be omitted or replaced by other steps.

Figure 13A:
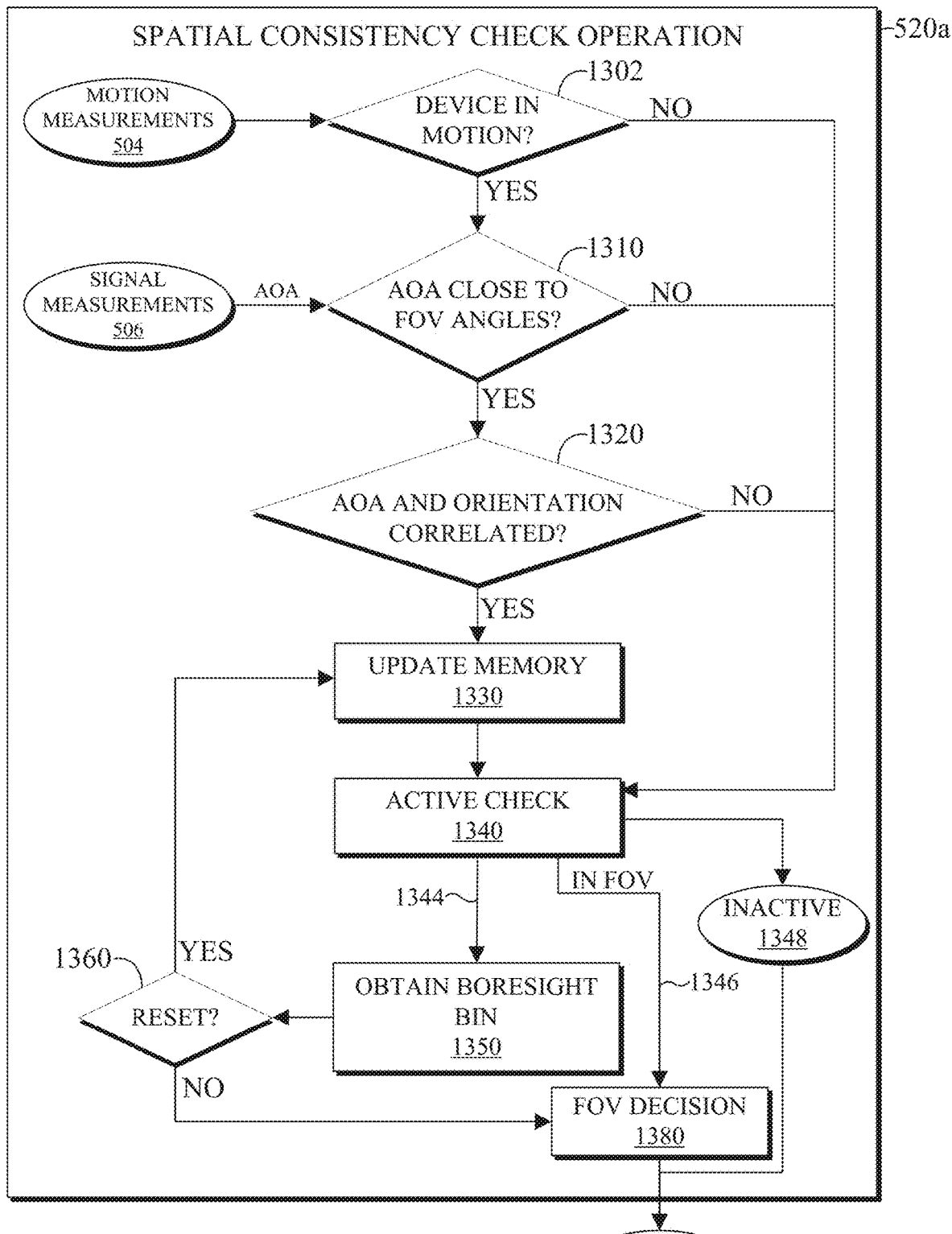
FIGS. 13A and 13B illustrate example block diagrams of the spatial consistency check operation of FIGS. 5A and 5B according to embodiments of the present disclosure.
Figure 13B:
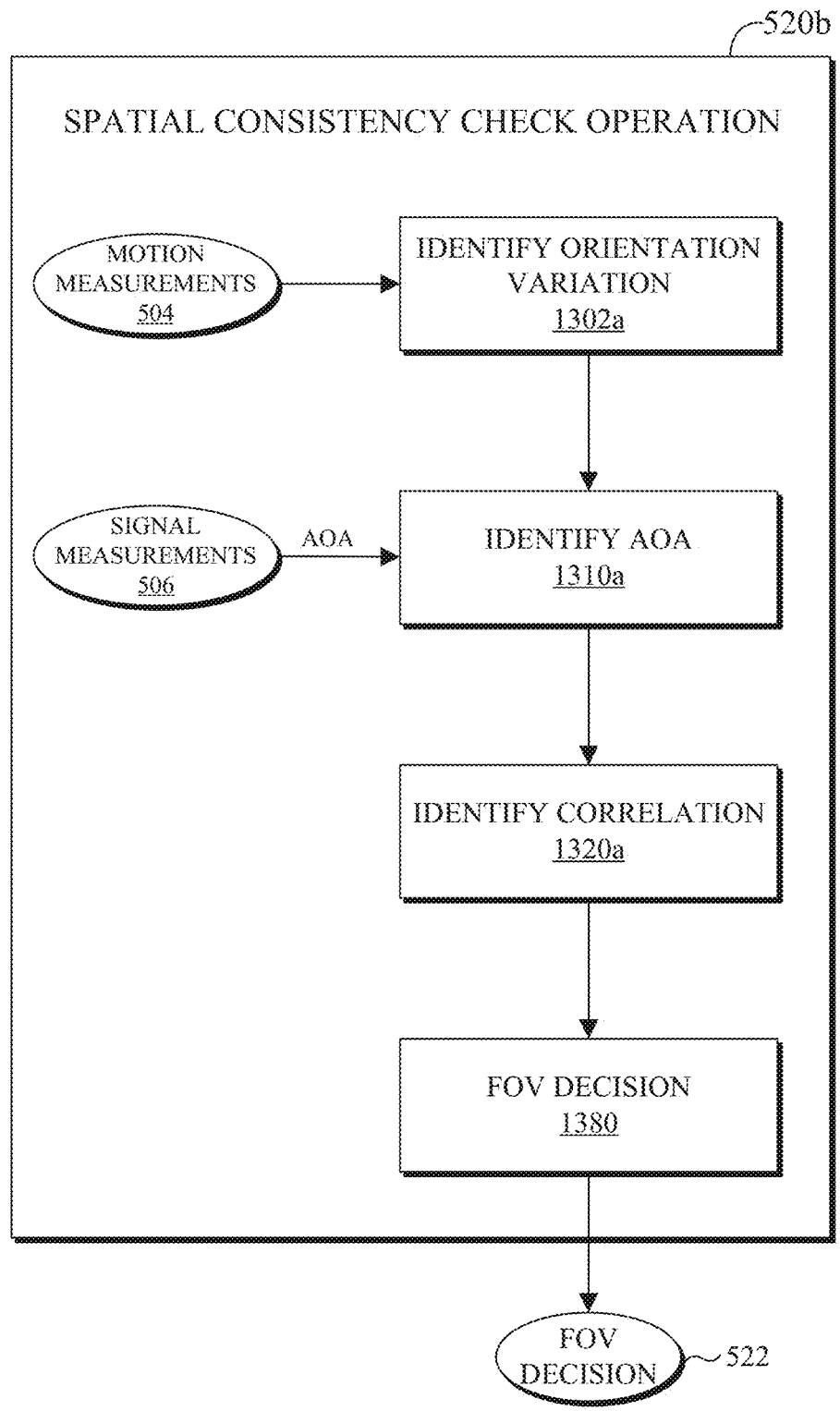

FIGS. 13A and 13B illustrate example block diagrams of the SCC operation 520 of FIGS. 5A and 5B according to embodiments of the present disclosure. In particular, FIG. 13A and FIG. 13B illustrates different embodiments of the SCC operation 520 of FIGS. 5A and 5B. For example, FIG. 13A illustrates the SCC operation 520*a* and FIG. 13B illustrates the SCC operation 520*b*. FIGS. 13C-13M illustrate various operations of the SCC operation 520*a* of FIG. 13A according to embodiments of the present disclosure. The SCC operation 520 is described as implemented by any one of the client device 106-114 of FIG. 1 and can include internal components similar to that of electronic device 200 of FIG. 2 and the electronic device 301 of FIG. 3. However, the SCC operation 520*a* and 520*b* as shown in FIGS. 13 AND 13B could be used with any other suitable electronic device and in any suitable system.

The SCC operation 520*a* of FIG. 13A is similar to the SCC operation 520*b* of FIG. 13B. It is noted that the SCC operation 520*b* does not include a memory which is updated as described in the SCC operation 520*a* of FIG. 13A. For ease of explanation, (i) step 1302 of FIG. 13A is similar to step 1302*a* of FIG. 13B, (ii) step 1310 of FIG. 13A is similar to step 1310*a* of FIG. 13B, (iii) step 1320 of FIG. 13A is similar to step 1320*a* of FIG. 13B, and (iv) FoV decision operation 1380 of FIG. 13A is similar to step 1380*a* of FIG. 13B.

Figure 13C:
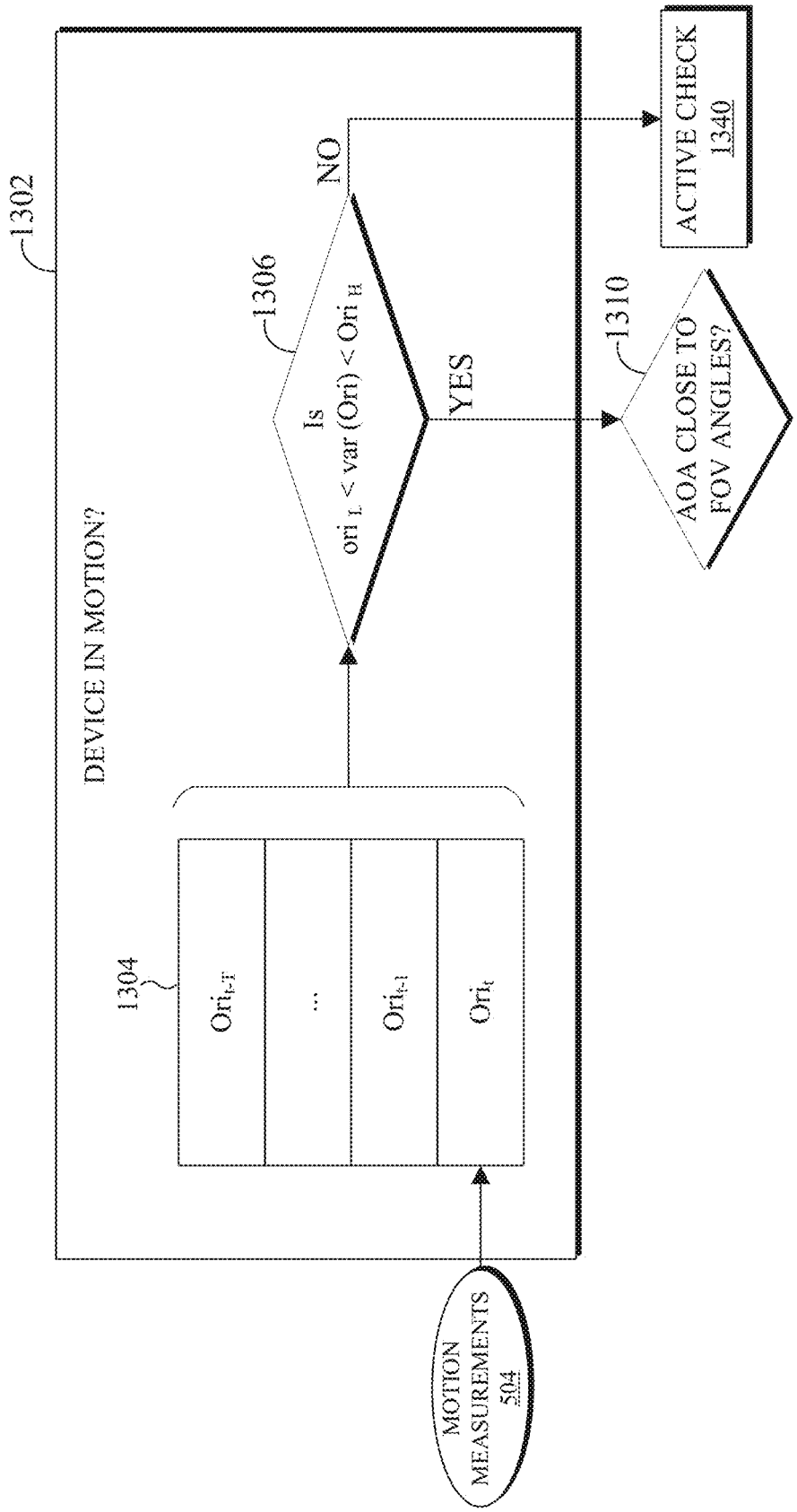
FIGS. 13C-13M illustrate various operations of the spatial consistency check operation of FIG. 13A according to embodiments of the present disclosure.
Figure 13D:
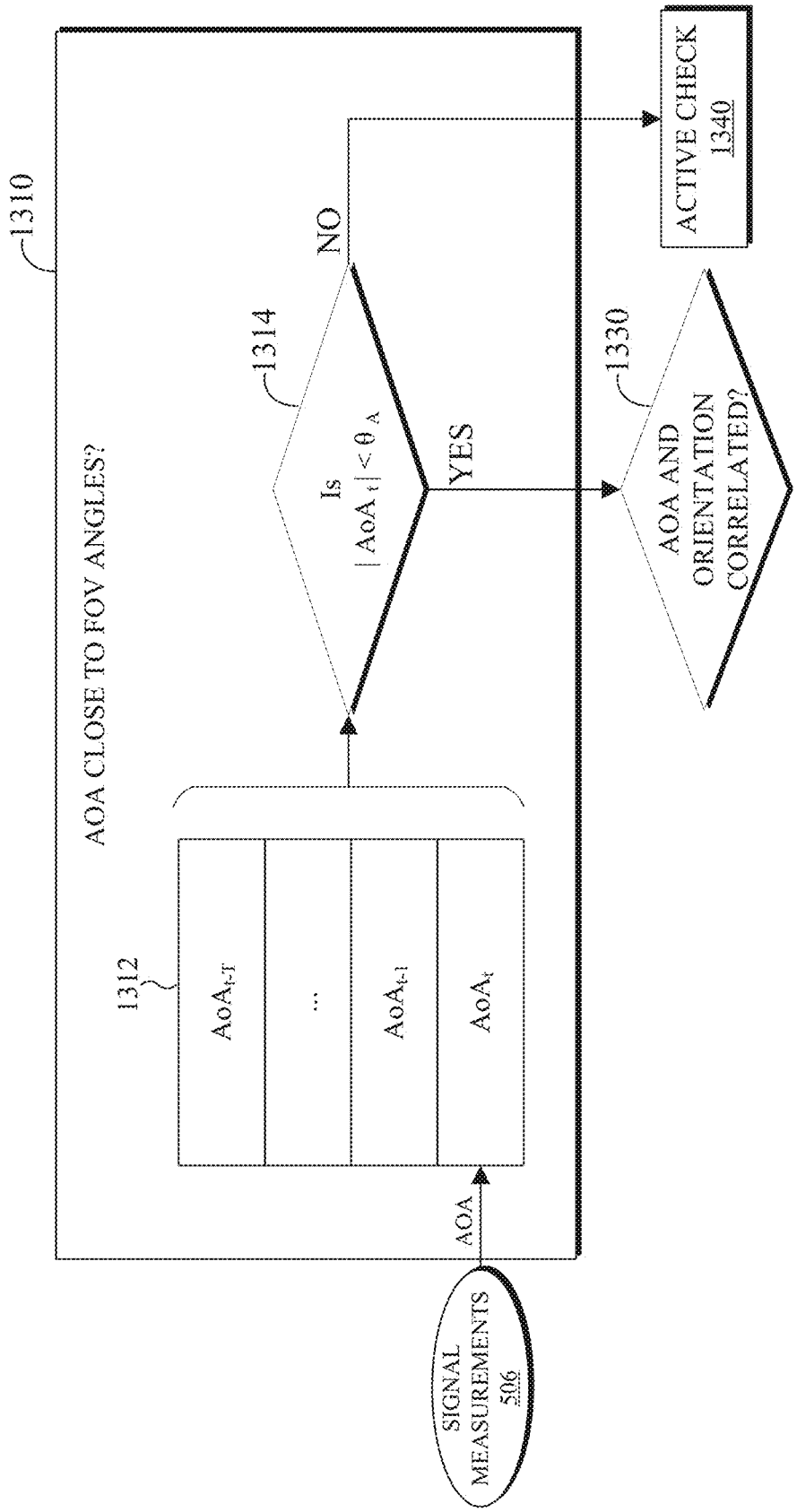
Figure 13E:
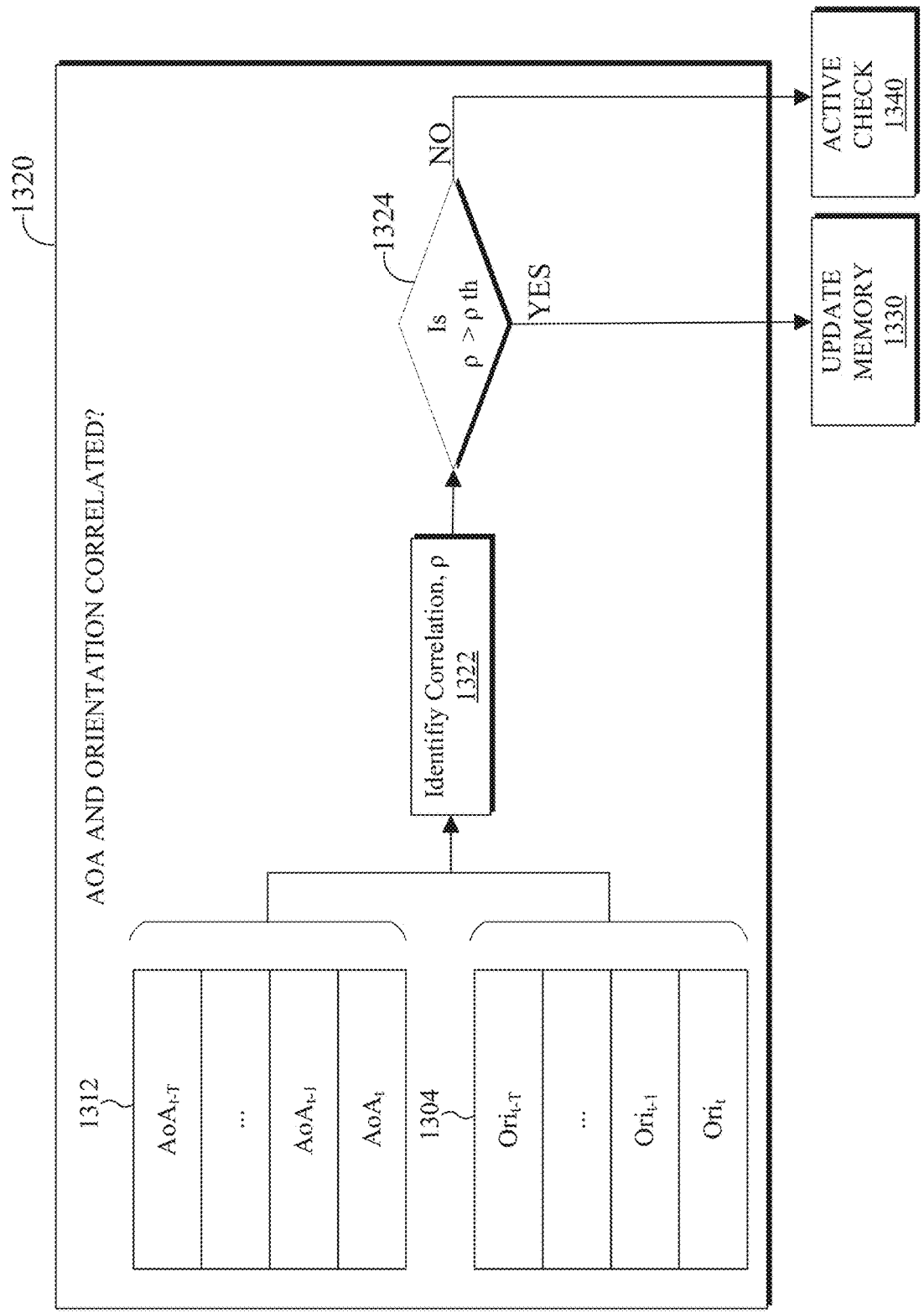
Figure 13F:
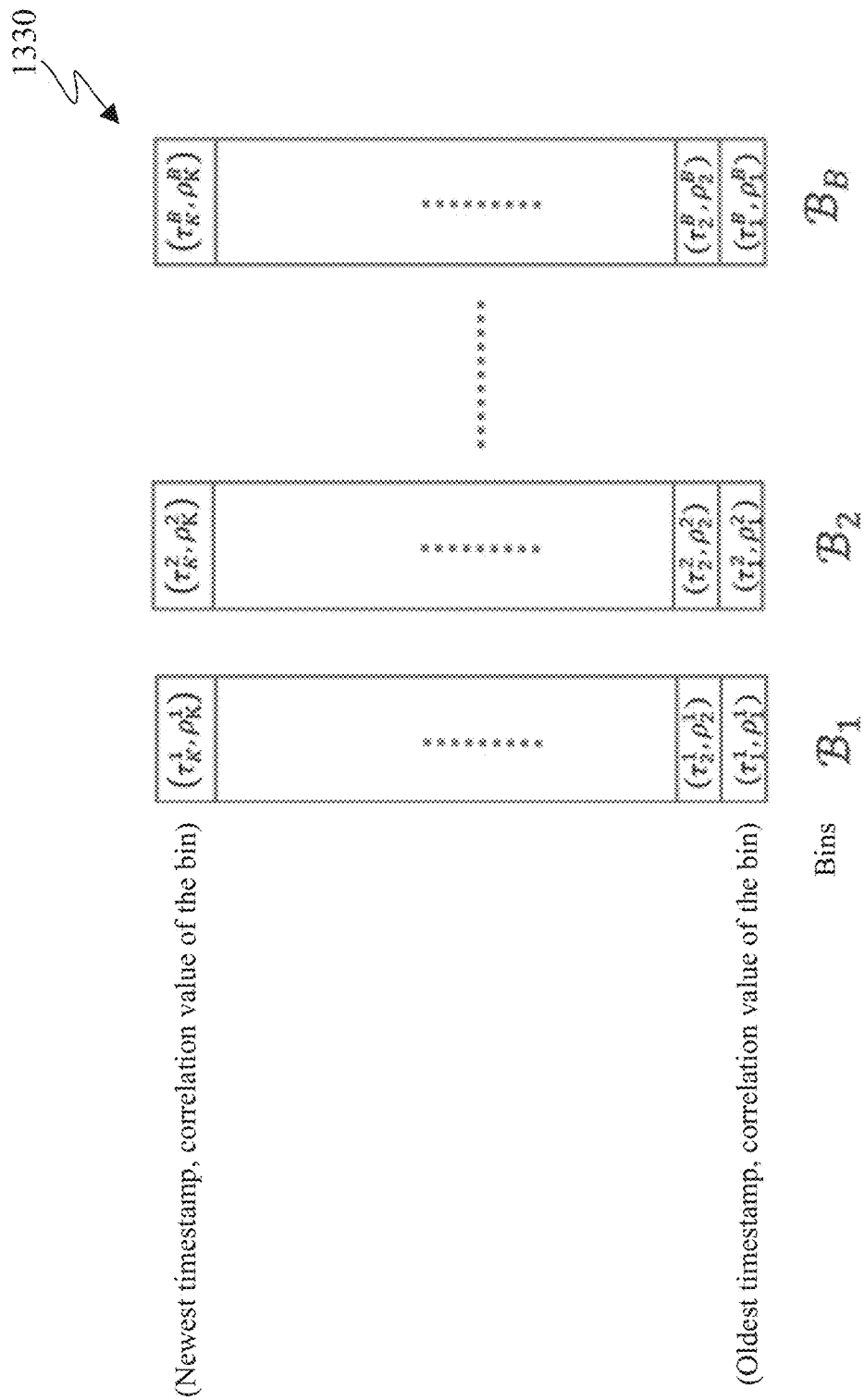
Figure 13G:
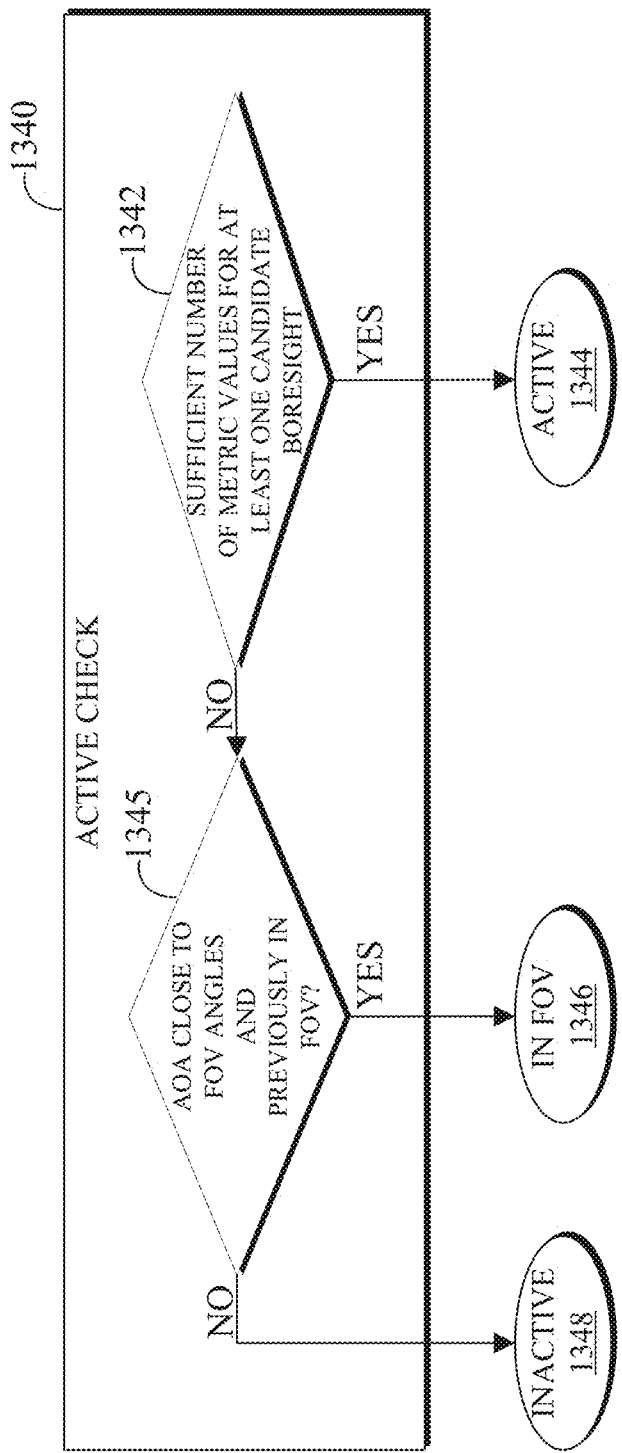
Figure 13H:
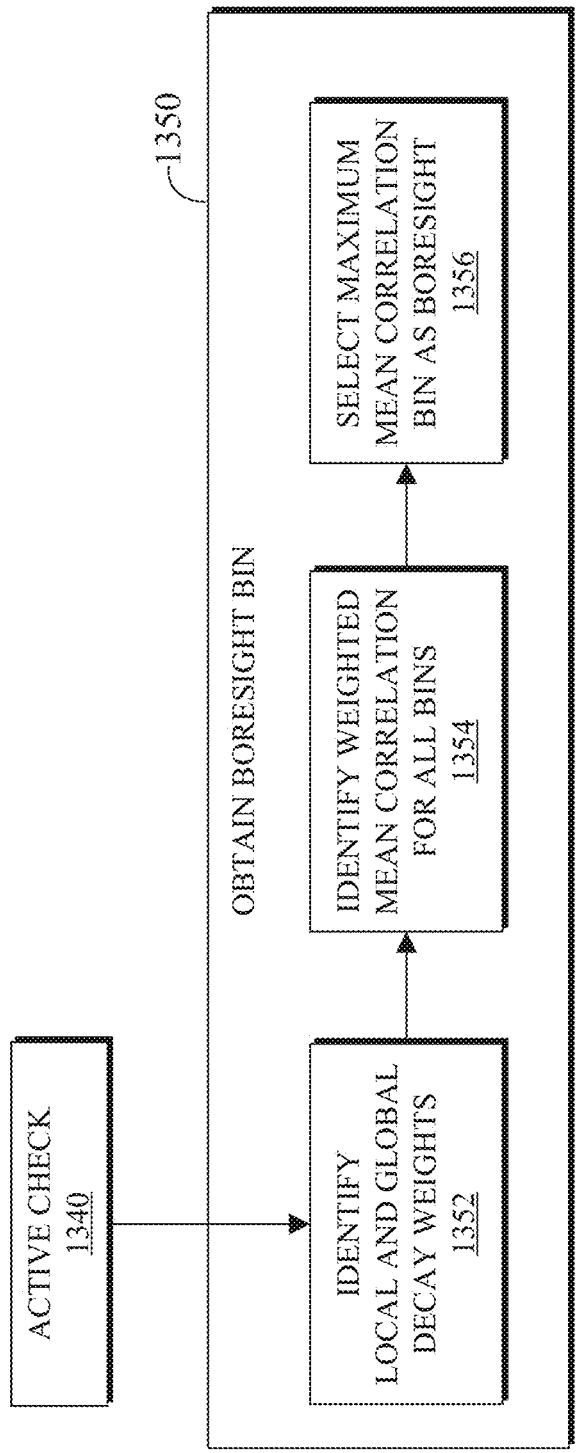
Figure 13I:
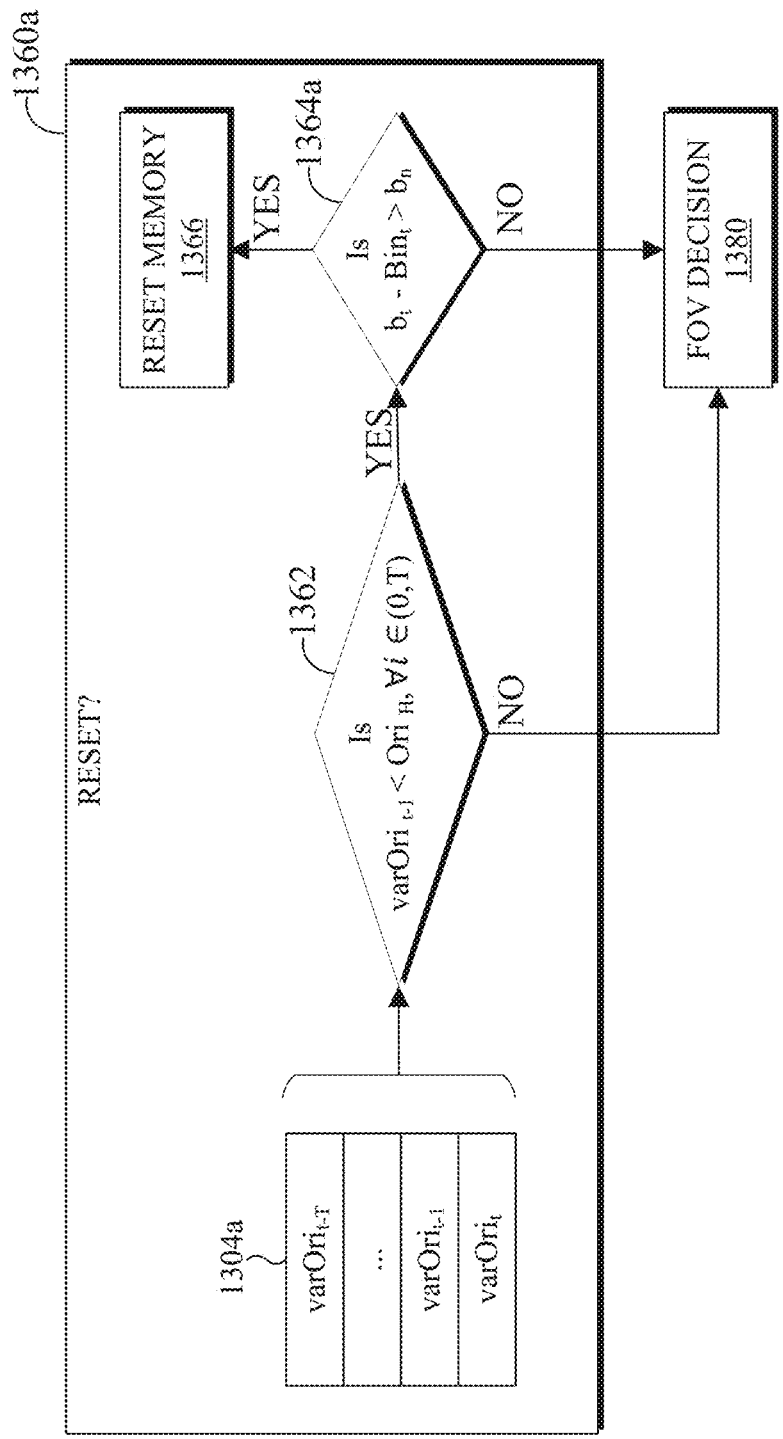
Figure 13J:
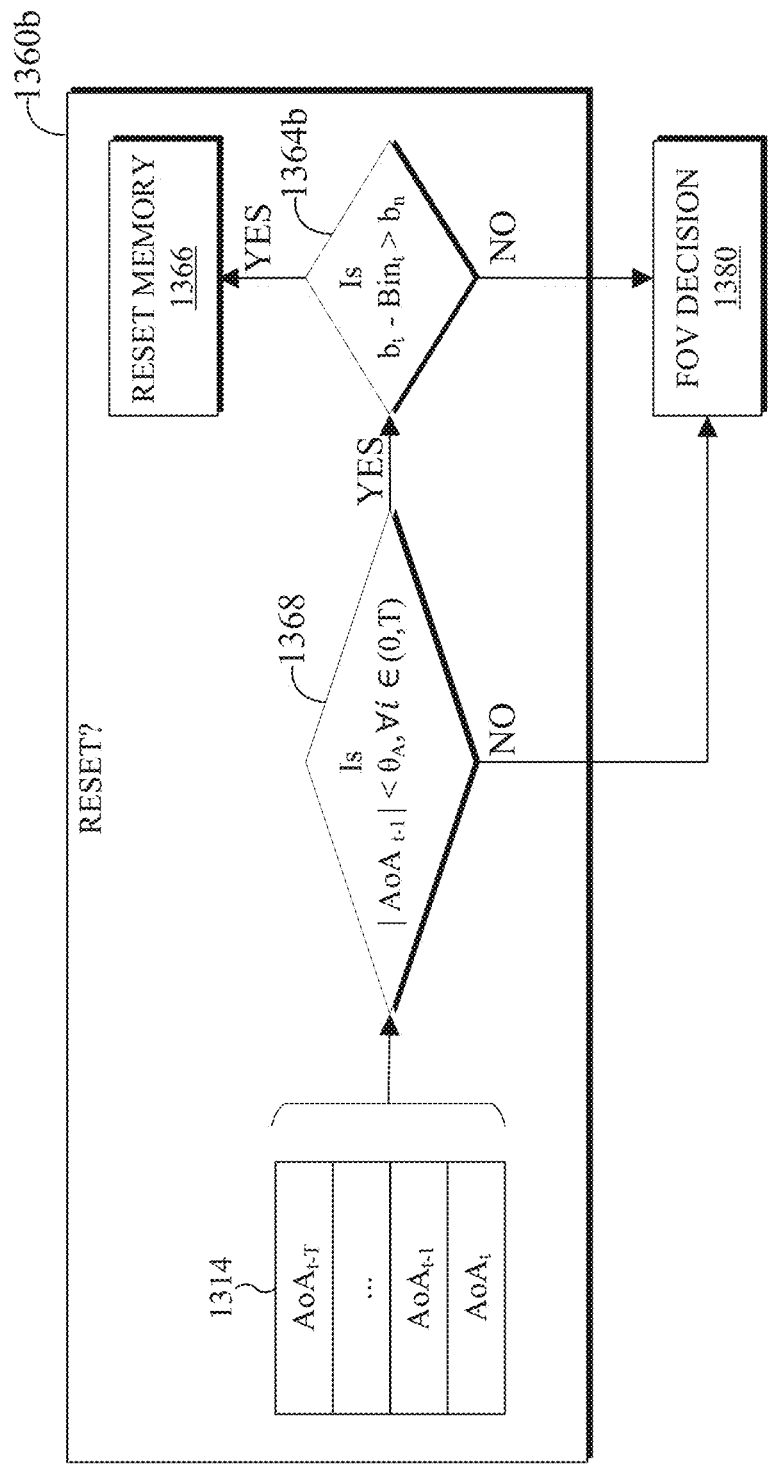
Figure 13K:
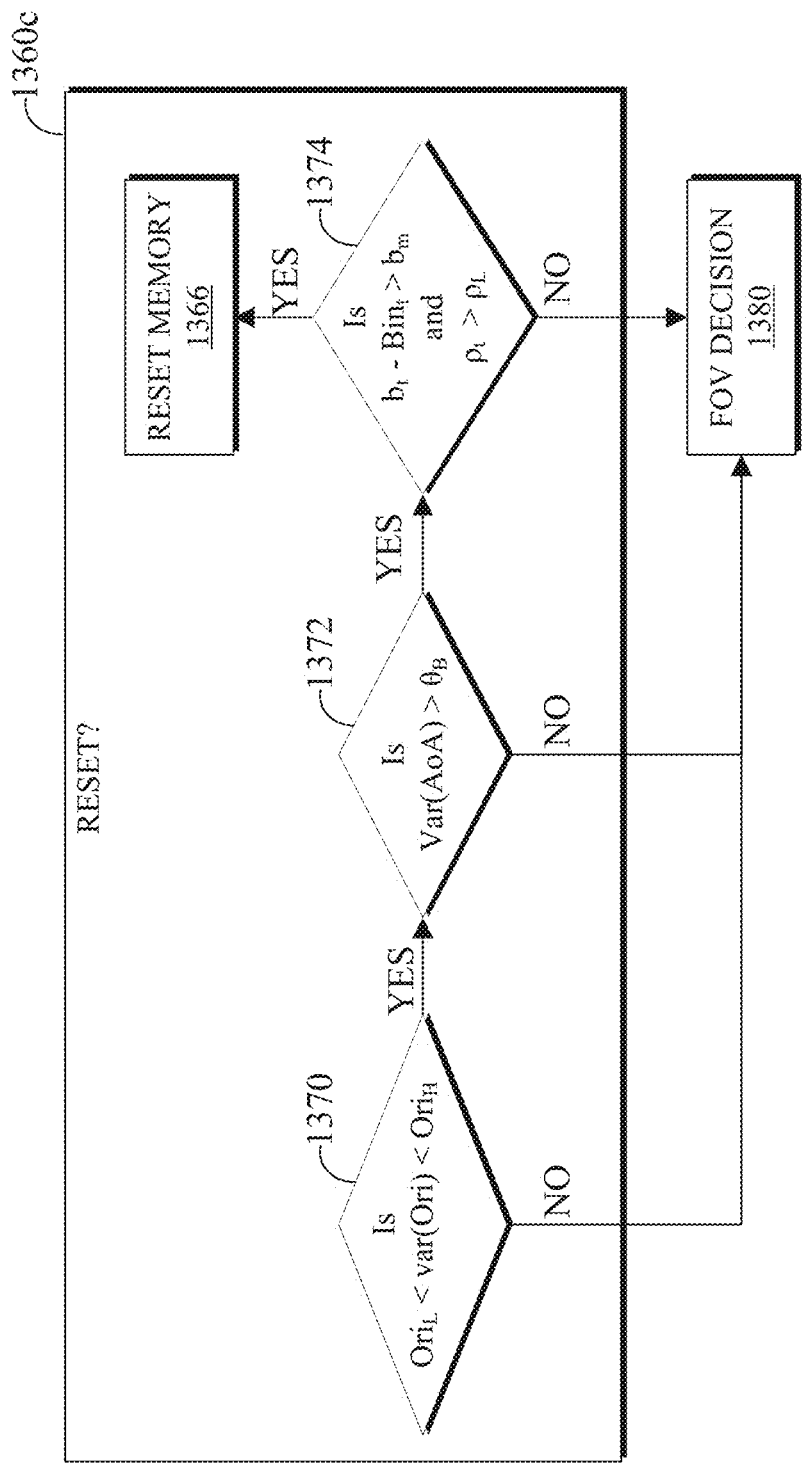

In step 1302, the SCC operation 520*a* determines whether the device is in motion. FIG. 13C describes step 1302 in greater detail. When the electronic device is in motion, the SCC operation 520*a*, in step 1310, determines whether the AoA of the target device are within a threshold range of the FoV angles of the electronic device. FIG. 13D describes step 1310 in greater detail. When the AoA of the target device are within a threshold range of the FoV angles of the electronic device, the SCC operation 520*a*, in step 1320, determines whether the AoA of the target device and the orientation of the electronic device are correlated. FIG. 13E describes step 1320 in greater detail. When the AoA of the target device and the orientation of the electronic device are correlated, the SCC operation 520*a*, in step 1330, updated the memory. FIG. 13F illustrates an example structure of the memory. After updated the memory in step 1330 the active check operation 1340 is performed. Alternatively, the active check operation 1340 is performed if (i) the electronic device is not in motion (as determined in step 1302), (ii) the AoA of the target device are not within a threshold range of the FoV angles of the electronic device (as determined in step 1310), or (iii) AoA of the target device and the orientation of the electronic device are not correlated (as determined in step 1320). FIG. 13G illustrates the active check operation 1340. When the SCC operation 520*a* is determined to be active, the get boresight bin operation 1350 identifies a boresight direction. FIG. 13H illustrates the get boresight bin operation 1350. Once the boresight direction is identified, the SCC operation 520*a* determines whether a reset operation 1360 is to be performed to the memory. FIGS. 13I, 13J, and 13K illustrates conditions used to determine whether the reset operation 1360 is to perform a reset. In response to the active check operation 1340 determining that the electronic device is in FoV or the reset operation 1360 determines not to perform a reset, a FoV decision operation 1380 determines whether the target device is in FoV or out-of-FoV of the electronic device. FIG. 13M illustrates the FoV decision operation 1380. The FoV decision operation 1380 generates output 522 representing the FoV decision of the SCC operation 520*a*.

In step 1302, of FIGS. 13A and 13C, the SCC operation 520*a* performs an orientation variation check for determining whether the electronic device is in motion based on received motion measurements 504. For example, in step 1302, the SCC operation 520*a* determines whether the electronic device 402 underwent sufficient rotary motion and variation in heading to activate the SCC operation 520*a* and update memory, accordingly. For instance, the electronic device 402 determines whether the rotary motion of the electronic device and variations of the heading of the electronic device are larger than a threshold. Accordingly, step 1302 acts as an input gate for further processing. FIG. 13C illustrates step 1302 in greater detail.

As illustrated in FIG. 13C, step 1302 determines whether the device is in motion. In certain embodiments, an orientation buffer 1304 is maintained for storing orientation information. The orientation buffer 1304 is size T, where T is T≥0, and used to store orientation values and t is the current time step. The step 1302 checks if the value identified by variance of the orientation (step 1306) lies within a bound or within a threshold range (such as a between a predefined high orientation value, $Ori_H$, and a predefined low orientation value, $Ori_L$). $Ori_H$ and $Ori_L$ can be based on minimum and maximum movement speeds that produce variations in a predefined range.

In response to determining that the motion measurement at a given time interval is within the threshold range, then the SCC operation 520*a* proceeds to step 1310. Alternatively, when the motion measurement at a given time interval is not within the threshold range, then the SCC operation 520*a* proceeds to the active check operation 1340.

In certain embodiments, the orientation buffer 1304 stores a predefined number of samples. Each new sample is stored at in the buffer. For example, the orientation buffer 1304 can store between five to ten samples in the case of 10 Hz sampling rate (e.g., where orientation measurements are obtained every 0.1 seconds). Variance of a vector Ori is defined in Equation (46), below, where E(·) denotes the expectation or the sample mean.

$$\text{var}(Ori)=E(Ori^2)-[E(Ori)]^2 \quad (46)$$

Other ways to check if the heading of the electronic device 402 underwent a variation larger than a threshold include: thresholding one or more values of the orientation buffer, checking for successive differences in values of orientation, using statistical measures of orientation based on a factor or multiple of inter-quartile ranges over a sliding window, or the like. It is noted that other statistical measures or functions such as standard deviation, interquartile ranges, and the like. can also be used to check or impose limits the variation of orientation.

In response to determining that the electronic device 402 is in motion (in step 1302) the SCC operation 520*a*, in step 1310 (as illustrated in FIGS. 13A and 13D), determines whether the AoA (from the target device) is close to predefined range of FoV angles (of the electronic device) based on received signal measurements 506. The AoA check of step 1310 is performed to identify whether the target device 410 is in the vicinity of the boresight direction of the electronic device 402. For example, the AoA check of step 1310 determines whether the reported AoA value of the signal measurements 506 are within a predefined range. The AoA check of step 1310 is an input gate to the further processing operations of the SCC operation 520*a*.

If the target device (such as the target device 410*b*) is not in the vicinity of the boresight direction of the electronic device 402, the received AoA will be outside a predefined set of values. Accordingly, when AoA will be outside a predefined set of values (such as when the target device is not in the vicinity of the boresight direction of the electronic device 402) the memory is not updated since the current boresight direction is not one of the candidate boresight directions.

As illustrated in FIG. 13D, a AoA buffer 1312 is maintained for storing AoA values from the signal measurements 506. The AoA buffer 1312 is of length T≥0. The AoA buffer 1312 can store between five to ten samples in the case of 10 Hz sampling rate (e.g., where AoA measurements are obtained every 0.1 seconds). The AoA check of step 1310, checks if the most recent value of AoA (which is stored in the orientation buffer 1304) is within a desired range of values, denoted by $\theta_A$ (step 1314). In response to determining that the AoA at a given time interval is within the threshold range, then the SCC operation 520*a* proceeds to step 1330. Alternatively, when the AoA at a given time interval is not within the threshold range, then the SCC operation 520*a* proceeds to the active check operation 1340.

In certain embodiments, the threshold, $\theta_A$ can be based on the range around the boresight in FoV over which AoA has a linear transverse characteristics. In other embodiments, the threshold $\theta_A$ can be limited to the angles of interest for which FoV is used. In yet other embodiments, asymmetrical bound on AoA such as $\theta_{A_L} < AoA < \theta_{A_H}$ can be used to define the threshold $\theta_A$, where $\theta_{A_L}$ and $\theta_{A_H}$ denote the lower and upper limits for AoA range.

In certain embodiments, the AoA check of step 1310 can be performed by checking whether one or more values of AoA in the AoA buffer 1312 (such as (i) the most recent and the oldest value of AoA or (ii) all values of AoA that are stored in the AoA buffer 1312) are within the desired range. In other embodiments, a univariate or multivariate function based on the values in the AoA buffer 1312 can be used to perform the AoA check of step 1310. Other metrics to obtain the set of predefined values for AoA include an average AoA over a sliding window, at least one AoA outside the predefined set over a sliding window, statistical measures of the AoA like interquartile range over a sliding window, and the like.

In response to determining that the AoA from the target device is within the vicinity of the boresight direction of the electronic device 402 (step 1310), the SCC operation 520*a*, in step 1320 (as illustrated in FIGS. 13A and 13E), determines whether the AoA and orientation values are correlated. In step 1320, correlation value(s) between the AoA buffer 1312 and the orientation buffer 1304 are identified and then compared to a threshold. a high correlation indicates that the target device 410 is in FoV of the electronic device 402. In contrast a low correlation indicates that the target device 410 is out-of-FoV of the electronic device 402. When the correlation value exceeds a threshold, denoted as $\rho_{th}$, the memory of the SCC operation 520*a* is updated in step 1330.

As illustrated in FIG. 13E, step 1320 inspects the AoA buffer 1312 and the orientation buffer 1304. In step 1322, the correlation between the two buffers are identified. In certain embodiments, Pearson's co-efficient is used to identify the correlation. For example, a Pearson's co-efficient between the AoA and orientation buffers is identified to check if the two are correlated. Pearson's Coefficient is a statistic that measures linear correlation between two variables X and Y. It is also known as Pearson product-moment correlation coefficient (PPMCC), or "Pearson's correlation coefficient", commonly called simply "the correlation coefficient". Pearson's Coefficient is defined as the quality of least squares fitting to the original data and obtained by taking the ratio of the covariance of the two variables from a numerical dataset, normalized to the square root of their variances. Pearson's Coefficient, $\rho_{X,Y}$ is defined in Equation (47).

$$\rho_{X,Y} = \frac{E(XY) - E(X)E(Y)}{\sqrt{E(X^2) - E(X)^2}\sqrt{E(Y^2) - E(Y)^2}} \quad (47)$$

Here, E(·) denotes expectation, which can be approximated as sample mean.

In certain embodiments, the variance of the difference between the AoA and orientation is used to check whether they are correlated.

In step 1324, the correlation value is compared to the predefined threshold, $\rho_{th}$. A non-limiting example of a threshold for Pearson correlation is $\rho_{th}=0.9$. When the identified correlation value (of step 1322) is greater than the predefined threshold, $\rho_{th}$, the memory is updated in step 1330, otherwise the active check operation 1340 is performed.

The memory is updated in step 1330, in response to determining that the device is in motion (step 1302), the AoA values are close to FoV angles (step 1310), and the AoA and orientation are correlated (1320). The memory of the SCC operation 520*a* is used to store candidate boresight directions and corresponding correlation values (of step 1320). The memory of the SCC operation 520*a* is illustrated in FIG. 13F.

As illustrated in FIG. 13F, the memory includes multiple bins, B, where each bin includes multiple slots that store a correlation value (identified in step 1322) with a corresponding time stamp. Orientation of 360 degrees is divided in B discrete levels and each bin represents a range of orientation angles. For example, when there are 36 bins, each bin represents 10 orientation values. The number of bins can depend on the error in sensor measurements. For example, the size of the bin can be about twice the error in AoA measurement to allow stability in the boresight bin calculation. The bins are indexed by b∈(1, B) and the $b^{th}$ bin is denoted by the set $B_b$. If orientation range is 0≤Ori≤360, the bin corresponding to the orientation, Ori, is described in Equation (48) below.

$$\left\lfloor \frac{B \cdot Ori}{360} \right\rfloor + 1 \quad (48)$$

Each bin includes sets of ordered pairs of the timestamp and the corresponding correlation value of AoA and orientation buffers (Pearson's coefficient). The ordered pairs of a set $B_b$ are indexed by k∈(1, K) where K is the maximum cardinality set for any set $B_b$. The $k^{th}$ ordered pair of the set $B_b$ is stored in the $k^{th}$ slot of bin b. Timestamp stored in the slot k of bin b, is denoted by $\tau_k^b$. The correlation coefficient value stored in the slot k of bin b, is denoted by $\rho_k^b$. The set for bin b is described in Equation (49).

$$B_b = \{(\tau_1^b, \rho_1^b), (\tau_2^b, \rho_2^b), \ldots, (\tau_K^b, \rho_K^b)\} \quad (49)$$

In certain embodiments, the memory of the SCC operation 520*a* includes correlation values corresponding to a discrete range of orientation angles.

The memory is updated when any candidate boresight direction reports a correlation value that is larger than a threshold, such as the threshold $\rho_{th}$. In certain embodiments, a new ordered pair for the bin corresponding to $Ori_t$, the orientation at timestamp t, denoted by Equation (48) is added subject to the conditions of satisfying steps 1302, 1310, and 1320. Thereafter, the timestamp, t and the computed correlation value, ρ are updated to the set corresponding to the bin in the corresponding slot, k, as described in Equation (50) and Equation (51). In other embodiments, the bins are updated subject to satisfying a portion of the conditions described in steps 1302, 1310, and 1320.

$$\tau_k^{b_t} = t; \rho_k^{b_t} = \rho \quad (50)$$

$$B_{b_t} = B_{b_t} \cup \{(\tau_k^{b_t}, \rho_k^{b_t})\} \quad (51)$$

After (i) determining the electronic device 402 is not in motion (step 1302), (ii) determining the AoA of the target device is not within a threshold range to the FoV angles of the electronic device (step 1310), (iii) determining the AoA and orientation are not correlated (step 1320), or (iv) updated the memory (step 1330) the active check operation 1340, determines whether the SCC operation 520a is active. FIGS. 13A and 13G describes the active check operation 1340.

In step 1342, the active check operation 1340 determines that the SCC operation 520a is active 1344 when a sufficient number of correlation values are included in at least one candidate boresight. For example, the SCC operation 520a is active when at least one bin of the memory includes a number of slot entries that is larger than a threshold. Equation (52) describes a condition for determining whether a minimum number of bin entries is satisfied.

$$\exists B_b, b \in (1,B) : |B_b| \geq K_{min} \quad (52)$$

Here, $K_{min}$ is a threshold for minimum cardinality in at least one bin $B_b$. In certain embodiments, the value of $K_{min}$ is 2.

If active check operation 1340 determines that the SCC operation 520a is not active (inactive) when the memory was not updated for a period of time. In step 1345, the active check operation 1340 determines (i) whether the SCC operation 520a previously determined that the target device was in FoV of the electronic device, and (ii) the AoA is within the range of FoV values (as determined in step 1310). When both conditions are satisfied, the active check operation 1340, determines that target device is in FoV in decision 1346. Alternatively, when one or both of the conditions are not satisfied (such that the AoA values are not close to the FoV angles, or the target device was not previously in FoV) then the active check operation 1340 determines that the SCC operation 520a is inactive in decision 1348.

When the number of high correlation ($\rho > \rho_{th}$) entries are filled in the slots of a given bin is larger than a threshold, indicates that there is a sustained high correlation between AoA and Ori buffers, and the likelihood that the boresight 406 of electronic device 402 has spatially traversed the target device 410 within the FoV range is high.

In certain embodiments, the active check operation 1340 identifies based on the condition, described in Equation (53), whether the SCC is active. For example, if the condition of Equation (53) is satisfied, then the active check operation 1340 determines that the SCC operation 520a is active. Alternatively, if the condition of Equation (53) is not satisfied, then the active check operation 1340 determines that the SCC operation 520a is inactive.

$$\beta_b, b \in (1,B) \text{ such that } |\beta_b| \geq K_{min} \quad (53)$$

After determining that the SCC operation 520a is active, the get boresight bin operation 1350 (as illustrated in FIGS. 13A and 13H) identifies a boresight direction from the candidate boresight bins included in the memory. The identified boresight direction is selected from the bin with the highest mean correlation amount all bins in the memory. The selected boresight bin corresponds to the boresight direction of the electronic device within the FoV. The cardinality of the set Bb at the current timestamp, t, is described in Equation (54).

$$|B_b|_t = N_b \leq K \quad (54)$$

FIG. 13H illustrates the get boresight bin operation 1350. In step 1352, the get boresight bin operation 1350 identifies a local decay weight and a global decay weight. The local time decay weighting factor for a bin $b \in (1, B)$ is described in Equation (55). The local time decay weighting factor indicates that new data is weighted higher than stale data and therefore more recent data has a greater impact on the weighted mean correlation (described below) than older data. As described local time decay weighting of Equation (55) is an exponential weight such that minimal weight is assigned to samples that are old.

$$w_{L_k}^b = \exp(-(\tau_{N_b}^b - \tau_k^b)/T_L), \forall k \in (1, N_b) \quad (55)$$

Here, $\tau_L$ is the local decay constant, $\tau_k^b$ is the timestamp in the $k^{th}$ slot of bin b and $\tau_{N_b}^b$, is the timestamp stored in the bin b for $k=N_b$.

The global time decay weighting factor for a bin $b \in (1, B)$ is described in Equation (56). The global time decay weighting factor indicates that new data is weighted higher than stale data and therefore more recent data has a greater impact on the weighted mean correlation (described below) than older data. As described global time decay weighting of Equation (56) is an exponential weight such that minimal weight is assigned to samples that are old.

$$w_G^b = \exp(-(t - \tau_{N_b}^b)/\tau_G) \quad (56)$$

Here, $\tau_G$ is the global decay constant.

Although an exponential weight profile is used in both the local and global weighting factor (such that a low weight is assigned to samples that are old), other decay functions can also be used (such as linear, quadratic decay, and the like.) In certain embodiments, $\tau_G > \tau_L$ and each of TG and TL can be in a range from about 10 seconds to about 30 seconds.

In step 1354, the get boresight bin operation 1350, identifies a weighted mean correlation for all bins in the memory. The local and global decay weighted mean correlation for a bin $b \in (1, B)$ at time t denoted by $\rho_t^b$ and described in Equation (57).

$$\overline{\rho_t^b} = \frac{w_G^b}{N_b} \sum_{k \in (1, N_b)} w_{L_k}^b \rho_k^b \quad (57)$$

In certain embodiments, the local and global decay constants are selected in such a way to reduce the extent to which older correlation values stored in the memory contribute to the computation of the weighted mean correlation. These values can be selected such that the weighted correlation of bin b in slot k, satisfy the condition of Equation (58).

$$w_G^b w_{L_k}^b \rho_k^b < \rho_{min}, (t - \tau_{N_b}^b) > \tau_r \quad (58)$$

Here, $\tau_r$ is selected based on the duration for which the correlation value is to remain relevant for the use case. If $\rho_t^b$ drops below a lower threshold, $\rho_{low}$. In certain embodiments, $\tau_r$ is selected approximately 10 seconds and t be reported in milliseconds.

An example value for the global decay factor $\tau_G$ can be 20,000 (in milliseconds) and the local decay factor, $\tau_L$ can be 10,000 (in milliseconds). An example lower threshold for mean correlation, Plow can be 0.3.

In step 1356, the get boresight bin operation 1350, identifies a maximum (highest) mean correlation bin, among all of the bins in the memory, as the boresight bin. For example, boresight bin at timestamp t, denoted by $bin_t$ is obtained as the bin yielding the maximum weighted mean correlation, as described in Equation (59).

$$bin_t = \max \rho_t^b, \forall b \in (1, B) \quad (59)$$

Figure 13L:
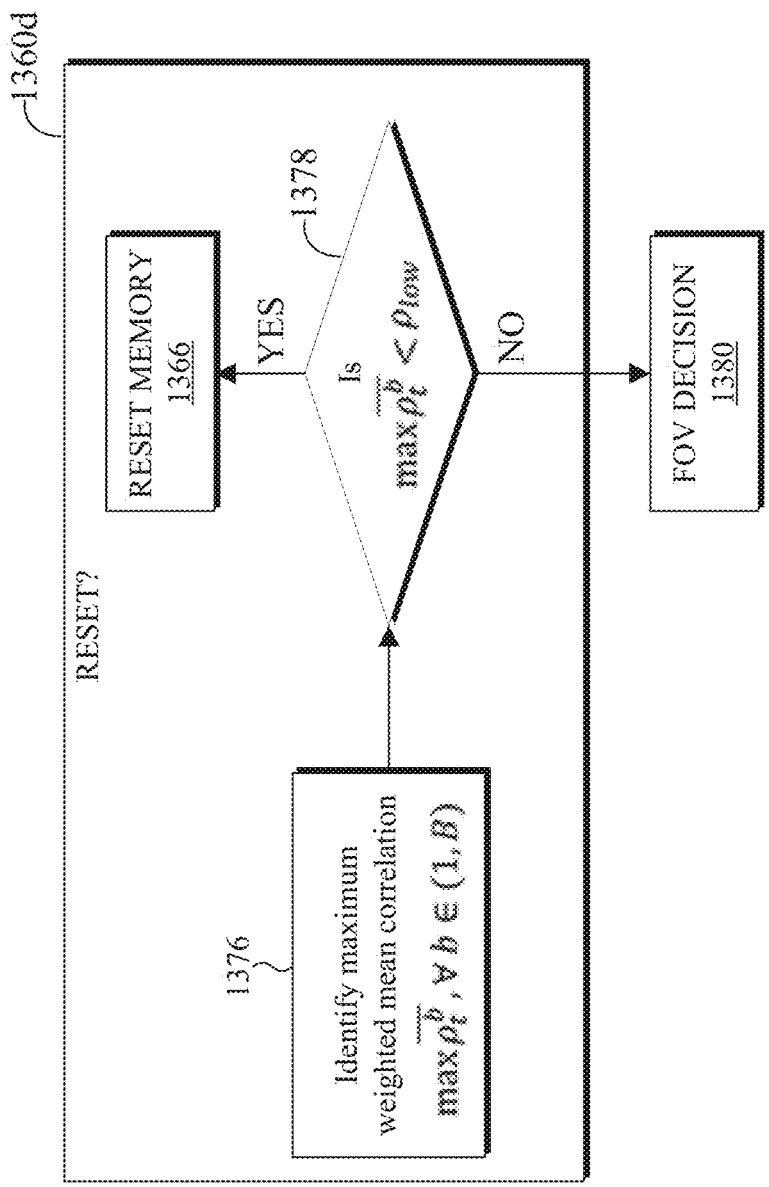
Figure 13M:
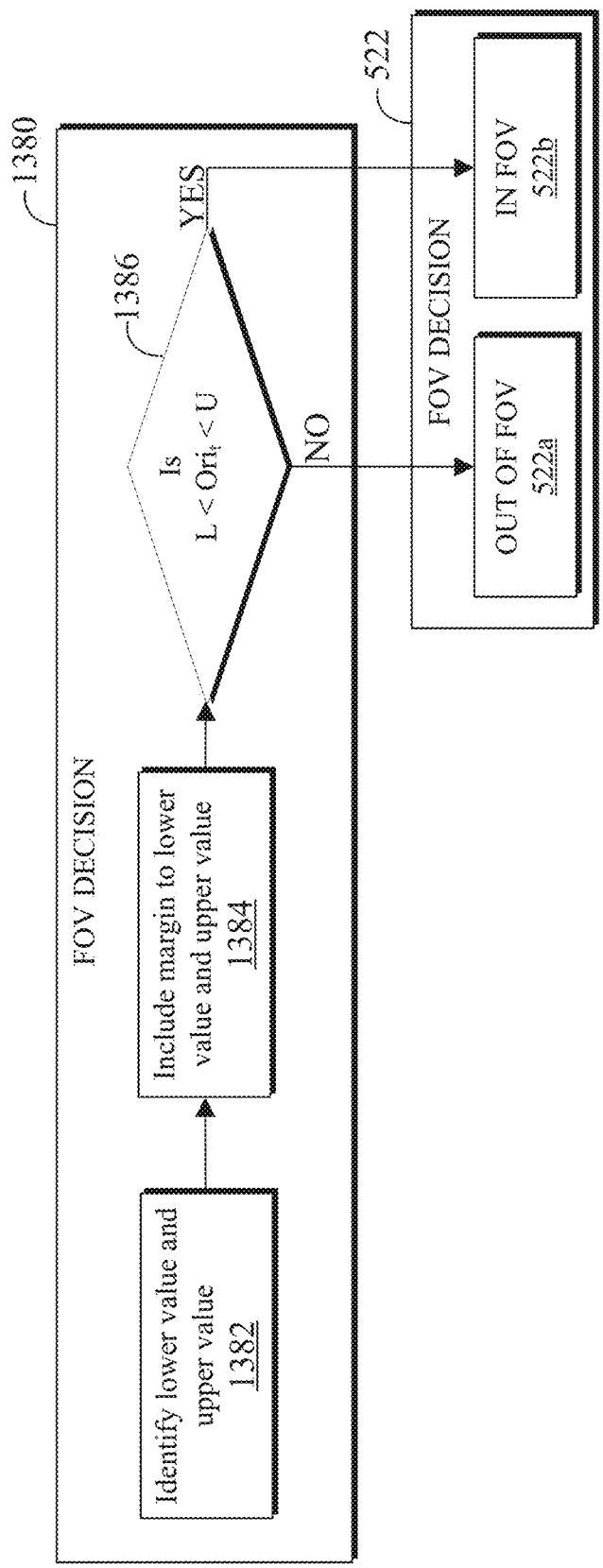

As illustrated in FIGS. 13A, 13I, 13J, 13K, and 13L a reset operation 1360 is performed for determining whether to reset the memory. The reset operation 1360 can perform a reset when various conditions are satisfied. For example, FIG. 13I describes the reset operation 1360a determining whether to reset the memory based on whether the electronic device 402 is stationary and the orientation is not within a threshold proximity to the identified boresight bin. FIG. 13J describes the reset operation 1360a determining whether to reset the memory when the AoA in in FoV but the orientation is varying. FIG. 13K describes the reset operation 1360c describing that a reset is performed if the AoA is incorrectly reported as in FoV, and the correlation value is lower than a threshold. FIG. 13L describes the reset operation 1360d describing that a reset is performed if the maximum weighted mean correlation (as identified in step 1322) is below a predefined threshold. In certain embodiments the reset operation 1360 of FIG. 13A can include the reset operation 1360a of FIG. 13I, the reset operation 1360b of FIG. 13J, the reset operation 1360c of FIG. 13K, the reset operation 1360d of FIG. 13L, or any combination thereof.

As illustrated in FIG. 13I, the reset operation 1360a describes resetting the memory when the electronic device 402 is stationary. In step 1362, the reset operation 1360a determines whether all of the values of Orientation buffer 1304a, $Ori_{t-i}$, $\forall i \in (0, T)$ are less than an upper limit $Ori_H$. when the orientation values are less than the upper limit $Ori_H$ indicates that the electronic device 402 is stationary. Upon determining that the electronic device is not stationary, in step 1362, the reset operation 1360a determines not to reset the memory and the SCC operation 520a proceeds to the FoV decision operation 1380. Upon determining that the electronic device is stationary, in step 1364a, the reset operation 1360a determines whether the bin, bt, correspond to the current operation $ori_t$, given by Equation (48), above, is not close to the boresight bin, $bin_t$, as identified in the get boresight bin operation 1350. That is, if the current orientation is not close to the identified boresight bin, then the memory is reset in step 1366. Alternatively, if the current orientation is close to the identified boresight bin, then the SCC operation 520a proceeds to the FoV decision operation 1380

As illustrated in FIG. 13J, the reset operation 1360b describes resetting the memory when the AoA is in FoV, and the orientation is varying. In step 1368, the, the reset operation 1360b determines whether all the values of AoA in the AoA buffer 1312 are within a predefined range. Upon determining that the of AoA are within a predefined range, in step 1368, the reset operation determines not to reset the memory and the SCC operation 520a proceeds to the FoV decision operation 1380. Alternatively, upon determining that the of AoA are not within the predefined range, in step 1364b, the reset operation 1360b determines whether the bin, bt, correspond to the current operation $ori_t$, given by Equation (48), above, is not close to the boresight bin, $bin_t$, as identified in the get boresight bin operation 1350. That is, if the current orientation is not close to the identified boresight bin, then the memory is reset in step 1366. Alternatively, if the current orientation is close to the identified boresight bin, then the SCC operation 520a proceeds to the FoV decision operation 1380. It is noted that the reset operation 1360b refers to the scenario when the electronic device is moving around the target device but is always pointing towards the target device.

As illustrated in FIG. 13K, the reset operation 1360c describes resetting the memory when AoA is incorrectly reported as in FoV, and the correlation value is low. The reset operation 1360c determines to reset the memory (step 1366) when the variance of orientation is within a predefined range (step 1370) but the variance of AoA is higher than a threshold, $\theta_B$ (step 1372), and the SCC bin, $b_t$ corresponding to the current orientation Orit based on Equation (48) is close to the boresight bin, $Bin_t$ (identified in the get boresight bin operation 1350) as determined by the limit $b_m$ (step 1374). The reset operation 1360c describes a scenario of when the SCC operation 520a lodged on to an incorrect boresight.

As illustrated in FIG. 13L, the reset operation 1360d describes resetting the memory when the maximum weighted mean correlation value is below a threshold, denoted as $\rho_{low}$. In step 1378, the reset operation 1360d compares the largest weighted correlation value (as identified from step 1322) to the threshold, $\rho_{low}$. When the largest weighted correlation value is larger than the threshold, Plow, then the SCC operation 520a proceeds to the FoV decision operation 1380. Alternatively, when the largest weighted correlation value is less than the threshold, Plow, then the memory is reset in step 1366.

In response to determining not to reset the memory, the SCC operation 520a performs the FoV decision operation 1380. The FoV decision operation 1380 is illustrated in FIGS. 13A, 13B, and 13M. The FoV decision operation 1380 checks if the current boresight is within a margin of vicinity to the boresight direction as identified in the obtain boresight bin operation 1350. If the current boresight is within a margin of vicinity to the boresight direction, then the target device is in FoV 522b. alternatively, if the current boresight is not within the margin of vicinity to the boresight direction, then the target device is out-of-FoV 522a.

In certain embodiments, the obtain boresight bin operation 1350 outputs the SCC boresight bin, $Bin_t$ for each time step. In step 1382, the FoV decision operation 1380 identifies the lower value (denote by l) and upper value (denote by u) of the boresight orientation. Equation (60) describes identifying the identifies the lower and upper values.

$$\ell = \frac{360}{B}(Bin_t - 1); u = \frac{360}{B}Bin_t \tag{60}$$

In step 1384, the FoV decision operation 1380 includes a margin (surplus), denoted as M, to the identified lower and upper values. Equation (61) describes including the margin to the lower and upper values. In certain embodiments, the M is a values of orientation that yields the correct range of actual angles for which FoV, denoted by $\pm\theta_{FoV}$.

$$L=l-M; U=u+M \tag{61}$$

To generate the FoV decision (output 522), the FoV decision operation 1380, in step 1386, determines whether the orientation is between the modified upper and lower values (the upper and lower values that include the margin threshold). When the orientation is between the modified upper and lower values then the target device is determined to be in FoV 522b. Alternatively, when the orientation is not between the modified upper and lower values then the target device is determined to be out-of-FoV 522a.

Although FIGS. 13A and 13B illustrate example methods for performing the SCC operation 520 of FIGS. 5A and 5B, various changes may be made to FIGS. 13A and 13B. For example, while shown as a series of steps, various steps could overlap, occur in parallel, occur in a different order, or occur multiple times. In another example, steps may be omitted or replaced by other steps.

Figure 14:
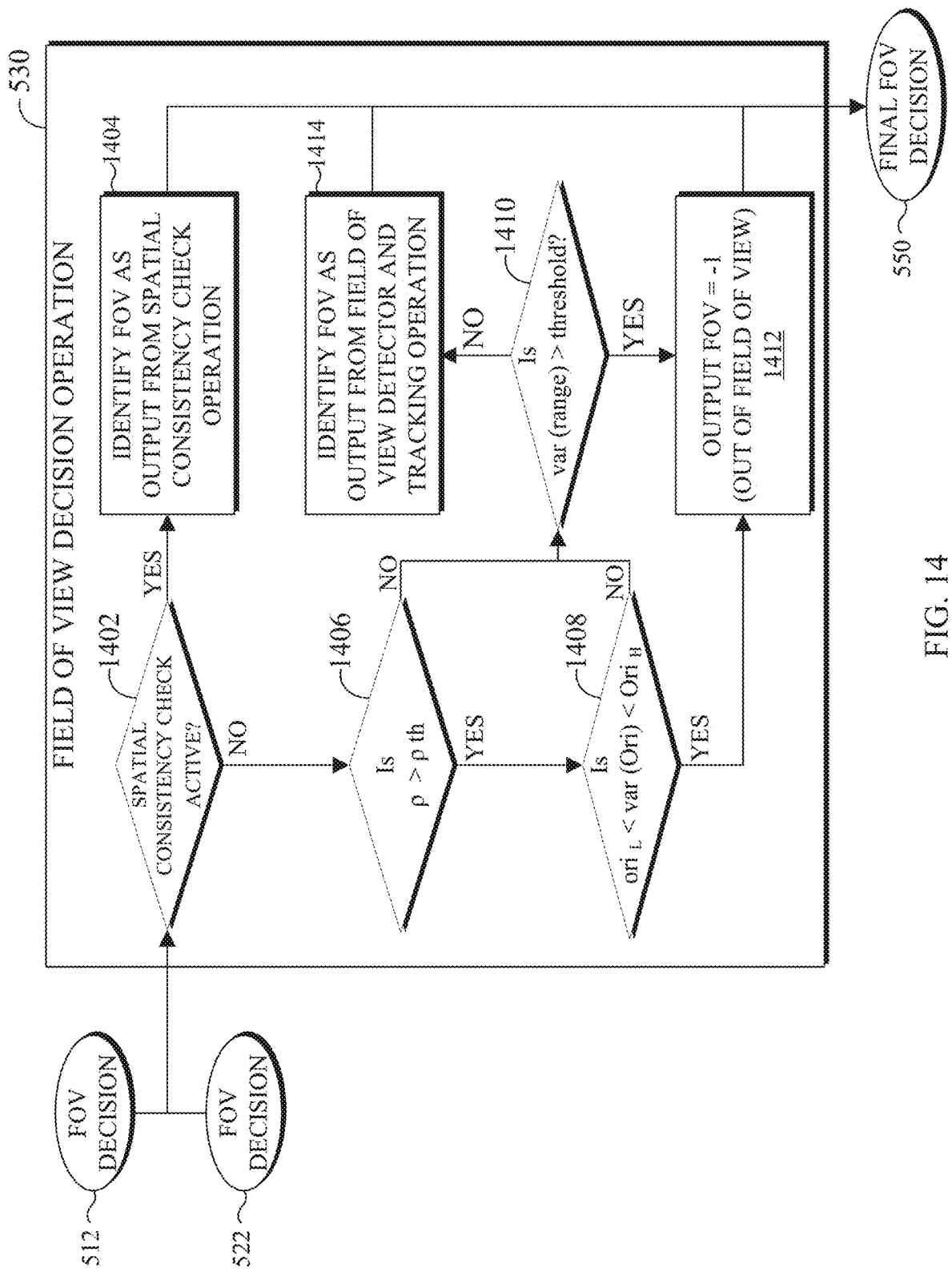
FIG. 14 illustrates an example block diagram of the field of view decision operation combining FoV detector and tracking operation and the spatial consistency check operation of FIG. 5A according to embodiments of the present disclosure.

FIG. 14 illustrates an example method for performing the FoV decision operation 530 which combines the FoV detector and tracking operation 510 and the SCC operation 520 of FIG. 5A according to embodiments of the present disclosure. The method 1400 is described as implemented by any one of the client device 106-114 of FIG. 1 and can include internal components similar to that of electronic device 200 of FIG. 2 and the electronic device 301 of FIG. 3. However, the method 1400 as shown in FIG. 14 could be used with any other suitable electronic device and in any suitable system.

The FoV decision operation 530 receives the output 512 from the FCT operation 510 (a decision of whether the target device is in FoV of the electronic device) and output 522 from the SCC operation 520 (a decision of whether the target device is in FoV of the electronic device and an indication of whether the SCC operation is active). The FoV decision operation 530 fuses the received the outputs 512 and 522 with some additional logics to mitigate errors and provides the Final FoV decision 550.

For example, If the SCC operation 520 is active, the FoV decision (output 522) from the SCC operation 520 is used as the Final FOV decision 550. When the SCC operation 520 is inactive, if the device is in motion and AoA and orientation buffers are not correlated or if the variance of the range over a sliding window buffer is higher than a threshold, the Final FOV decision 550 is declared as out-of-FoV (represented by the binary value of −1). Otherwise, when the SCC operation 520 is inactive, the output of the FCT operation 510 is used as the Final FoV decision 550.

In step 1402 the FoV decision operation 530 determines, based on the output 522 whether the SCC operation 520 is active. In step 1404, when the SCC operation 520 is active, the FoV decision operation 530 identifies the final FoV decision 550 as the output 522. For example, when the SCC operation 520 is active, the final FOV decision 550 is in FoV, when the FoV decision of output 522 of the SCC operation 520 indicates that the target device is in FoV of the electronic device. Alternatively, when the SCC operation 520 is active, the final FoV decision 550 is out-of-FoV, when the output 522 of the SCC operation 520 indicates that the target device is out-of-FoV of the electronic device.

In response to determining that the SCC operation is not active, the FoV decision operation 530 determines whether the correlation is below a threshold, in step 1406. If the correlation is above a threshold (as determined in step 1406), the FoV decision operation 530 determines whether the electronic device is in motion in step 1408. When the SCC operation is inactive (as determined in step 1402), the correlation is below a threshold (as determined in step 1406), and the electronic device is in motion (as determined in step 1408), the FoV decision operation 530 in step 1412, determines that target device is out of FoV of the electronic device, and sets the Final FoV decision 550 to out-of-FoV.

Alternatively, when the SCC operation is inactive (as determined in step 1402), the correlation is below a threshold (as determined in step 1406), or the electronic device is not in motion (as determined in step 1408), the FoV decision operation 530 in step 1410, determines whether a variation in the range is above a threshold. When the variation in the range is above a threshold, the FoV decision operation 530 in step 1412, determines that target device is out of FoV of the electronic device, and sets the Final FOV decision 550 to out-of-FoV.

When the variation in the range is below a threshold (as determined in step 1410), the FoV decision operation 530 in step 1414 identifies the final FOV decision 550 as the output 512. For example, when the output 512 of the FCT operation 510 indicates that the target device is in FoV of the electronic device, then the final FOV decision 550 is in FoV. Alternatively, when the output 512 of the FCT operation 510 indicates that the target device is out-of-FOV of the electronic device, then the final FoV decision 550 is out-of-FoV.

Although FIG. 14 illustrates an example method, various changes may be made to FIG. 14. For example, while the method 1400 is shown as a series of steps, various steps could overlap, occur in parallel, occur in a different order, or occur multiple times. In another example, steps may be omitted or replaced by other steps.

Figure 15:
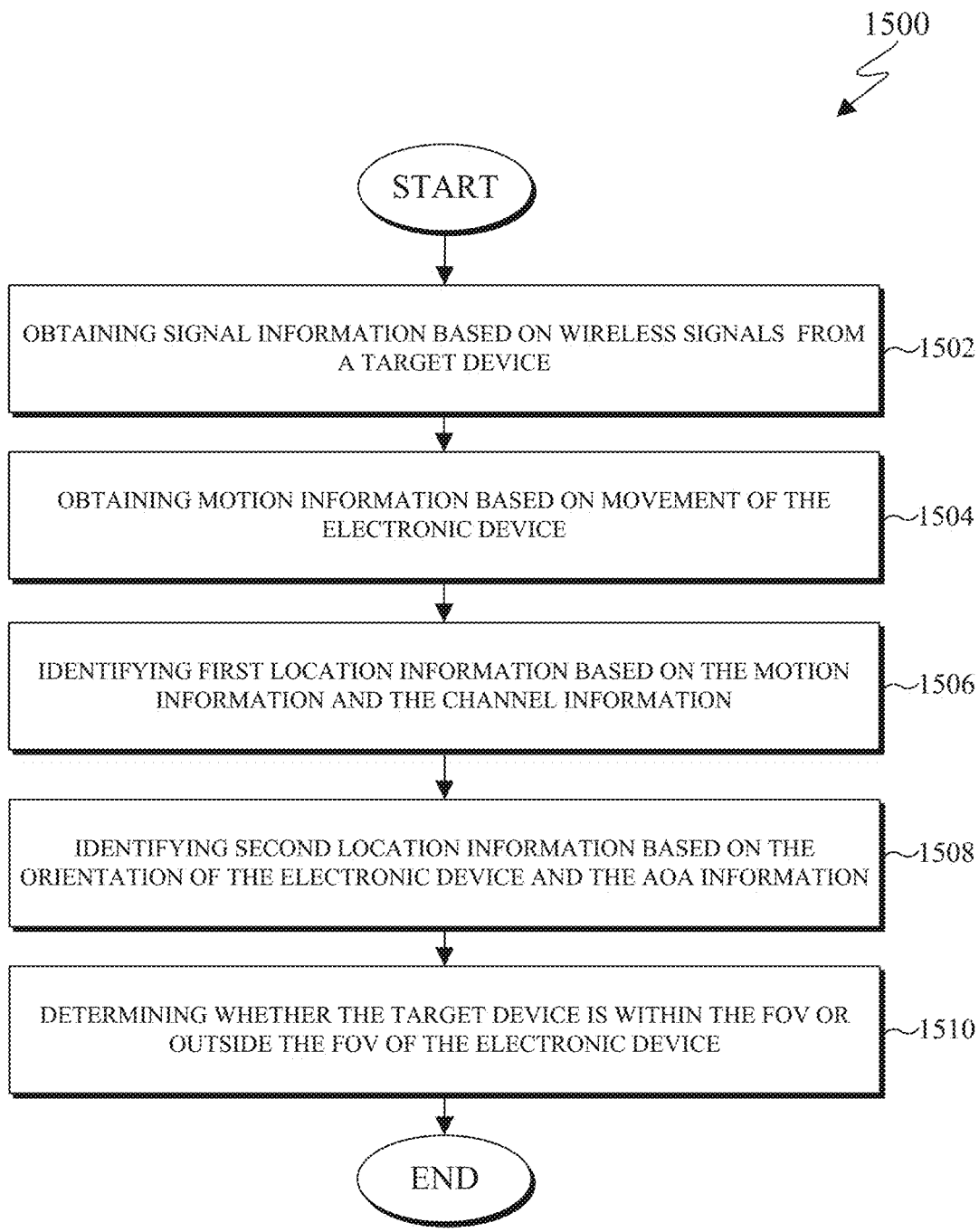
FIG. 15 illustrates an example method for FoV determination according to embodiments of the present disclosure.

FIG. 15 illustrates an example method for FoV determination according to embodiments of the present disclosure. The method 1500 is described as implemented by any one of the client device 106-114 of FIG. 1 and can include internal components similar to that of electronic device 200 of FIG. 2 and the electronic device 301 of FIG. 3. However, the method 1500 as shown in FIG. 15 could be used with any other suitable electronic device and in any suitable system.

In step 1502, the electronic device, obtains signal information based on wireless signals communicated between an electronic device and a target device. The signal information can include channel information, range information, and AoA information, and the like. In certain embodiments, the electronic device includes a transceiver that obtains signals directly from the target device. In other embodiments, an electronic device, such as the server 104 of FIG. 1 obtains information associated with signals that are communicated between an electronic device and an target device.

In certain embodiments, the electric device identifies, at different instances in time, an AoA indicated in the AoA information and range indicated in the range information between the target device and the electronic device based on the signal information. In certain embodiments, the channel information includes features of a CIR of the wireless signals. The features of the CIR can include variations in range between the electronic device and the target device over a period of time. The features of the CIR can also include variations of the AoA and the orientation over the period of time. The features of the CIR can further include variations of a first peak strength of the CIR over the period of time. Additionally, the features of the CIR can include a minimum of a difference between a strength of the first peak strength and a strength of a strongest peak of the CIR. The features of the CIR can also include a time difference between the first peak strength of the CIR and the strongest peak, the first peak strength of the CIR, AoA, and the like.

In step 1504, the electronic device obtains motion information based on movements of the electronic device. For example, the motion information can be from an IMU sensor such as an accelerometer, gyroscope, magnetometer, and the like. The motion information can include orientation of the electronic device. In certain embodiments, the electronic device includes a one or more motion sensors that obtains and measure motion of the electronic device. In other embodiments, a remote device, such as the server 104 of FIG. 1 obtains the motion information from the electronic device.

In step 1506 the electronic device identifies first location information based on the motion information and the channel information. The first location information indicating whether the target device is within a FoV of the electronic device. In certain embodiments, the electronic device performs a smoothing operation on the AoA information and the range information based on the motion information using a tracking filter when identifying the first location information. In certain embodiments, the first location information is based on SVM operating on the features of the CIR and at least one of the range information or the AoA information. SVM with a gaussian kernel can also be used to indicate whether the target is in or out of FoV using the feature vector.

In certain embodiments, to identify first location information, the electronic device generates an initial prediction of a presence of the target device relative to the FoV of the electronic device based on the channel information and at least one of the range information or the AoA information. The electronic device then determines that the target device is within the FoV or outside the FoV of the electronic device based on the AoA information, the smoothed AoA information, and the initial prediction.

In step 1508 the electronic device identifies second location information based on the orientation of the electronic device and the AoA information. The second location information indicating whether the target device is within the FoV of the electronic device. To identify the second location information, the electronic device determines (i) that the electronic device is in motion, (ii) that the target device is within a threshold range of angles extending from a boresight direction of the electronic device, and (iii) a comparison of a correlation value between the AoA and the orientation for a current timestamp to a threshold.

To determine that the electronic device is in motion, the electronic device determines whether variance of the orientation of the electronic device is within a threshold range. In response to determining that the variance of the orientation is not within the threshold range, the electronic device determines whether spatial consistency between the orientation and the AoA is maintained. In response to determining that the variance of the orientation is within the threshold range, the electronic device determines that the target device is within the threshold range of angles.

In certain embodiments, the electronic device determines that the target device is within a threshold range of angles extending from a boresight direction of the electronic device based on spatial consistency between the orientation and the AoA.

In certain embodiments, the electronic device includes a memory. The memory includes multiple bins corresponding to non-overlapping ranges of orientation angles. Each bin include at least one slot for storing a previously identified correlation value at a corresponding timestamp. The electronic device compares the correlation value of the current timestamp to the correlation threshold comprises determining that the correlation value is above the correlation threshold. Based on the comparison, the electronic device updates the memory.

In certain embodiments, the electronic device determines whether at least one of the multiple bins of the memory includes multiple correlation values with corresponding time stamps. The electronic device determines whether spatial consistency between the orientation and the AoA is maintained by comparing a number of the multiple correlation values associated with one of the multiple bins to a threshold. When the number of the multiple correlation values associated with one of the multiple bins is greater than the threshold indicates that the boresight direction of the electronic device spatially traversed the target device. In response to determining that the spatial consistency is maintained, the electronic device identifying a first bin corresponding to the boresight direction of the electronic device from the multiple bins.

To identify the first bin, the electronic device identifies a weighted mean correlation value for each of the multiple bins based on corresponding local and global decay weights associated with the multiple bins, respectively. The electronic device then selects the first bin from the multiple bins based on a comparison of the weighted mean correlation value of each of the multiple bins to a predefined criteria. In certain embodiments the predefined criteria is highest value of weighted mean correlation.

To identify the second location information, the electronic device determines that the target device is in the FoV of the electronic device when the boresight direction of the electronic device is within the other threshold range of the first bin. Otherwise the second location information indicates that the target device is out of the FoV of the electronic device.

In step 1510 the electronic device determines whether the target device is within the FoV or outside the FoV of the electronic device. To determine whether the target device is within the FoV of the electronic device, the electronic device determines whether the electronic device is in motion. In certain embodiments, motion includes rotary motion.

The electronic device determines whether the target device is within the FoV of the electronic device based in part on the first location information in response to determining that the electronic device is not in motion. Alternatively, the electronic device determines whether the target device is within the FoV of the electronic device based in part on the second location information in response to determining that the electronic device is in motion.

For example, in response to determining that the spatial consistency is maintained the electronic device determines that the target device is within the FoV or outside the FOV of the electronic device based on the second location information. In response to determining that the spatial consistency is not maintained, the electronic device determines a first result based on whether (i) the motion information indicates that the electronic device is in motion and (ii) the AoA and the orientation for a current timestamp are not correlated, or a variance of the range information is larger than a threshold. In response to identifying the first result, the electronic device determines that the target device is outside the FoV of the electronic device.

Alternatively, in response to determining that the spatial consistency is not maintained, the electronic device determines a second result based on determination that the variance of the range information is larger than the threshold and either (i) the electronic device is in motion or (ii) the AoA and the orientation for the current timestamp are not correlated. In response to identifying the second result, the electronic device determines that the target device is within the FoV or outside the FoV of the electronic device based on the first location information.

Although FIG. 15 illustrates an example method, various changes may be made to FIG. 15. For example, while the method 1500 is shown as a series of steps, various steps could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining signal information based on wireless signals communicated between an electronic device and a target device, the signal information including channel information, range information, and angle of arrival (AoA) information;
   obtaining motion information based on movement of the electronic device, the motion information including orientation of the electronic device;
   identifying first location information based on the motion information and the channel information, the first location information indicating whether the target device is within a field of view (FoV) of the electronic device;
   identifying second location information based on the orientation of the electronic device and the AoA information, the second location information indicating whether the target device is within the FoV of the electronic device;
   determining whether the electronic device is in motion based on rotary motion; and
   determining whether the target device is within the FoV or outside the FoV of the electronic device based in part on the first location information in response to determining that the electronic device is not in motion or the second location information in response to determining that the electronic device is in motion,
   wherein identifying the second location information comprises:
      in response to determining that the electronic device is in motion, determining, based on an AoA indicated in the AoA information, whether the target device is within a threshold range of angles extending from a boresight direction of the electronic device;
      in response to determining that the target device is within the threshold range of angles, identifying a correlation value between the AoA and the orientation for a current timestamp;
      comparing the correlation value to a correlation threshold; and
      updating a memory with the correlation value based on the comparison.

2. The method of claim 1, further comprising:
   identifying, at different instances in time, the AoA indicated in the AoA information and range indicated in the range information between the target device and the electronic device based on the signal information; and
   performing, using a tracking filter, a smoothing operation on the AoA information and the range information based on the motion information,
   wherein identifying the first location information comprises:
      generating an initial prediction of a presence of the target device relative to the FoV of the electronic device based on the channel information and at least one of the range information or the AoA information, and
      determining that the target device is within the FoV or outside the FoV of the electronic device based on the AoA information, the smoothed AoA information, and the initial prediction,
   wherein the channel information comprises features of a channel impulse response (CIR) of the wireless signals, and
   wherein the features of the CIR include:
      variations in range between the electronic device and the target device over a period of time,
      variations of the AoA and the orientation over the period of time,
      variations of a first peak strength of the CIR over the period of time,
      a minimum of a difference between a strength of the first peak strength and a strength of a strongest peak of the CIR,
      a time difference between the first peak strength of the CIR and the strongest peak,
      the first peak strength of the CIR, and
      the AoA.

3. The method of claim 1, wherein determining that the target device is within the FoV or outside the FoV of the electronic device comprises:
   determining whether the second location information indicates that spatial consistency between the orientation and the AoA indicated in the AoA information is maintained;
   in response to determining that the spatial consistency is maintained, determining that the target device is within the FoV or outside the FoV of the electronic device based on the second location information;
   in response to determining that the spatial consistency is not maintained, identifying a first result based on a determination that:
      (i) the motion information indicates that the electronic device is in motion and (ii) the AoA and the orientation for the current timestamp are not correlated, or
      a variance of the range information is larger than a threshold;
   in response to determining that the spatial consistency is not maintained, identifying a second result based on a determination that the variance of the range information is larger than the threshold and either (i) the electronic device is in motion or (ii) the AoA and the orientation for the current timestamp are not correlated;
   in response to identifying the first result, determining that the target device is outside the FoV of the electronic device; and
   in response to identifying the second result, determining that the target device is within the FoV or outside the FoV of the electronic device based on the first location information.

4. The method of claim 1, wherein determining whether the electronic device is in motion further comprises:
   determining whether variance of the orientation of the electronic device is within a second threshold range;
   in response to determining that the variance of the orientation is not within the second threshold range, determining whether spatial consistency between the orientation and the AoA is maintained; and
   in response to determining that the variance of the orientation is within the second threshold range, determining whether the target device is within the threshold range of angles.

5. The method of claim 1, further comprising in response to determining that the target device is not within the threshold range of angles, determining whether spatial consistency between the orientation and the AoA is maintained.

6. The method of claim 1, wherein:
the memory includes multiple bins corresponding to non-overlapping ranges of orientation angles, respectively, wherein each of the multiple bins include at least one slot and a slot of the at least one slot stores a previously identified correlation value at a corresponding timestamp;
comparing the correlation value of the current timestamp to the correlation threshold comprises determining that the correlation value is above the correlation threshold; and
updating the memory comprises storing the correlation value and the current timestamp in a slot of one of the multiple bins.

7. The method of claim 6, further comprising
in response to determining that (i) the electronic device is not in motion, (ii) the target device is not within the threshold range of angles from the boresight direction of the electronic device, (iii) the correlation value is below the correlation threshold, or (iv) after the memory is updated, determining whether at least one of the multiple bins includes multiple correlation values with corresponding time stamps;
comparing a number of the multiple correlation values associated with one of the multiple bins to a threshold to determine whether spatial consistency between the orientation and the AoA is maintained, indicating that the boresight direction of the electronic device spatially traversed the target device;
in response to determining that the spatial consistency is maintained, identifying a first bin corresponding to the boresight direction of the electronic device from the multiple bins;
in response to determining that the spatial consistency is not maintained, determining whether a previous spatial consistency indicated that the target device is in the FoV of the electronic device;
in response to determining that the previous spatial consistency indicated that the target device is in the FoV of the electronic device and a current AoA is within an FoV range, determining that the target device as in the FoV of the electronic device; and
in response to determining that the previous spatial consistency indicated that the target device is not in the FoV of the electronic device, determining that the spatial consistency is inactive.

8. The method of claim 7, wherein identifying the first bin comprises:
identifying a local decay weight associated with each of the multiple bins, respectively, and a global decay weight associated with each of the multiple bins, respectively;
identifying a weighted mean correlation value for each of the multiple bins, respectively, wherein the weighted mean correlation value for each of the multiple bins are based the local decay weight and the global decay weight for that bin; and
selecting the first bin from the multiple bins based on a comparison of the weighted mean correlation value of each of the multiple bins to a predefined criteria.

9. The method of claim 7, further comprising determining to reset the memory in response to determining:
that the electronic device is stationary and the orientation is not within a threshold to the first bin;
that the AoA is in the FoV of the electronic device and the orientation is varying;
that the target device is indicated as in the FoV of the electronic device based on the AoA and the correlation value is below a threshold; or
that a weighted mean correlation value associated with each of the bins is below a threshold.

10. The method of claim 7, further comprising:
determining whether the boresight direction of the electronic device is within another threshold range of angles corresponding to the first bin;
determining that the target device is in the FoV of the electronic device when the boresight direction of the electronic device is within the other threshold range of the first bin; and
determining that the target device is out of the FoV of the electronic device when the boresight direction of the electronic device is outside the other threshold range to the first bin.

11. An electronic device comprising:
a processor configured to:
obtain signal information based on wireless signals communicated between the electronic device and a target device, the signal information including channel information, range information, and angle of arrival (AoA) information;
obtain motion information based on movement of the electronic device, the motion information including orientation of the electronic device;
identify first location information based on the motion information and the channel information, the first location information indicating whether the target device is within a field of view (FoV) of the electronic device;
identify second location information based on the orientation of the electronic device and the AoA information, the second location information indicating whether the target device is within the FoV of the electronic device;
determine whether the electronic device is in motion based on rotary motion; and
determine whether the target device is within the FoV or outside the FoV of the electronic device based in part on the first location information in response to determining that the electronic device is not in motion or the second location information in response to determining that the electronic device is in motion,
wherein to identify the second location information, the processor is configured to:
in response to determining that the electronic device is in motion, determine, based on an AoA indicated in the AoA information, whether the target device is within a threshold range of angles extending from a boresight direction of the electronic device;
in response to determining that the target device is within the threshold range of angles, identify a correlation value between the AoA and the orientation for a current timestamp;
compare the correlation value to a correlation threshold; and
update a memory with the correlation value based on the comparison.

12. The electronic device of claim 11, wherein:
the processor is further configured to:
identify, at different instances in time, the AoA indicated in the AoA information and range indicated in the range information between the target device and the electronic device based on the signal information; and perform, using a tracking filter, a smoothing operation on the AoA information and the range information based on the motion information, wherein to identify the first location information the processor is configured to:

generate an initial prediction of a presence of the target device relative to the FoV of the electronic device based on the channel information and at least one of the range information or the AoA information, and determine that the target device is within the FoV or outside the FoV of the electronic device based on the AoA information, the smoothed AoA information, and the initial prediction, the channel information comprises features of a channel impulse response (CIR) of the wireless signals, and the features of the CIR include:

variations in range between the electronic device and the target device over a period of time, variations of the AoA and the orientation over the period of time, variations of a first peak strength of the CIR over the period of time, a minimum of a difference between a strength of the first peak strength and a strength of a strongest peak of the CIR, a time difference between the first peak strength of the CIR and the strongest peak, the first peak strength of the CIR, and the AoA.

13. The electronic device of claim 11, wherein to determine that the target device is within the FoV or outside the FoV of the electronic device, the processor is configured to:

determine whether the second location information indicates that spatial consistency between the orientation and the AoA indicated in the AoA information is maintained;

in response to determining that the spatial consistency is maintained, determine that the target device is within the FoV or outside the FoV of the electronic device based on the second location information;

in response to determining that the spatial consistency is not maintained, identify a first result based on a determination that:

(i) the motion information indicates that the electronic device is in motion and (ii) the AoA and the orientation for the current timestamp are not correlated, or a variance of the range information is larger than a threshold;

in response to determining that the spatial consistency is not maintained, identify a second result based on a determination that the variance of the range information is larger than the threshold and either (i) the electronic device is in motion or (ii) the AoA and the orientation for the current timestamp are not correlated;

in response to identifying the first result, determine that the target device is outside the FoV of the electronic device; and in response to identifying the second result, determine that the target device is within the FoV or outside the FoV of the electronic device based on the first location information.

14. The electronic device of claim 11, wherein to determine whether the electronic device is in motion, the processor is further configured to:

determine whether variance of the orientation of the electronic device is within a second threshold range;

in response to determining that the variance of the orientation is not within the second threshold range, determine whether spatial consistency between the orientation and the AoA is maintained; and in response to determining that the variance of the orientation is within the second threshold range, determine whether the target device is within the threshold range of angles.

15. The electronic device of claim 11, wherein in response to determining that the target device is not within the threshold range of angles, the processor is configured to determine whether spatial consistency between the orientation and the AoA is maintained.

16. The electronic device of claim 11, wherein:

the memory includes multiple bins corresponding to non-overlapping ranges of orientation angles, respectively, wherein each of the multiple bins include at least one slot and a slot of the at least one slot stores a previously identified correlation value at a corresponding timestamp;

to compare the correlation value of the current timestamp to the correlation threshold, the processor is configured to determine that the correlation value is above the correlation threshold; and to update the memory, the processor is configured to store the correlation value and the current timestamp in a slot of one of the multiple bins.

17. The electronic device of claim 16, wherein the processor is further configured to:

in response to determining that (i) the electronic device is not in motion, (ii) the target device is not within the threshold range of angles from the boresight direction of the electronic device, (iii) the correlation value is below the correlation threshold, or (iv) after the memory is updated, determine whether at least one of the multiple bins includes multiple correlation values with corresponding time stamps;

compare a number of the multiple correlation values associated with one of the multiple bins to a threshold to determine whether spatial consistency between the orientation and the AoA is maintained, indicating that the boresight direction of the electronic device spatially traversed the target device;

in response to determining that the spatial consistency is maintained, identify a first bin corresponding to the boresight direction of the electronic device from the multiple bins;

in response to determining that the spatial consistency is not maintained, determine whether a previous spatial consistency indicated that the target device is in the FoV of the electronic device;

in response to determining that the previous spatial consistency indicated that the target device is in the FoV of the electronic device and a current AoA is within an FoV range, determine that the target device as in the FoV of the electronic device; and in response to determining that the previous spatial consistency indicated that the target device is not in the FoV of the electronic device, determine that the spatial consistency is inactive.

18. The electronic device of claim 17, wherein to identify the first bin, the processor is configured to:

identify a local decay weight associated with each of the multiple bins, respectively, and a global decay weight associated with each of the multiple bins, respectively;

identify a weighted mean correlation value for each of the multiple bins, respectively, wherein the weighted mean correlation value for each of the multiple bins are based the local decay weight and the global decay weight for that bin; and
select the first bin from the multiple bins based on a comparison of the weighted mean correlation value of each of the multiple bins to a predefined criteria.

19. The electronic device of claim 17, wherein the processor is further configured to:
generate a result based on a determination:
that the electronic device is stationary and the orientation is not within a threshold to the first bin,
that the AoA is in the FoV of the electronic device and the orientation is varying,
that the target device is indicated as in the FoV of the electronic device based on the AoA and the correlation value is below a threshold, or
that a weighted mean correlation value associated with each of the bins is below a threshold; and
determine to reset the memory based on the result of the determination.

20. The electronic device of claim 17, wherein the processor is further configured to:
determine whether the boresight direction of the electronic device is within another threshold range of angles corresponding to the first bin;
determine that the target device is in the FoV of the electronic device when the boresight direction of the electronic device is within the other threshold range of the first bin; and
determine that the target device is out of the FoV of the electronic device when the boresight direction of the electronic device is outside the other threshold range to the first bin.

21. A non-transitory computer readable medium containing instructions that when executed cause a processor to:
obtain signal information based on wireless signals communicated between an electronic device and a target device, the signal information including channel information, range information, and angle of arrival (AoA) information;
obtain motion information based on movement of the electronic device, the motion information including orientation of the electronic device;
identify first location information based on the motion information and the channel information, the first location information indicating whether the target device is within a field of view (FoV) of the electronic device;
identify second location information based on the orientation of the electronic device and the AoA information, the second location information indicating whether the target device is within the FoV of the electronic device;
determine whether the electronic device is in motion based on rotary motion; and
determine whether the target device is within the FoV or outside the FoV of the electronic device based in part on the first location information in response to determining that the electronic device is not in motion or the second location information in response to determining that the electronic device is in motion,
wherein the instructions that when executed cause the processor to identify the second location information comprise instructions that when executed cause the processor to:
in response to determining that the electronic device is in motion, determine, based on an AoA indicated in the AoA information, whether the target device is within a threshold range of angles extending from a boresight direction of the electronic device;
in response to determining that the target device is within the threshold range of angles, identify a correlation value between the AoA and the orientation for a current timestamp;
compare the correlation value to a correlation threshold; and
update a memory with the correlation value based on the comparison.

22. The non-transitory computer readable medium of claim 21, wherein:
the instructions when executed further cause the processor to:
identify, at different instances in time, the AoA indicated in the AoA information and range indicated in the range information between the target device and the electronic device based on the signal information, and
perform, using a tracking filter, a smoothing operation on the AoA information and the range information based on the motion information;
the instructions that when executed cause the processor to identify the first location information comprise instructions that when executed cause the processor to:
generate an initial prediction of a presence of the target device relative to the FoV of the electronic device based on the channel information and at least one of the range information or the AoA information, and
determine that the target device is within the FoV or outside the FoV of the electronic device based on the AoA information, the smoothed AoA information, and the initial prediction;
the channel information comprises features of a channel impulse response (CIR) of the wireless signals; and
the features of the CIR include:
variations in range between the electronic device and the target device over a period of time,
variations of the AoA and the orientation over the period of time,
variations of a first peak strength of the CIR over the period of time,
a minimum of a difference between a strength of the first peak strength and a strength of a strongest peak of the CIR,
a time difference between the first peak strength of the CIR and the strongest peak,
the first peak strength of the CIR, and
the AoA.

23. The non-transitory computer readable medium of claim 21, wherein the instructions that when executed cause processor to determine that the target device is within the FoV or outside the FoV of the electronic device comprise instructions that when executed cause the processor to:
determine whether the second location information indicates that spatial consistency between the orientation and the AoA indicated in the AoA information is maintained;
in response to determining that the spatial consistency is maintained, determine that the target device is within the FoV or outside the FoV of the electronic device based on the second location information;
in response to determining that the spatial consistency is not maintained, identify a first result based on a determination that:

(i) the motion information indicates that the electronic device is in motion and (ii) the AoA and the orientation for the current timestamp are not correlated, or a variance of the range information is larger than a threshold;

in response to determining that the spatial consistency is not maintained, identify a second result based on a determination that the variance of the range information is larger than the threshold and either (i) the electronic device is in motion or (ii) the AoA and the orientation for the current timestamp are not correlated;

in response to identifying the first result, determine that the target device is outside the FoV of the electronic device; and in response to identifying the second result, determine that the target device is within the FoV or outside the FoV of the electronic device based on the first location information.

24. The non-transitory computer readable medium of claim 21, wherein the instructions that when executed cause the processor to determine whether the electronic device is in motion further comprise instructions that when executed cause the processor to:

determine whether variance of the orientation of the electronic device is within a second threshold range;

in response to determining that the variance of the orientation is not within the second threshold range, determine whether spatial consistency between the orientation and the AoA is maintained; and in response to determining that the variance of the orientation is within the second threshold range, determine whether the target device is within the threshold range of angles.

25. The non-transitory computer readable medium of claim 21, wherein in response to determining that the target device is not within the threshold range of angles, the instructions when executed further cause the processor to determine whether spatial consistency between the orientation and the AoA is maintained.

26. The non-transitory computer readable medium of claim 21, wherein:

the memory includes multiple bins corresponding to non-overlapping ranges of orientation angles, respectively, wherein each of the multiple bins include at least one slot and a slot of the at least one slot stores a previously identified correlation value at a corresponding timestamp;

the instructions that when executed cause the processor to compare the correlation value of the current timestamp to the correlation threshold comprise instructions that when executed cause the processor to determine that the correlation value is above the correlation threshold; and the instructions that when executed cause the processor to update the memory comprise instructions that when executed cause the processor to store the correlation value and the current timestamp in a slot of one of the multiple bins.

27. The non-transitory computer readable medium of claim 26, wherein the instructions when executed further cause the processor to:

in response to determining that (i) the electronic device is not in motion, (ii) the target device is not within the threshold range of angles from the boresight direction of the electronic device, (iii) the correlation value is below the correlation threshold, or (iv) after the memory is updated, determine whether at least one of the multiple bins includes multiple correlation values with corresponding time stamps;

compare a number of the multiple correlation values associated with one of the multiple bins to a threshold to determine whether spatial consistency between the orientation and the AoA is maintained, indicating that the boresight direction of the electronic device spatially traversed the target device;

in response to determining that the spatial consistency is maintained, identify a first bin corresponding to the boresight direction of the electronic device from the multiple bins;

in response to determining that the spatial consistency is not maintained, determine whether a previous spatial consistency indicated that the target device is in the FoV of the electronic device;

in response to determining that the previous spatial consistency indicated that the target device is in the FoV of the electronic device and a current AoA is within an FoV range, determine that the target device as in the FoV of the electronic device; and in response to determining that the previous spatial consistency indicated that the target device is not in the FoV of the electronic device, determine that the spatial consistency is inactive.

28. The non-transitory computer readable medium of claim 27, wherein the instructions that when executed cause the processor to identify the first bin comprise instructions that when executed cause the processor to:

identify a local decay weight associated with each of the multiple bins, respectively, and a global decay weight associated with each of the multiple bins, respectively;

identify a weighted mean correlation value for each of the multiple bins, respectively, wherein the weighted mean correlation value for each of the multiple bins are based the local decay weight and the global decay weight for that bin; and select the first bin from the multiple bins based on a comparison of the weighted mean correlation value of each of the multiple bins to a predefined criteria.

29. The non-transitory computer readable medium of claim 27, wherein the instructions when executed further cause the processor to:

generate a result based on a determination:
that the electronic device is stationary and the orientation is not within a threshold to the first bin,
that the AoA is in the FoV of the electronic device and the orientation is varying,
that the target device is indicated as in the FoV of the electronic device based on the AoA and the correlation value is below a threshold, or
that a weighted mean correlation value associated with each of the bins is below a threshold; and determine to reset the memory in response to determining.

30. The non-transitory computer readable medium of claim 27, wherein the instructions when executed further cause the processor to:

determine whether the boresight direction of the electronic device is within another threshold range of angles corresponding to the first bin;

determine that the target device is in the FoV of the electronic device when the boresight direction of the electronic device is within the other threshold range of the first bin; and determine that the target device is out of the FoV of the electronic device when the boresight direction of the electronic device is outside the other threshold range to the first bin.

\* \* \* \* \*